US012574491B2

(12) United States Patent
Sorahana

(10) Patent No.: US 12,574,491 B2
(45) Date of Patent: Mar. 10, 2026

(54) DISPLAY APPARATUS AND DISPLAY METHOD

(71) Applicant: SONY GROUP CORPORATION, Tokyo (JP)

(72) Inventor: Toshiaki Sorahana, Tokyo (JP)

(73) Assignee: Sony Group Corporation, Tokyo (JP)

( * ) Notice: Subject to any disclaimer, the term of this patent is extended or adjusted under 35 U.S.C. 154(b) by 54 days.

(21) Appl. No.: 18/683,292

(22) PCT Filed: Feb. 18, 2022

(86) PCT No.: PCT/JP2022/006519
§ 371 (c)(1),
(2) Date: Feb. 13, 2024

(87) PCT Pub. No.: WO2023/021732
PCT Pub. Date: Feb. 23, 2023

(65) Prior Publication Data
US 2024/0372978 A1 Nov. 7, 2024

(30) Foreign Application Priority Data
Aug. 20, 2021 (JP) ................................. 2021-134868

(51) Int. Cl.
*H04N 13/344* (2018.01)
*G02B 30/10* (2020.01)
(Continued)

(52) U.S. Cl.
CPC ........... *H04N 13/344* (2018.05); *G02B 30/10* (2020.01); *G02B 30/22* (2020.01); *H04N 13/305* (2018.05);
(Continued)

(58) Field of Classification Search
CPC .. H04N 13/344; H04N 13/305; H04N 13/346; H04N 13/383; H04N 13/349;
(Continued)

(56) References Cited

U.S. PATENT DOCUMENTS 5,506,705 A * 4/1996 Yamamoto ........... H04N 13/398
348/E13.059
5,737,012 A 4/1998 Ibata et al.
(Continued)

FOREIGN PATENT DOCUMENTS

EP 0721131 B1 4/2003
JP H08-234141 9/1996
(Continued)

OTHER PUBLICATIONS

English Translation of International Search Report prepared by the Japan Patent Office on Apr. 15, 2022, for International Application No. PCT/JP2022/006519, 3 pgs.
(Continued)

*Primary Examiner* — Tung T Vo
(74) *Attorney, Agent, or Firm* — Sheridan Ross PC

(57) ABSTRACT

To provide a display apparatus that can display, without restricting the field of view, a three-dimensional image at a high resolution with a high degree of reproducibility in depth. A display apparatus according to the present technology includes a group-of-viewpoints generation system that includes a plurality of three-dimensional image displaying apparatuses corresponding to each of two eyes of a user, the group-of-viewpoints generation system generating a group of viewpoints for the eye using a group of light rays emitted from each of the plurality of three-dimensional image displaying apparatuses. The present technology makes it possible to provide a display apparatus that can display, without restricting the field of view, a three-dimensional image at a
(Continued)

high resolution with a high degree of reproducibility in depth.

34 Claims, 35 Drawing Sheets

(51) Int. Cl.

| | | |
|---|---|---|
| *G02B 30/22* | (2020.01) | |
| *H04N 13/305* | (2018.01) | |
| *H04N 13/346* | (2018.01) | |
| *H04N 13/383* | (2018.01) | |

(52) U.S. Cl.
CPC ......... *H04N 13/346* (2018.05); *H04N 13/383* (2018.05)

(58) Field of Classification Search
CPC ...... H04N 13/307; G02B 30/10; G02B 30/22; G02B 2027/0129; G02B 2027/0138; G02B 2027/014; G02B 2027/0187; G02B 3/0056; G02B 27/1066; G02B 27/149; G02B 27/18
USPC .......................................................... 348/50
See application file for complete search history.

(56) References Cited

U.S. PATENT DOCUMENTS

| | | | | |
|---|---|---|---|---|
| 5,959,664 | A | 9/1999 | Woodgate | |
| 6,710,920 | B1* | 3/2004 | Mashitani | H04N 13/32 |
| | | | | 359/464 |
| 8,752,965 | B2* | 6/2014 | Huang | G02B 30/25 |
| | | | | 348/57 |
| 9,013,564 | B2* | 4/2015 | Bathiche | H04N 13/368 |
| | | | | 348/54 |
| 10,129,537 | B2* | 11/2018 | Ahn | G02B 27/0101 |
| 2001/0030715 | A1* | 10/2001 | Tabata | H04N 13/156 |
| | | | | 348/E13.067 |
| 2006/0109753 | A1* | 5/2006 | Fergason | H04N 13/398 |
| | | | | 369/30.01 |
| 2006/0232665 | A1* | 10/2006 | Schowengerdt | H04N 13/144 |
| | | | | 348/E13.067 |
| 2009/0027772 | A1* | 1/2009 | Robinson | H04N 13/344 |
| | | | | 359/475 |
| 2010/0328613 | A1* | 12/2010 | Bartol | G03B 21/60 |
| | | | | 353/8 |
| 2011/0141250 | A1* | 6/2011 | Jan | H04N 13/337 |
| | | | | 348/58 |
| 2012/0182334 | A1* | 7/2012 | Ranieri | G02B 30/52 |
| | | | | 345/694 |
| 2012/0249533 | A1* | 10/2012 | Kanagawa | H04N 13/346 |
| | | | | 345/419 |
| 2012/0313839 | A1* | 12/2012 | Smithwick | G02B 30/30 |
| | | | | 345/6 |
| 2013/0082905 | A1* | 4/2013 | Ranieri | H04N 13/32 |
| | | | | 345/32 |
| 2013/0258461 | A1* | 10/2013 | Sato | G02B 27/01 |
| | | | | 359/464 |
| 2014/0071131 | A1* | 3/2014 | Kitago | G06T 17/00 |
| | | | | 345/427 |
| 2014/0168393 | A1* | 6/2014 | Fang | H04N 13/133 |
| | | | | 348/58 |
| 2014/0233100 | A1* | 8/2014 | Sato | G02B 27/0172 |
| | | | | 359/463 |

| | | | | |
|---|---|---|---|---|
| 2017/0269366 | A1* | 9/2017 | Lee | G02B 27/0172 |
| 2017/0325675 | A1* | 11/2017 | Liu | A61B 3/0025 |
| 2018/0114298 | A1* | 4/2018 | Malaika | G02B 27/0093 |
| 2018/0210208 | A1* | 7/2018 | Zhou | G02B 27/1026 |
| 2018/0220887 | A1* | 8/2018 | Kanamori | A61B 3/12 |
| 2018/0330652 | A1* | 11/2018 | Perreault | G02B 27/0075 |
| 2019/0011825 | A1* | 1/2019 | Schuck | G02B 30/25 |
| 2019/0219818 | A1* | 7/2019 | Mattinson | G02B 27/283 |
| 2020/0041792 | A1* | 2/2020 | Choi | G02B 27/0955 |
| 2020/0169725 | A1 | 5/2020 | Hua et al. | |
| 2020/0201047 | A1* | 6/2020 | Nakamura | G02B 6/0055 |
| 2020/0393677 | A1 | 12/2020 | Hua et al. | |
| 2021/0011285 | A1* | 1/2021 | Lin | G02B 27/283 |
| 2021/0286177 | A1* | 9/2021 | Takaki | G02B 25/001 |
| 2021/0294119 | A1* | 9/2021 | Osmanis | G02B 30/60 |
| 2021/0318543 | A1* | 10/2021 | Ito | G02B 27/283 |
| 2021/0337179 | A1* | 10/2021 | Wang | G02B 30/34 |
| 2022/0013088 | A1* | 1/2022 | Kikuta | G09G 3/003 |
| 2022/0043277 | A1* | 2/2022 | Karafin | G03H 1/268 |
| 2022/0078398 | A1* | 3/2022 | Mok | H04N 13/32 |
| 2022/0121280 | A1* | 4/2022 | Jones | A61B 3/113 |
| 2022/0171199 | A1* | 6/2022 | Oka | H04N 5/64 |
| 2022/0252900 | A1* | 8/2022 | Ogata | G02B 30/36 |
| 2022/0260840 | A1* | 8/2022 | Kessler | G09G 3/007 |
| 2022/0299786 | A1* | 9/2022 | Qin | G02B 27/4205 |
| 2022/0397862 | A1* | 12/2022 | Karafin | H04N 13/346 |
| 2022/0404636 | A1* | 12/2022 | Tsai | H04N 13/344 |
| 2023/0048195 | A1* | 2/2023 | Kim | H04N 13/383 |
| 2023/0168513 | A1* | 6/2023 | Yeh | G02B 27/0081 |
| | | | | 359/630 |
| 2023/0185107 | A1* | 6/2023 | Kon | G02B 30/25 |
| | | | | 359/465 |
| 2023/0218161 | A1* | 7/2023 | Hirohara | A61B 3/1005 |
| | | | | 351/206 |
| 2023/0289925 | A1* | 9/2023 | Kumagai | G06T 5/73 |
| 2023/0333385 | A1* | 10/2023 | Freeman | G09G 3/007 |
| 2023/0421750 | A1* | 12/2023 | Ito | G09G 3/20 |
| 2024/0001761 | A1* | 1/2024 | Dehkordi | B60K 35/00 |
| 2024/0004195 | A1* | 1/2024 | Dehkordi | G02B 27/10 |
| 2024/0066394 | A1* | 2/2024 | Tokunaga | A63F 13/26 |
| 2024/0106999 | A1* | 3/2024 | Sorahana | G02B 27/145 |
| 2024/0220009 | A1* | 7/2024 | Dryer | G06F 1/1626 |
| 2024/0369861 | A1* | 11/2024 | Le | G02B 27/283 |
| 2025/0013069 | A1* | 1/2025 | Ota | G02B 30/31 |
| 2025/0039351 | A1* | 1/2025 | Schelberg | H04N 13/337 |
| 2025/0093658 | A1* | 3/2025 | Kuramoto | G02B 27/0172 |

FOREIGN PATENT DOCUMENTS

| | | |
|---|---|---|
| JP | H08-237691 | 9/1996 |
| JP | H09-322197 | 12/1997 |
| JP | 2014-219621 | 11/2014 |
| JP | 2017-062295 | 3/2017 |
| JP | 2017-515162 | 6/2017 |
| JP | 2020-514811 | 5/2020 |
| JP | 2020-521174 | 7/2020 |
| WO | WO-2019182592 A1 | 9/2019 |
| WO | WO-2021097149 A1 | 5/2021 |

OTHER PUBLICATIONS

Douglas Lanman et al: "Near-eye light field displays", ACM Transactions on Graphics, vol. 32, No. 6, Nov. 1, 2013 (Nov. 1, 2013), pp. 1-10, XP055238832, us IS SN : 0 7 3 0 -0 3 0 1, DO I : 10.1145/2508363.2508366.

* cited by examiner

Right eye

Left eye

Convergence
distance

Adjustment
distance
(image plane)

A

To reproduce 3D (x,y,z)

B

To reproduce 4D (x,y,u,v)

A

B

A

B

A

B

MLA

A

B

A

B

A

B

DISPLAY APPARATUS AND DISPLAY METHOD

CROSS REFERENCE TO RELATED APPLICATIONS

This application is a national stage application under 35 U.S.C. 371 and claims the benefit of PCT Application No. PCT/JP2022/006519, having an international filing date of 18 Feb. 2022, which designated the United States, which PCT application claimed the benefit of Japanese Patent Application No. 2021-134868, filed 20 Aug. 2021, the entire disclosures of each of which are incorporated herein by reference.

TECHNICAL FIELD

The technology according to the present disclosure (hereinafter also referred to as the "present technology") relates to a display apparatus and a display method.

BACKGROUND ART

Conventionally, a display apparatus that guides, to eyes of a user, a group of light rays coming from a three-dimensional image displaying apparatus to display a three-dimensional image is known (for example, refer to Patent Literature 1).

CITATION LIST

Patent Literature

Patent Literature 1: Japanese Unexamined Patent Application Publication No. 2017-515162

DISCLOSURE OF INVENTION

Technical Problem

However, the existing display apparatus results in there being room for improvement in displaying, without restricting the field of view, a three-dimensional image at a high resolution with a high degree of reproducibility in depth.

Thus, it is a primary object of the present technology to provide a display apparatus that can display, without restricting the field of view, a three-dimensional image at a high resolution with a high degree of reproducibility in depth.

Solution to Problem

The present technology provides a display apparatus that includes a group-of-viewpoints generation system that includes a plurality of three-dimensional image displaying apparatuses corresponding to each of two eyes of a user, the group-of-viewpoints generation system generating a group of viewpoints for the eye using a group of light rays emitted from each of the plurality of three-dimensional image displaying apparatuses.

Favorably, the groups of viewpoints of a plurality of the groups of viewpoints do not overlap.

Favorably, at least two of a plurality of viewpoints included in a plurality of the groups of viewpoints are generated on the eye.

At least a viewpoint included in one of a plurality of the groups of viewpoints may be generated between two adjacent viewpoints included in another of the plurality of the groups of viewpoints.

Each of the plurality of three-dimensional image displaying apparatuses may include an elemental image displaying apparatus and a microlens array.

Each of the plurality of three-dimensional image displaying apparatuses may further include an aperture array that is situated between the elemental image displaying apparatus and the microlens array.

The plurality of three-dimensional image displaying apparatuses may include at least one pair of first and second three-dimensional image displaying apparatuses in which a direction in which the group of light rays is emitted from the first three-dimensional image displaying apparatus and a direction in which the group of light rays is emitted from the second three-dimensional image displaying apparatus intersect, and the group-of-viewpoints generation system may include an optical system that guides the group of light rays coming from each of the plurality of three-dimensional image displaying apparatuses.

The optical system may include a first optical element that aligns a traveling direction of a first group of light rays and a traveling direction of a second group of light rays, the first group of light rays being the group of light rays coming from the first three-dimensional image displaying apparatus, the second group of light rays being the group of light rays coming from the second three-dimensional image displaying apparatus.

The optical system may further include at least one of a first relay optical system or a second relay optical system, the first relay optical system being arranged between the first three-dimensional image displaying apparatus and the first optical element to generate an intermediate image of the first group of light rays, the second relay optical system being arranged between the second three-dimensional image displaying apparatus and the first optical element to generate an intermediate image of the second group of light rays.

The plurality of three-dimensional image displaying apparatuses may include the pair of the first and second three-dimensional image displaying apparatuses, and the first optical element may align the traveling directions of the first and second groups of light rays in a direction toward the eye.

The first optical element may be a beam splitter.

The optical system may further include an ocular optical element on which the first and second groups of light rays coming from the first optical element are incident.

The first optical element may be a freeform prism that also serves as an ocular optical element.

The plurality of three-dimensional image displaying apparatuses may include a plurality of the pairs of the first and second three-dimensional image displaying apparatuses; the first optical element may be provided for each of the plurality of the pairs; a traveling direction of a pair of groups of light rays and a traveling direction of another pair of groups of light rays may intersect, the pair of groups of light rays including the first and second groups of light rays coming from one of the first optical elements provided for the plurality of the pairs, the other pair of groups of light rays including the first and second groups of light rays coming from another of the first optical elements provided for the plurality of the pairs; and the optical system may further include a second optical element that aligns the traveling direction of the pair of groups of light rays and the traveling direction of the other pair of groups of light rays.

At least one of the first and second optical elements may be a beam splitter.

The optical system may further include an ocular optical element on which the pair of groups of light rays and the other pair of groups of light rays are incident, the pair of groups of light rays and other pair of groups of light rays coming from the second optical element.

The second optical element may be a freeform prism that also serves as an ocular optical element.

The optical system may further include at least one of a first relay optical system or a second relay optical system, the first relay optical system being arranged between the one of the first optical elements and the second optical element to generate an intermediate image of the first and second groups of light rays coming from the one of the first optical elements, the second relay optical system being arranged between the other of the first optical elements and the second optical element to generate an intermediate image of the first and second groups of light rays coming from the other of the first optical elements.

The plurality of three-dimensional image displaying apparatuses may further include a third three-dimensional image displaying apparatus; a traveling direction of a pair of groups of light rays and a traveling direction of a third group of light rays may intersect, the pair of groups of light rays including the first and second groups of light rays coming from the first optical element, the third group of light rays being a group of light rays coming from the third three-dimensional image displaying apparatus; and the optical system may further include a second optical element that aligns the traveling direction of the pair of groups of light rays and the traveling direction of the third group of light rays.

At least one of the first and second optical elements may be a beam splitter.

The display apparatus may further include a two-dimensional image displaying apparatus corresponding to the eye of the user; a traveling direction of a group of light rays emitted from the two-dimensional image displaying apparatus and a traveling direction of a pair of groups of light rays may intersect, the pair of groups of light rays including the first and second groups of light rays coming from the first optical element; and the optical system may further include a second optical element that aligns the traveling direction of the group of light rays and the traveling direction of the pair of groups of light rays.

The optical system may further include a relay optical system that is arranged between the first and second optical elements to generate an intermediate image of the first and second groups of light rays coming from the first optical element.

The second optical element may be a freeform prism that also serves as an ocular optical element.

The elemental image displaying apparatus included in each of the plurality of three-dimensional image displaying apparatuses may include a display.

The displays of a plurality of the displays may be arranged in a layered formation.

Three-dimensional image displaying apparatuses of the plurality of three-dimensional image displaying apparatuses may share the microlens array.

The group-of-viewpoints generation system may include an ocular optical element on which groups of light rays coming from the respective displays of a plurality of the displays are incident.

At least one of a plurality of the displays may include a light source and a spatial modulator.

The plurality of the displays may include a first display including a reflective spatial modulator and a second display including a transmissive spatial modulator, a direction in which a group of light rays is emitted from the reflective spatial modulator and a direction in which a group of light rays is emitted from the transmissive spatial modulator may intersect, and the optical system may include an optical element that aligns a traveling direction of the group of light rays coming from the reflective spatial modulator with a traveling direction of the group of light rays coming from the transmissive spatial modulator.

The spatial modulator may be a liquid crystal element.

The spatial modulator may be transmissive.

The spatial modulator may be reflective.

The spatial modulator may be a ferroelectric liquid crystal on silicon (FLCOS).

The spatial modulator may be Digital Mirror Device (DMD).

At least one of a plurality of the displays may include a self-luminous display element.

The display element may include a light-emitting diode (LED) or an organic light-emitting diode (OLED).

The present technology may further include a line-of-sight detection system that detects a line of sight of the user; and on the basis of a result of the detection performed by the line-of-sight detection system, the group-of-viewpoints generation system may control a position at which the group of viewpoints is generated.

The display apparatus may be a head-mounted display apparatus.

The present technology also provides a display apparatus that includes a group-of-viewpoints generation system that includes a three-dimensional image displaying apparatus and an optical system including an ocular optical element, the three-dimensional image displaying apparatus and optical system corresponding to each of two eyes of a user, the group-of-viewpoints generation system generating a group of viewpoints for the eye using a group of light rays being emitted from the three-dimensional image displaying apparatus to pass through the optical system; and a line-of-sight detection system that detects a line of sight of the user, the group-of-viewpoints generation system controlling a position at which the group of viewpoints is generated, on the basis of a result of the detection performed by the line-of-sight detection system.

Each of the plurality of three-dimensional image displaying apparatuses may include an elemental image displaying apparatus and a microlens array.

Each of the plurality of three-dimensional image displaying apparatuses may further include an aperture array that is situated between the elemental image displaying apparatus and the microlens array.

The line-of-sight detection system may include a light source section that emits invisible light, and a light receiver that receives the invisible light being emitted by the light source section to be reflected off the eye.

The line-of-sight detection system may be provided to the ocular optical element corresponding to the eye.

The line-of-sight detection system may be provided to the three-dimensional image displaying apparatus corresponding to the eye.

A direction in which the group of light rays coming from the three-dimensional image displaying apparatus corresponding to the eye is emitted and a direction in which the invisible light coming from the light source section is emitted may intersect, and the optical system may further include an optical element that aligns a traveling direction of the group of light rays and a traveling direction of the invisible light.

The invisible light emitted by the light source section may pass through the optical element and the ocular optical element in this order to be irradiated onto the eye; and the light receiver may receive, through the ocular optical element and the optical element in this order, the invisible light reflected off the eye.

The optical element may be a beam splitter.

A direction in which the group of light rays coming from the three-dimensional image displaying apparatus corresponding to the eye is emitted and a direction in which the invisible light coming from the light source section is emitted may intersect, and the ocular optical element may be a freeform prism that aligns a traveling direction of the group of light rays and a traveling direction of the invisible light.

The invisible light emitted by the light source section may pass through the ocular optical element to be irradiated onto the eye; and the light receiver may receive, through the ocular optical element, the invisible light reflected off the eye.

The display apparatus may be a head-mounted display apparatus.

The present technology also provides a display method that includes generating, using a group of light rays, a group of viewpoints for each of two eyes of a user, the group of light rays being emitted from each one of a plurality of three-dimensional image displaying apparatuses corresponding to the eye.

The present technology also provides a display method that includes detecting a line of sight of a user; and generating, using a group of light rays, a group of viewpoints for each of two eyes of the user, the group of light rays being emitted from a three-dimensional image displaying apparatus to pass through an optical system including an ocular optical element, the three-dimensional image displaying apparatus corresponding to the eye, the generating the group of viewpoints including controlling a position at which the group of viewpoints is generated, on the basis of a result of the detection performed by the detecting the line of sight.

MODE(S) FOR CARRYING OUT THE INVENTION

Figure 1:
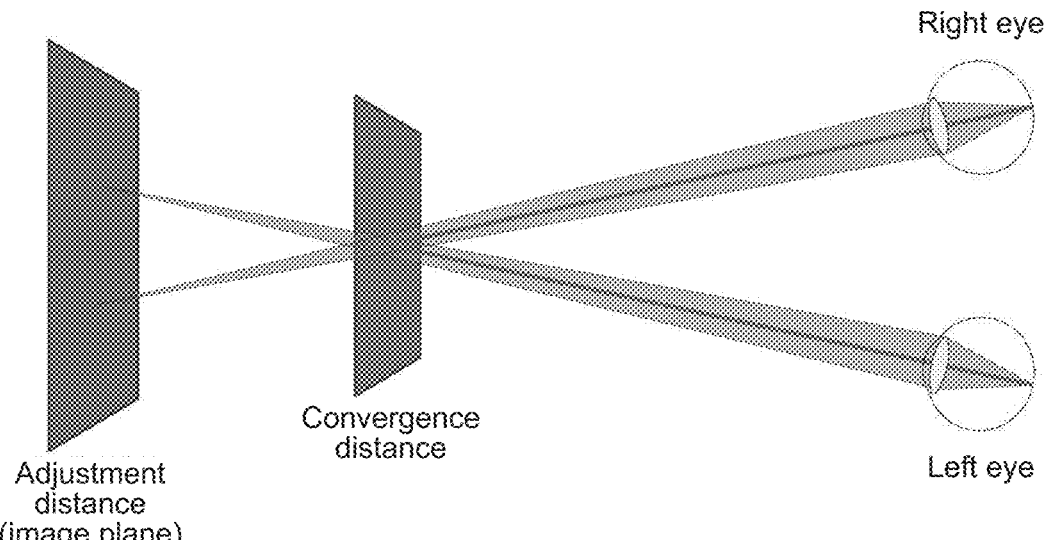
FIG. 1 is a diagram used to describe vergence-accommodation conflict.

Favorable embodiments of the present technology will now be described below in detail with reference to the accompanying drawings.

Note that, in the specification and the drawings, structural elements having substantially the same functional configuration are denoted by the same reference numeral to omit a repetitive description. The embodiments described below are examples of representative embodiments of the present technology, and the scope of the present technology is not construed as being limited to the embodiments. Even when an example in which a display apparatus and a display method according to the present technology each provide a plurality of effects is described herein, it is sufficient if the display apparatus and the display method according to the present technology each provide at least one of the plurality of effects. Effects described herein are not limitative but are merely illustrative, and other effects may be provided.

Note that the description is made in the following order.
1. Introduction
2. Principle of Present Technology
3. Display Apparatuses of Embodiments of Present technology
(1) Display Apparatus of First Example
(2) Display Apparatus of Second Example
(3) Display Apparatus of Third Example
(4) Display Apparatus of Fourth Example
(5) Display Apparatus of Fifth Example
(6) Display Apparatus of Sixth Example
(7) Display Apparatus of Seventh Example
(8) Display Apparatus of Eighth Example
(9) Display Apparatus of Ninth Example
(10) Display Apparatus of Tenth Example
(11) Display Apparatus of Eleventh Example
(12) Display Apparatus of Twelfth Example
(13) Display Apparatus of Thirteenth Example
(14) Display Apparatus of Fourteenth Example
4. Modifications of Present Technology <1. Introduction>

In recent years, a technology (augmented reality, AR) used to display an image (a video) in a state of being superimposed on the scenery in the outside world such as an actual scene in front of eyes of a user, and a technology (virtual reality, VR) used to display, in the form of an image (a video), a virtual space that is different from the reality in front of the eyes of the user have attracted attention. In recent years, a head-mounted display (HMD) that displays respective parallax images to right and left eyes and is a product that provides augmented reality or virtual reality, has been launched onto the market due to small displays achieving a significantly higher performance. The head-mounted display is used by being worn on a head of a user.

It is known that existing head-mounted displays cause vergence-accommodation conflict (VAC) for the following reasons. The existing head-mounted displays present parallax images to a user. Thus, convergence of right and left eyes is induced, but focusing is fixed to a display plane (refer to FIG. 1). It is known that VAC causes, for example, a 3D sickness, an eyestrain, and a headache, and thus there are restrictions on an age limit for use and hours of use.

Various technologies, such as a light-field approach or supermultiview approach of reproducing light-ray information, a hologram approach of reproducing a light wavefront, and a virtual-image-plane multiplexing approach of multiplexing virtual-image planes temporally and spatially, that overcome vergence-accommodation conflict have been reported as methods for overcoming VAC.

The light-field approach is a method for reproducing four-dimensional information in four dimensions in total that is represented by a two-dimensional position and a two-dimensional direction of a light ray. When the light-field approach is used in the form of an HMD, five-dimensional information can be reproduced by expressing five-dimensional-eye information in the form of a video. This makes it possible to theoretically create a virtual space that resembles a real space as closely as possible. However, there is a need for a huge amount of data in order to reproduce four-dimensional light-ray information. Existing technologies lack a hardware performance such as the resolution of a display, and a computer performance such as transmission capabilities and computational capabilities.

In order to overcome VAC, there is a need to increase the density of a reproduction-target light ray. This results in a trade-off between the density and a two-dimensional resolution or the field of view. Further, when the light-field approach is used in the form of an HMD, there is also a trade-off relationship between the density of a reproduction-target light ray and the size of an eye-box. This results in difficulty in optical designing in consideration of, for example, a rotation of an eyeball and an offset upon the HMD being worn.

Patent Literature 1 (Japanese Unexamined Patent Application Publication No. 2017-515162) discloses an AR-related technology used to display a light field in a state of being superimposed on a real world, the light field being reproduced through an eyepiece. The light field is reproduced using integral imaging provided by a display and a microlens array that are used to display an elemental image. A region in which a light field is reproduced is limited to a center portion of the field of view, and this results in providing a high degree of viewpoint density (a high degree of reproducibility in depth) and a high resolution. However, for example, a sufficiently wide field of view is not provided in VR, and this results in there being a good possibility that a sense of immersion will not be provided. In other words, Patent Literature 1 results in there being room for improvement in displaying, without restricting the field of view, a three-dimensional image at a high resolution with a high degree of reproducibility in depth.

Cited Document 1 (Japanese Unexamined Patent Application Publication No 2015-521298) discloses a VR-related technology used to display a light field reproduced through an eyepiece. The light field is reproduced using integral imaging provided by an LED emitter and a microlens array that are used to display an elemental image. Very small LED light sources are arranged in the LED emitter, and the LED emitter can be used as a display. The LED emitter is moved at a high speed in a direction vertical to an optical axis in synchronization with a displayed image. This makes it possible to display a high-resolution video. However, there is a need for a drive section, and this may result in obtaining a larger and more complicated system. Further, there is a need for a high refresh rate in order to display a video by time division. This may result in huge transmission and calculation costs.

Cited Document 2 (Japanese Unexamined Patent Application Publication No. 2020-513595) discloses including arranged point light sources, a collimator lens, a reflective spatial modulator, a beam splitter, and an eyepiece. Parallax images displayed using the reflective spatial modulator are synchronized with a position of a light source that emits light. Accordingly, viewpoints are generated by time division in different portions of each of pupil planes of two eyes of a user. The generation of a lot of viewpoints at a high speed in a pupil plane of each of two eyes enables a user to view a video with a sense of depth. This method provides a high degree of viewpoint density and a high resolution by dispersing information in a temporal direction. However, there is a possibility that this method will be limited to using a spatial modulator that can provide a high refresh rate, a final refresh rate will be low, and transmission and calculation costs will be huge.

Cited Document 3 (Japanese Unexamined Patent Application Publication No. 2020-520475) discloses a technology that is related to a near-eye display and reproduces a light field using integral imaging provided by a display and a microlens array that are used to display an elemental image. The viewpoint density and the resolution viewpoint each have a trade-off relationship with the size of an eye-box corresponding to a range in which a viewpoint is generated. The technology reproduces a light field according to a position of an eye using eye-tracking. This results in making an eye-box range for each frame smaller, and thus in being able to improve a degree of resolution and a degree of viewpoint density. However, a range of applying the technology is limited to a near-eye display, and the technology is not applicable to an HMD that uses an ocular optical element (such as an eyepiece) without any change.

As described above, the use of a light field makes it possible to overcome VAC. However, for example, one of the viewpoint density, the resolution, an eye-box, a refresh rate, a transmission cost, and a calculation cost is sacrificed due to a large amount of information to be reproduced. Further, the use of eye-tracking makes it possible to efficiently determine an eye-box range for each frame. However, it is difficult to use, with no change, the technology disclosed in Cited Document 3 for an HMD that is a target of the present technology.

Thus, the inventors have developed a display apparatus and a display method in order to further improve the viewpoint density and the resolution, to provide a greater sense of immersion, and to further reduce rendering costs and transmission costs.

<2. Principle of Present Technology>

Figure 2:
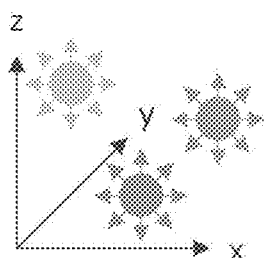
FIG. 2 A and B of FIG. 2 are diagrams used to describe a method for reproducing depth.
Figure 2:
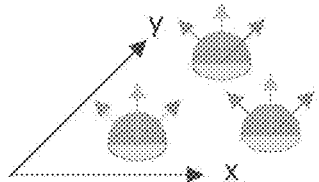

Here, approaches of reproducing depth upon performing stereoscopic display are classified into a 3D reproduction approach of reproducing 3D (x,y,z) illustrated in A of FIG. 2, and a 4D reproduction approach of reproducing 4D (x,y,u,v) illustrated in B of FIG. 2.

In the 3D reproduction approach, an amount of information can be limited to (x,y,z), and a high degree of reproducibility in depth and a higher resolution can be provided. However, this may result in making an apparatus larger in size in order to reproduce defocus. Specific examples of the 3D reproduction approach include a virtual-image-position changeable approach and a virtual-image-plane multiplexing approach.

In the 4D reproduction approach, defocus, a bidirectional reflectance distribution function (BRDF), and a specular component are reproduced. However, an amount of information is large, and there is a trade-off relationship between a high degree of reproducibility in depth and a higher resolution. Examples of the 4D reproduction approach include a light-field approach and a hologram approach.

Figure 3:
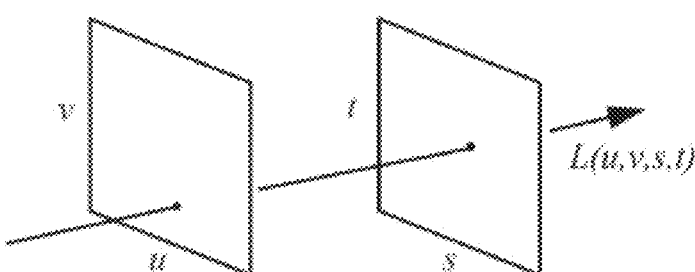
FIG. 3 is a diagram used to describe a light field (the cited paper: Marc Levoy and Pat Hanrahan, 1996, "Light Field Rendering").

The present technology adopts a light-field approach. The light-field approach is a method for expressing an intensity L of light ray using four parameters (u,v,s,t) representing a position and a direction, as illustrated in FIG. 3. The light-field approach enables four dimensions to be reproduced in an environment in which impacts of, for example, attenuation and diffraction can be ignored. When existing two-dimensional image displaying apparatuses are used for the light-field approach, there is a need to increase an amount of information corresponding to two dimensions. This has a trade-off relationship with, for example, the resolution, the temporal resolution, or the field of view.

(Basic Principle of Light Field)

Normally, innumerable light rays are incident on an eye from an object point. First, for convenience, discussion is held focused on only a principal light ray (a light ray passing through a center of a pupil) and a marginal light ray (a light ray passing through an edge of the pupil), as illustrated in A of FIG. 4. In A of FIG. 4, an eye E is focused on a point P (a principal light ray and marginal light rays from the point P are concentrated onto a retina). Thus, blurs occur at a point Q and a point R.

Figure 4:
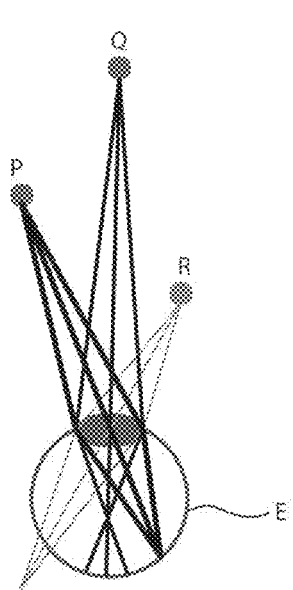
FIG. 4 A and B of FIG. 4 are diagrams used to describe a viewpoint.
Figure 4:
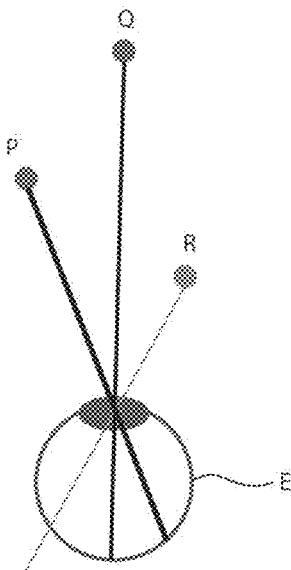

Next, discussion is held focused on only principal light rays are discussed, as illustrated in B of FIG. 4. Principal light rays from the point P, the point Q, and the point R are concentrated onto the center of the pupil of the eye E (a light path equal to a light path of a Maxwellian view), and their light concentration point is considered one viewpoint.

Figure 5:
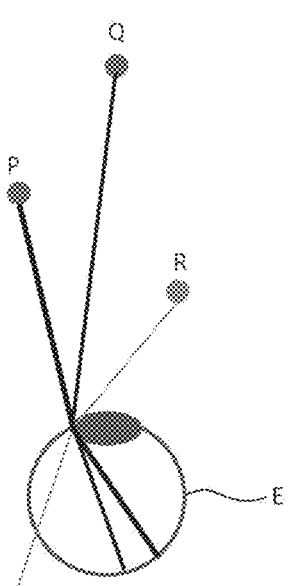
FIG. 5 A and B of FIG. 5 are diagrams used to describe a viewpoint.
Figure 5:
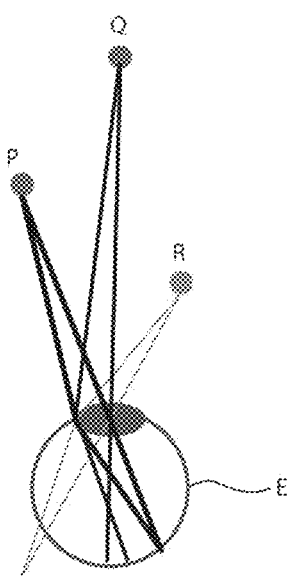

Likewise, discussion is held focused on only marginal light rays concentrated onto one edge of the pupil of the eye E from the point P, the point Q, and the point R, as illustrated in A of FIG. 5. Their light concentration point is also considered one viewpoint.

(Principle of Occurrence of Blur in Light Field)

Figure 6:
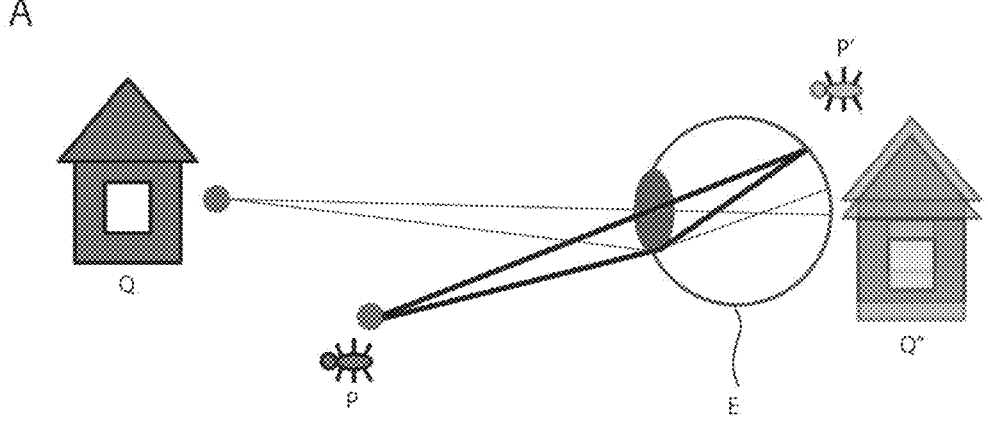
FIG. 6 A and B of FIG. 6 are diagrams used to describe a principle of occurrence of a blur when there are two viewpoints.
Figure 6:
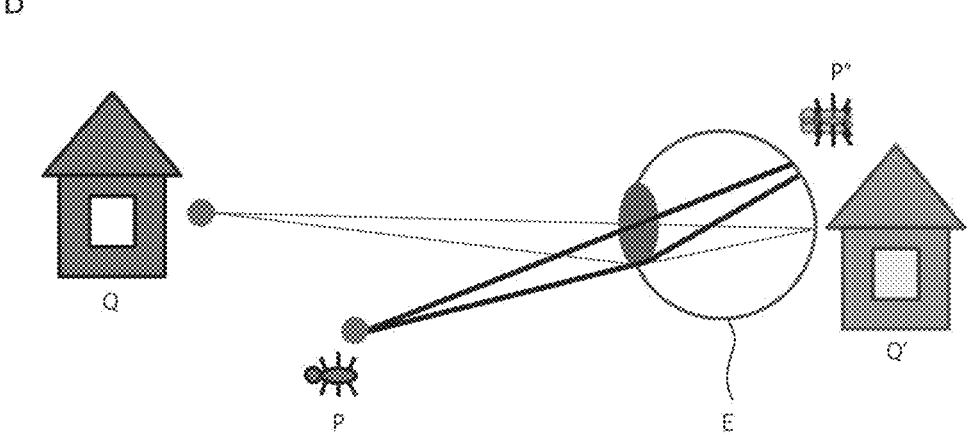

First, a principle of occurrence of a blur when there are two viewpoints is described. In A of FIG. 6, the eye E is focused on an object P. Thus, there is no blur in an image P' of the object P on the retina, whereas there is a blur in an image Q" of the object Q on the retina (the image Q" is a doubly blurred image). In B of FIG. 6, the eye E is focused on an object Q. Thus, there is no blur in an image Q' of the object Q on the retina, whereas there is a blur in an image P" of the object P on the retina (the image P" is a doubly blurred image).

Figure 7:
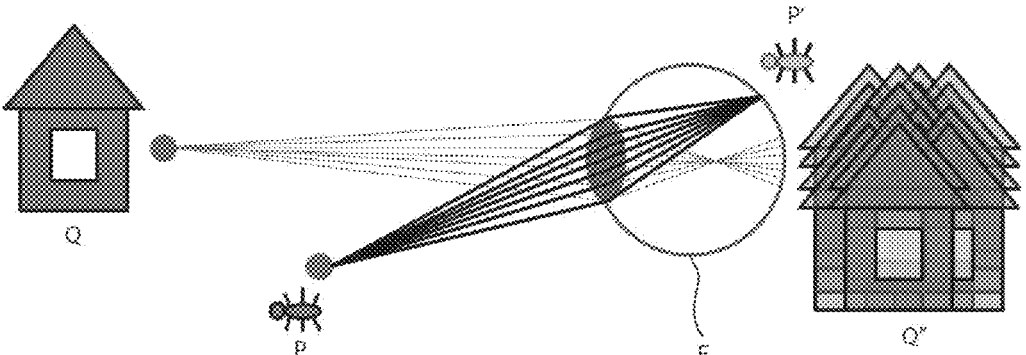
FIG. 7 is a diagram used to describe a principle of occurrence of a focus adjustment blur when there are multiple viewpoints is described.

Next, a principle of occurrence of a blur when there are multiple viewpoints is described. In FIG. 7, the eye E is focused on the object P. Thus, there is no blur in the image P' of the object P on the retina, whereas there is a blur in the image Q" of the object Q on the retina (the image Q" is a multiply blurred image).

Figure 8:
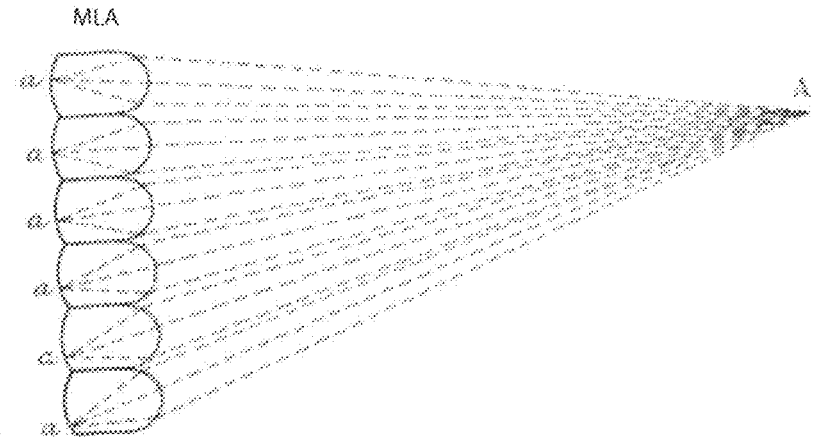
FIG. 8 schematically illustrates integral imaging (the cited paper: M. G. Lippman, 1908, "Epreuves Reversibles Donnant la Sensation du Relief").
Figure 9:
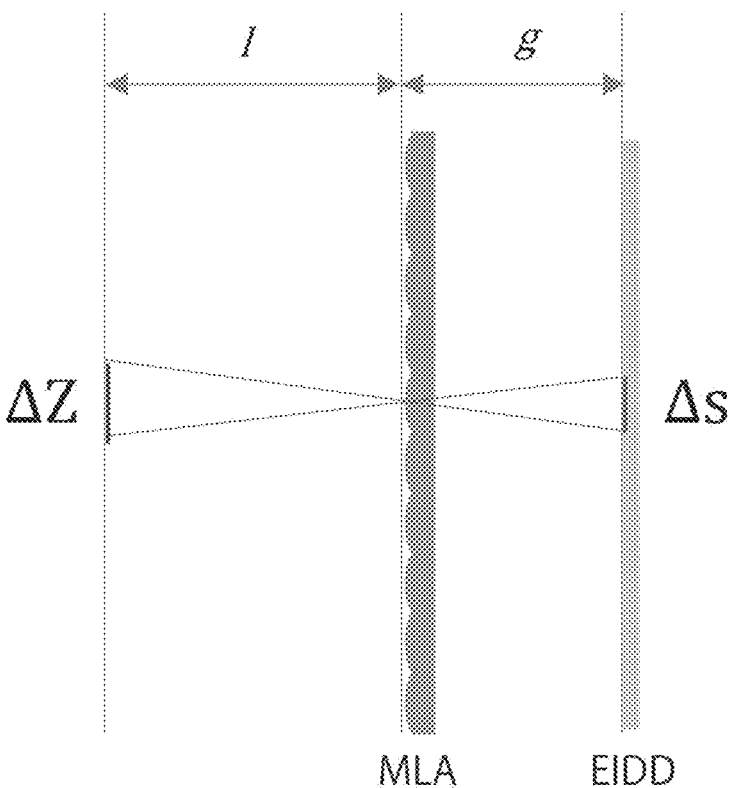
FIG. 9 illustrates a virtual pixel size of a light field.

FIG. 8 illustrates a method for reproducing a light field by integral imaging. A group of light rays that comes from each point (a) of a photographic dry plate is imaged at a viewpoint A using a corresponding lens of a microlens array MLA. This makes it possible to represent a horizontal parallax and a vertical parallax. A light field can also be reproduced by integral imaging using an elemental image displaying apparatus (a two-dimensional image displaying apparatus) instead of a photographic dry plate.

(Virtual Pixel Size of Light Field)

A virtual pixel size $\Delta Z$ of a light field (a pixel size at a viewpoint) is represented as indicated below using a distance g to an optical surface of the microlens array MLA from a display plane in which each pixel of an elemental image displaying apparatus EIDD (elemental images displayed device) is displayed in a pixel size Δs, and using a distance 1 to a plane in which a viewpoint corresponding to the pixel is generated from the optical surface of the micro-lens array MLA.

$$\Delta Z = 1/g \times \Delta s \qquad (1)$$

As can be seen from Formula (1) described above, ΔZ can be made smaller as 1 is made smaller, and thus the resolution can be made higher. However, there is a need to reduce the number $N_v$ of viewpoints represented using Formula (2) indicated below.

[Math. 1]

$$N_V \propto \frac{1}{d_v} = \frac{l}{P_{MLA} Z_{lc} \left| 1 - \frac{Z_{xp}}{f_{ep}} + \frac{Z_{xp}}{Z_{lc}} \right|} \qquad (2)$$

Note that, in Formula (2) described above, $d_v$ represents a pitch of adjacent viewpoints, PMLA represents a pitch of a microlens, and $f_{ep}$ represents a focal length of an eyepiece EP.

Note that Formula (2) described above is cited from the following papers.

Hekun Huang and Hong Hua 2019, "Generalized methods and strategies for modeling and optimizing the optics of 3D head-mounted light field displays"

Hekun Huang and Hong Hua, 2018, "High-performance integral-imaging-based light field augmented reality display using freeform optics"

As seen from Formula (1) described above, the resolution can be made higher as g is made larger. However, there is a need to reduce an eye-box size $D_v$ represented using Formula (3) indicated below.

[Math. 2]

$$D_v = P_{EI} \frac{l + Z_{lc}}{g} \left| 1 - \frac{Z_{xp}}{f_{ep}} + \frac{Z_{xp}}{l + Z_{lc}} \right| \qquad (3)$$

Note that, in Formula (3) described above, PEI represents a pitch of an elemental image.

Note that Formula (3) described above is cited from the following paper.

Hekun Huang and Hong Hua 2019, "Generalized methods and strategies for modeling and optimizing the optics of 3D head-mounted light field displays"

Respective parameters used in Formulas (2) and (3) described above are illustrated in FIGS. 13 to 15.

As described above, it is understood that, in a light field, there is a trade-off relationship between the number of viewpoints and the resolution and there is a trade-off relationship between an eye-box size and the resolution.

(Example of Generating Plurality of Viewpoints Using Single Light Field Reproducing Apparatus)

An example of reproducing a light field by integral imaging using a single light field reproducing apparatus to generate a plurality of viewpoints is described with reference to FIG. 10.

Figure 10:
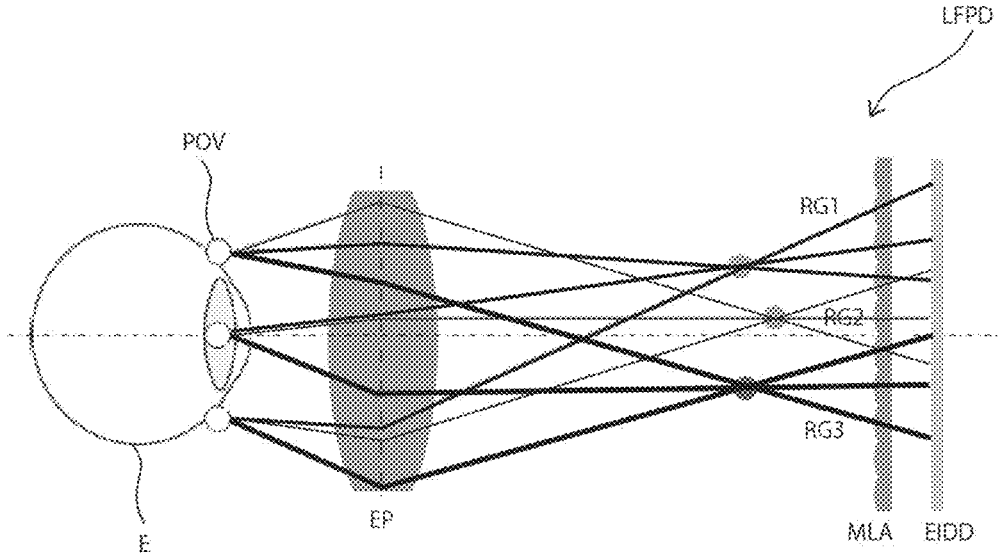
FIG. 10 is a diagram used to describe an example of generating a group of viewpoints using a single light field reproducing apparatus.

As illustrated in FIG. 10, a light field reproducing apparatus LFPD includes the elemental image displaying apparatus EIDD, the microlens array MLA, and the eyepiece EP. The elemental image displaying apparatus EIDD emits, for example, three groups RG1, RG2, and RG3 of light rays. Each group of light rays includes, for example, three light rays.

Three light rays of the group RG1 of light rays emitted from the elemental image displaying apparatus EIDD included in the light field reproducing apparatus LFPD respectively pass through corresponding lenses of the micro-phone lens array MLA and the eyepiece EP in this order to be concentrated onto different three viewpoints POV.

Three light rays of the group RG2 of light rays emitted from the elemental image displaying apparatus EIDD included in the light field reproducing apparatus LFPD respectively pass through corresponding lenses of the micro-lens array MLA and the eyepiece EP in this order to be concentrated onto the different three viewpoints POV.

Three light rays of the group RG3 of light rays emitted from the elemental image displaying apparatus EIDD included in the light field reproducing apparatus LFPD respectively pass through corresponding lenses of the micro-lens array MLA and the eyepiece EP in this order to be concentrated onto the different three viewpoints POV.

As described above, each viewpoint POV is generated by a corresponding light ray of each group of light rays. Consequently, when the eye E of a user is situated at the respective viewpoints POV, the user can view a three-dimensional image obtained by light rays of respective groups of light rays overlapping.

Note that, in this example, a single light field reproducing apparatus is used to generate a group of viewpoints. Thus, in order to increase the number of viewpoints to achieve a high degree of reproducibility in depth, the resolution of a three-dimensional image (a light field) generated by the light field reproducing apparatus is forced to be reduced.

(Example of Generating Plurality of Viewpoints Using Two Light Field Reproducing Apparatuses)

An example of reproducing a light field by integral imaging using two light field reproducing apparatuses (first and second light field reproducing apparatuses) to generate a plurality of viewpoints is described with reference to FIG. 11.

Figure 11:
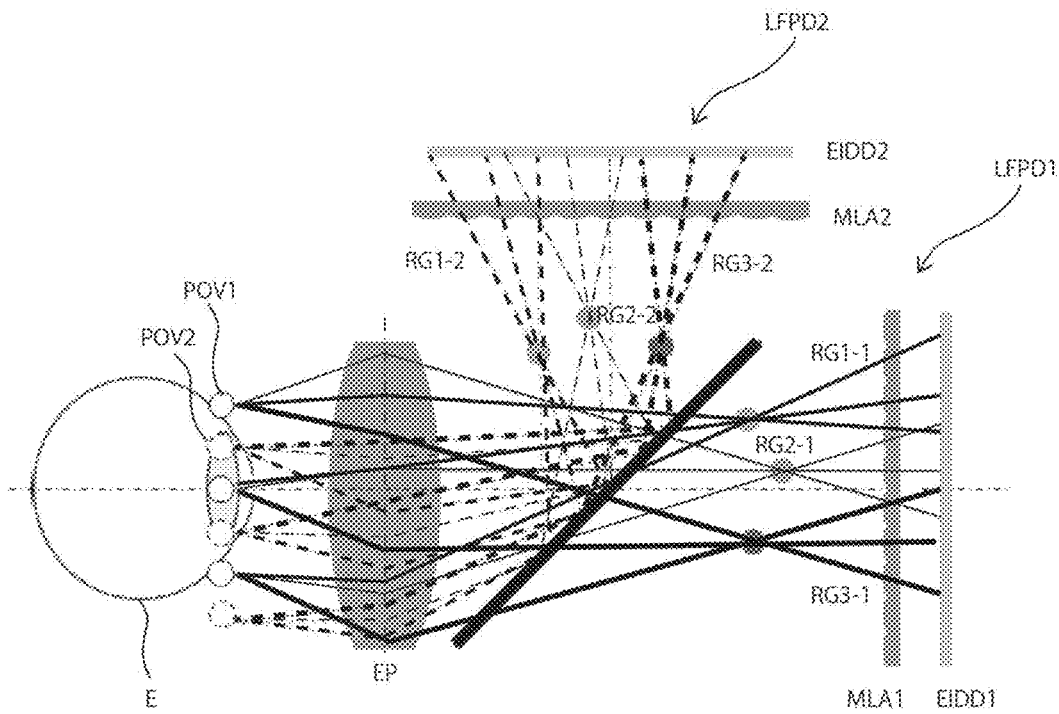
FIG. 11 is a diagram used to describe an example of generating a group of viewpoints using two light field reproducing apparatuses.

As illustrated in FIG. 11, the first light field reproducing apparatus LFPD1 includes an elemental image displaying apparatus EIDD1, a microlens array MLA1, and the eye-piece EP. The elemental image displaying apparatus EIDD1 emits, for example, three groups RG1-1, RG2-1, and RG3-1 of light rays. Each group of light rays includes, for example, three light rays.

The second light field reproducing apparatus LFPD2 includes an elemental image displaying apparatus EIDD2, a microlens array MLA2, and the eyepiece EP. The elemental image displaying apparatus EIDD2 emits, for example, three groups RG1-2, RG2-2, and RG3-2 of light rays. Each group of light rays includes, for example, three light rays.

Three light rays of the group RG1-1 of light rays emitted from the elemental image displaying apparatus EIDD1 included in the first light field reproducing apparatus LFPD1 respectively pass through corresponding lenses of the micro-phone lens array MLA1 and the eyepiece EP in this order to be concentrated onto different three viewpoints POV1.

Three light rays of the group RG2-1 of light rays emitted from the elemental image displaying apparatus EIDD1 included in the first light field reproducing apparatus LFPD1 respectively pass through corresponding lenses of the micro-phone lens array MLA1 and the eyepiece EP in this order to be concentrated onto the different three viewpoints POV1.

Three light rays of the group RG3-1 of light rays emitted from the elemental image displaying apparatus EIDD1 included in the first light field reproducing apparatus LFPD1 respectively pass through corresponding lenses of the microphone lens array MLA1 and the eyepiece EP in this order to be concentrated onto the different three viewpoints POV1.

As described above, each viewpoint POV1 is generated by a corresponding light ray of each group of light rays coming from the elemental image displaying apparatus EIDD1. Consequently, when the eye E of a user is situated at the respective viewpoints POV1, the user can view a three-dimensional image obtained by light rays of respective groups of light rays overlapping.

Three light rays of the group RG1-2 of light rays emitted from the elemental image displaying apparatus EIDD2 included in the second light field reproducing apparatus LFPD2 respectively pass through corresponding lenses of the microphone lens array MLA2 and the eyepiece EP in this order to be concentrated onto different three viewpoints POV2.

Three light rays of the group RG2-2 of light rays emitted from the elemental image displaying apparatus EIDD2 included in the second light field reproducing apparatus LFPD2 respectively pass through corresponding lenses of the microphone lens array MLA2 and the eyepiece EP in this order to be concentrated onto the different three viewpoints POV2.

Three light rays of the group RG3-2 of light rays emitted from the elemental image displaying apparatus EIDD2 included in the second light field reproducing apparatus LFPD2 respectively pass through corresponding lenses of the microphone lens array MLA2 and the eyepiece EP in this order to be concentrated onto the different three viewpoints POV2.

As described above, each viewpoint POV2 is generated by a corresponding light ray of each group of light rays coming from the elemental image displaying apparatus EIDD2. Consequently, when the eye E of a user is situated at the respective viewpoints POV2, the user can view a three-dimensional image obtained by light rays of respective groups of light rays overlapping.

In this example, two light field reproducing apparatuses are used to generate two corresponding groups of viewpoints. Thus, the number of viewpoints can be increased to achieve a high degree of reproducibility in depth without reducing the resolution of a three-dimensional image (a light field) generated by the respective light field reproducing apparatuses.

(Example of Generating Plurality of Viewpoints Using Single Light Field Reproducing Apparatus and Eye-Tracking Apparatus)

Figure 12:
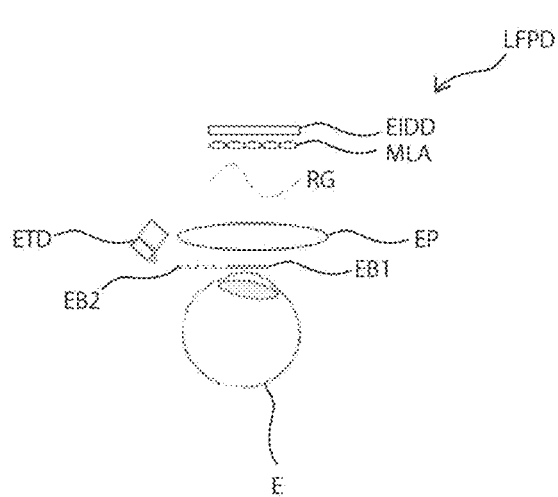
FIG. 12 A and B of FIG. 12 are diagrams used to describe an example of using a single ride field reproducing apparatus and an eye-tracking apparatus.
Figure 12:
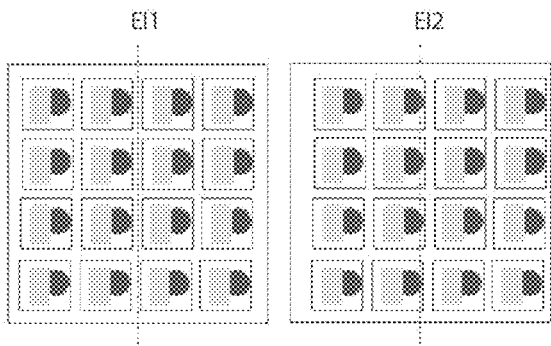

In the light field reproducing apparatus LFPD illustrated in A of FIG. 12, each light ray of the group RG of light rays being emitted from the elemental image displaying apparatus EIDD to pass through the microlens array MLA passes through the eyepiece EP to be concentrated onto a corresponding viewpoint near the eye E. Here, an orientation of an eyeball E is detected by an eye-tracking apparatus ETD, and display of an elemental image that is performed by the elemental image displaying apparatus EIDD is controlled according to a result of the detection. Consequently, the resolution of a three-dimensional image generated by the light field reproducing apparatus LFPD can be increased without reducing the number of viewpoints.

Specifically, for example, EI1 (refer to B of FIG. 12) is an elemental image that is displayed when the eye E faces the front (when the eye E faces the light field reproducing apparatus LFPD), and EI2 (refer to B of FIG. 12) is an elemental image that is displayed upon rotation of the eye E at a position depending on a position of the eye E after being rotated. A of FIG. 12 illustrates an eye-box EB2 obtained when the elemental image EI2 is displayed, where an eye-box EB1 obtained when the elemental image EI1 is displayed is shifted by the entirety of the image to obtain the eye-box EB2. B of FIG. 12 illustrates the elemental image EI2 obtained by the elemental image EI1 being slightly shifted (by, for example, an amount less than one pixel).

(Eye-Box Size when Only Single Light Field Reproducing Apparatus is Used)

Figure 13:
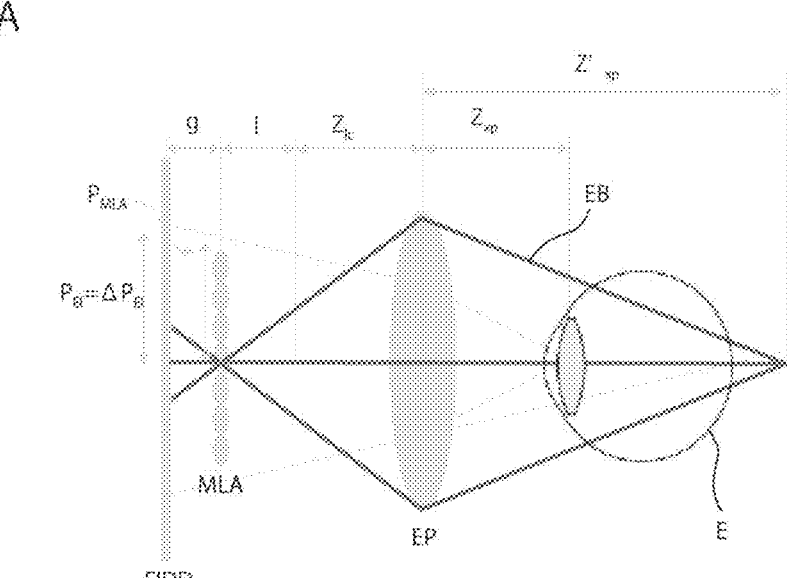
FIG. 13 A and B of FIG. 13 are diagrams used to describe a size of an eye-box when only a single light field reproducing apparatus is used.
Figure 14:
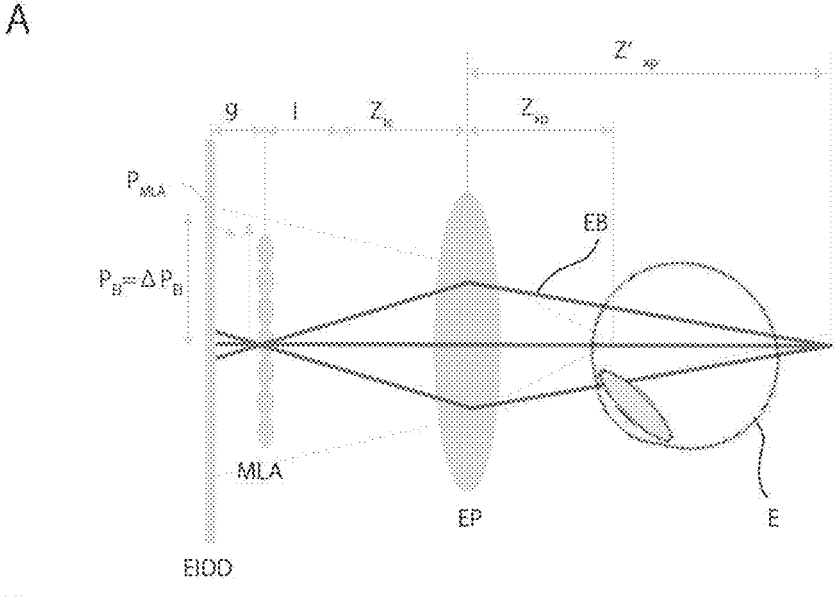
FIG. 14 A and B of FIG. 14 are diagrams used to describe the size of the eye-box when a single light field reproducing apparatus and an eye-tracking apparatus are used.
Figure 14:
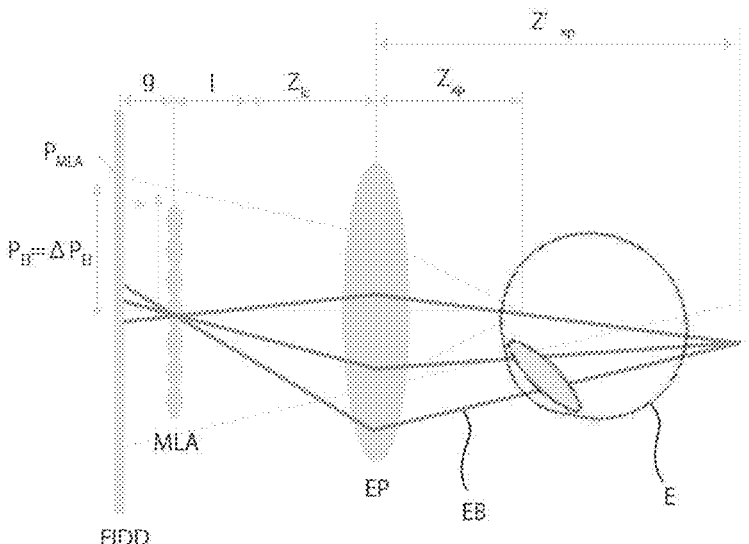

When an eye-tracking apparatus is not used, there is a need to make an eye-box EB larger in size such that a pupil of the eye E is situated within the eye-box EB regardless of an orientation of the eye E, as illustrated in A and B of FIG. 13.

(Eye-Box Size when Single Light Field Reproducing Apparatus and Eye-Tracking Apparatus are Used)

The case in which an eye-tracking apparatus is used is discussed. Even when the eye E is rotated so that the pupil nearly goes beyond the eye-box EB, as illustrated in A of FIG. 14, the eye-box EB is generated at a position depending on an orientation of the eye E that is detected by the eye-tracking apparatus, as illustrated in B of FIG. 14. Accordingly, the pupil of the eye E can be situated within the eye-box EB.

(How to Obtain Amount of Shift of Elemental Image Depending on Rotation of Eye)

Figure 15:
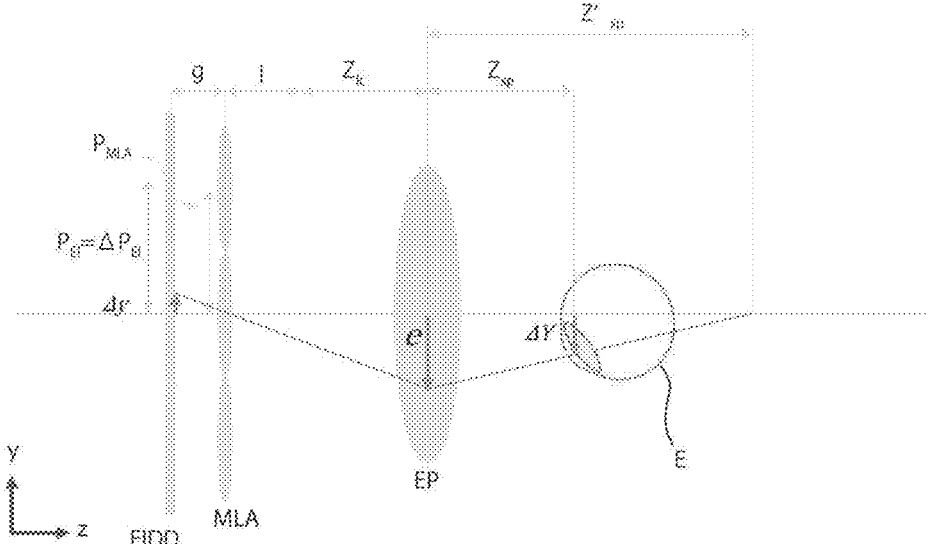
FIG. 15 is a diagram used to describe a method for calculating an amount of shift of a position of a center of an elemental image.

An amount $\Delta y$ of shift of an elemental image relative to an amount $\Delta Y$ of movement of the eye E when eye-tracking is performed, as illustrated in FIG. 15, can be obtained using Formula (4) indicated below.

[Math. 3]

$$\Delta y = -\Delta Y \left| \frac{f_{ep} g}{(f_{ep} - Z_{xp})(l + Z_{lc}) - Z_{xp} f_{ep}} \right| \tag{4}$$

Note that, in Formula (4) described above, $f_{ep}$ represents a focal length of the eyepiece EP.

<3. Display Apparatuses of Embodiments of Present Technology>

Display apparatuses of first to fourteenth examples of embodiments of the present technology are described below.

(1) Display Apparatus of First Example

[Configuration of Display Apparatus]

Figure 16:
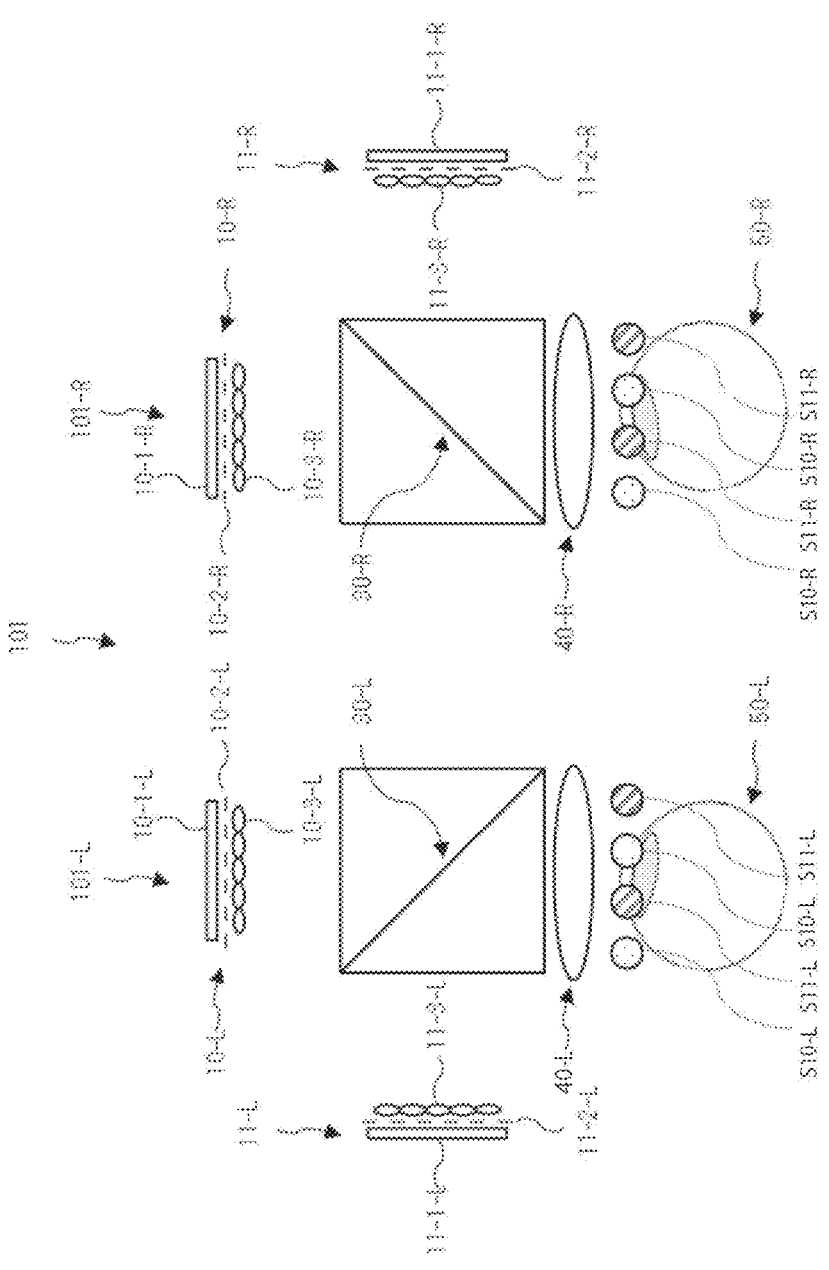
FIG. 16 illustrates a configuration of a display apparatus of a first example of an embodiment of the present technology.

FIG. 16 schematically illustrates a basic configuration of a display apparatus 101 of the first example. As illustrated in FIG. 16, the display apparatus 101 includes a left-eye display apparatus 101-L and a right-eye display apparatus 101-R. For example, the display apparatuses 101-L and 101-R in the display apparatus 1 are symmetrically laid out. The display apparatus 101 is, for example, a head-mounted display apparatus (HMD) used by being worn on a head of a user. For example, the display apparatus 101 is used to provide VR to a user.

The display apparatus 101 includes a plurality of (for example, two) three-dimensional image displaying apparatuses corresponding to each of two eyes of a user.

In particular, the display apparatus 101-L includes first and second three-dimensional image displaying apparatuses 10-L and 11-L that correspond to a left eye 50-L of the user. The display apparatus 101-R includes first and second three-dimensional image displaying apparatuses 10-R and 11-R that correspond to a right eye 50-R of the user.

The display apparatus 101 includes group-of-viewpoints generation systems that each generate a group of viewpoints for a corresponding one of the two eyes of the user using a group of light rays emitted from each one of a plurality of (for example, two) three-dimensional image displaying apparatuses corresponding to the eye.

In particular, a group-of-viewpoints generation system of the display apparatus 101-L generates a first group of viewpoints for the left eye 50-L of the user using a group of light rays emitted from the first three-dimensional image displaying apparatus 10-L, the first group of viewpoints including a plurality of viewpoints S10-L. The group-of-viewpoints generation system of the display apparatus 101-L generates a second group of viewpoints for the left eye 50-L of the user using a group of light rays emitted from the second three-dimensional image displaying apparatus 11-L, the second group of viewpoints including a plurality of viewpoints S11-L.

A group-of-viewpoints generation system of the display apparatus 101-R generates a first group of viewpoints for the right eye 50-R of the user using a group of light rays emitted from the first three-dimensional image displaying apparatus 10-R, the first group of viewpoints including a plurality of viewpoints S10-R. The group-of-viewpoints generation system of the display apparatus 101-R generates a second group of viewpoints for the right eye 50-R of the user using a group of light rays emitted from the second three-dimensional image displaying apparatus 11-R, the second group of viewpoints including a plurality of viewpoints S11-R.

For example, structural elements of each of the group-of-viewpoints generation systems of the display apparatuses 101-L and 101-R are provided to a frame of glasses used by being worn on the head of the user.

(Three-Dimensional Image Displaying Apparatus)

The first three-dimensional image displaying apparatus 10-L of the display apparatus 101L includes an elemental image displaying apparatus 10-1-L and a microlens array 10-3-L.

The second three-dimensional image displaying apparatus 11-L of the display apparatus 101L includes an elemental image displaying apparatus 11-1-L and a microlens array 11-3-L.

The first three-dimensional image displaying apparatus 10-R of the display apparatus 101R includes an elemental image displaying apparatus 10-1-R and a microlens array 10-3-R.

The second three-dimensional image displaying apparatus 11-R of the display apparatus 101R includes an elemental image displaying apparatus 11-1-R and a microlens array 11-3-R.

In other words, each three-dimensional image displaying apparatus is, for example, a light field reproducing apparatus that reproduces a light field by an integral-imaging approach.

Each elemental image displaying apparatus is a two-dimensional image displaying apparatus, and includes, for example, a self-luminous display element. The display element may include, for example, a light-emitting diode (LED) array or an organic light-emitting diode (OLED) array.

Each elemental image displaying apparatus is a two-dimensional image displaying apparatus, and may include, for example, a light source and a spatial modulator. The light source may be, for example, a light-emitting diode (LED), an organic light-emitting diode (OLED), an organic electroluminescence (EL) element, or a cold-cathode tube. The spatial modulator may be, for example, a liquid crystal element (such as a liquid crystal display (LCD)). The spatial modulator may be transmissive (may be, for example, a transmissive liquid crystal element).

The first three-dimensional image displaying apparatus 10-L of the display apparatus 101L further includes an aperture array 10-2-L that is arranged between the elemental image displaying apparatus 10-1-L and the microlens array 10-3-L.

The second three-dimensional image displaying apparatus 11-L of the display apparatus 101L further includes an aperture array 11-2-L that is arranged between the elemental image displaying apparatus 11-1-L and the microlens array 11-3-L.

The first three-dimensional image displaying apparatus 10-R of the display apparatus 101R further includes an aperture array 10-2-R that is arranged between the elemental image displaying apparatus 10-1-R and the microlens array 10-3-R.

The second three-dimensional image displaying apparatus 11-R of the display apparatus 101L further includes an aperture array 11-2-R that is arranged between the elemental image displaying apparatus 11-1-R and the microlens array 11-3-R.

Each light ray of a group of light rays emitted from the elemental image displaying apparatus of each of the first and second three-dimensional image displaying apparatuses 10-L and 11-L of the display apparatus 101L is incident on a corresponding microlens array through a corresponding aperture array, and the light rays are concentrated into innumerable points that form a 3D space. After that, the light rays are incident on a first optical system described later.

Each light ray of a group of light rays emitted from the elemental image displaying apparatus of each of the first and second three-dimensional image displaying apparatuses 10-R and 11-R of the display apparatus 101R is incident on a corresponding microlens array through a corresponding aperture array, and the light rays are concentrated into innumerable points that form a 3D space. After that, the light rays are incident on a second optical system described later.

A plurality of three-dimensional image displaying apparatuses of the display apparatus 101-L includes at least one pair (for example, one pair) of first and second three-dimensional image displaying apparatuses 10-L and 11-L, where a direction in which a group of light rays is emitted from the first three-dimensional image displaying apparatus 10-L and a direction in which a group of light rays is emitted from the second three-dimensional image displaying apparatus 11-L intersect. Specifically, a first emission direction that is the direction in which a group of light rays coming from the first three-dimensional image displaying apparatus 10-L is emitted is oriented toward the left eye 50-L, and a second emission direction that is the direction in which a group of light rays coming from the second three-dimensional image displaying apparatus 11-L is emitted is substantially orthogonal to the first emission direction.

A plurality of three-dimensional image displaying apparatuses of the display apparatus 101-R includes at least one pair (for example, one pair) of first and second three-dimensional image displaying apparatuses 10-R and 11-R, where a direction in which a group of light rays is emitted from the first three-dimensional image displaying apparatus 10-R and a direction in which a group of light rays is emitted from the second three-dimensional image displaying apparatus 11-R intersect. Specifically, a third emission direction that is the direction in which a group of light rays coming from the first three-dimensional image displaying apparatus 10-R is emitted is oriented toward the right eye 50-R, and a fourth emission direction that is the direction in which a group of light rays coming from the second three-dimensional image displaying apparatus 11-R is emitted is substantially orthogonal to the third emission direction.

(Optical System)

The group-of-viewpoints generation system of the display apparatus 101-L includes the first optical system guiding a group of light rays coming from the first three-dimensional image displaying apparatus 10-L and a group of light rays coming from the second three-dimensional image displaying apparatus 11-L.

The first optical system includes an optical element 30-L that aligns a traveling direction of a first group of light rays and a traveling direction of a second group of light rays, the first group of light rays being a group of light rays coming from the first three-dimensional image displaying apparatus 10-L, the second group of light rays being a group of light rays coming from the second three-dimensional image displaying apparatus 11-L. The optical element 30-L aligns the traveling directions of the incident first and second groups of light rays in a direction toward the left eye 50-L. For example, the optical element 30-L is a beam splitter. The beam splitter is, for example, a semitransparent mirror. Note that, for example, a polarization beam splitter may be used as the beam splitter. Note that, in this case, there is a need to cause a polarization direction of a group of light rays coming from the first three-dimensional image displaying apparatus 10-L and a polarization direction of a group of light rays coming from the second three-dimensional image displaying apparatus 11-L to be orthogonal to each other.

Note that a group of light rays of unpolarized light may be incident on a polarization beam splitter. In this case, 50% of a group of light rays coming from each three-dimensional image displaying apparatus is transmitted through or reflected off the polarization beam splitter.

The first optical system further includes an ocular optical element 40-L on which the first and second groups of light rays coming from the optical element 30-L are incident. The ocular optical element 40-L is, for example, an eyepiece.

In the first optical system, a portion of the first group of light rays coming from the first three-dimensional image displaying apparatus 10-L that is transmitted through the optical element 30-L to pass through the ocular optical element 40-L generates the first group of viewpoints including a plurality of viewpoints S10-L.

In the first optical system, a portion of the second group of light rays coming from the second three-dimensional image displaying apparatus 11-L that is reflected off the optical element 30-L to pass through the ocular optical element 40-L generates the second group of viewpoints including a plurality of viewpoints S11-L.

The group-of-viewpoints generation system of the display apparatus 101-R includes the second optical system guiding a group of light rays coming from the first three-dimensional image displaying apparatus 10-R and a group of light rays coming from the second three-dimensional image displaying apparatus 11-R.

The second optical system includes an optical element 30-R that aligns a traveling direction of a first group of light rays and a traveling direction of a second group of light rays, the first group of light rays being a group of light rays coming from the first three-dimensional image displaying apparatus 10-R, the second group of light rays being a group of light rays coming from the second three-dimensional image displaying apparatus 11-R. The optical element 30-R aligns the traveling directions of the incident first and second groups of light rays in a direction toward the right eye 50-R. For example, the optical element 30-R is a beam splitter. The beam splitter is, for example, a semitransparent mirror. Note that, for example, a polarization beam splitter may be used as the beam splitter. Note that, in this case, there is a need to cause a polarization direction of a group of light rays coming from the first three-dimensional image displaying apparatus 10-R and a polarization direction of a group of light rays coming from the second three-dimensional image displaying apparatus 11-R to be orthogonal to each other.

Note that a group of light rays of unpolarized light may be incident on a polarization beam splitter. In this case, 50% of a group of light rays coming from each three-dimensional image displaying apparatus is transmitted through or reflected off the polarization beam splitter.

The second optical system further includes an ocular optical element 40-R on which the first and second groups of light rays coming from the optical element 30-R are incident. The ocular optical element 40-R is, for example, an eyepiece.

In the second optical system, a portion of the first group of light rays coming from the first three-dimensional image displaying apparatus 10-R that is transmitted through the optical element 30-R to pass through the ocular optical element 40-R generates the first group of viewpoints including a plurality of viewpoints S10-R.

In the second optical system, a portion of the second group of light rays coming from the second three-dimensional image displaying apparatus 11-L that is reflected off the optical element 30-R to pass through the ocular optical element 40-R generates the second group of viewpoints including a plurality of viewpoints S11-R.

Here, the first and second groups of viewpoints generated by the display apparatus 101-L do not overlap. In other words, the first and second groups of viewpoints are generated by the display apparatus 101-L at different positions. Specifically, the viewpoint S11-L of the second group of viewpoints is generated between two adjacent viewpoints S10-L of the first group of viewpoints. In particular, the viewpoint S10-L of the first group of viewpoints and the viewpoint S11-L of the second group of viewpoints are generated to be arranged alternately. Note that it is sufficient if the first and second groups of viewpoints do not overlap, and the viewpoint S10-L of the first group of viewpoints and the viewpoint S11-L of the second group of viewpoints do not necessarily have to be generated to be arranged alternatively.

Here, the viewpoints S10-L of a plurality of viewpoints S10-L of the first group of viewpoints are arranged at a specified pitch and the viewpoints S11-L of a plurality of viewpoints S11-L of the second group of viewpoints are arranged at the specified pitch. This results in the viewpoints S10-L and S11-L adjacent to each other being arranged at a constant pitch. However, the pitch between the viewpoints S10-L and S11-L adjacent to each other is not limited to thereto. For example, the viewpoints S10-L and S11-L adjacent to each other do not necessarily have to be arranged at a constant pitch. In this case, the viewpoints S10-L and S11-L adjacent to each other may be arranged at a regular or random pitch.

Likewise, the first and second groups of viewpoints generated by the display apparatus 101-R do not overlap. The first and second groups of viewpoints are generated by the display apparatus 101-R at different positions. Specifically, the viewpoint S10-R of the first group of viewpoints and the viewpoint S11-R of the second group of viewpoints are generated to be arranged alternately. Note that it is sufficient if the first and second groups of viewpoints do not overlap, and the viewpoint S10-R of the first group of viewpoints and the viewpoint S11-R of the second group of viewpoints do not necessarily have to be generated to be arranged alternatively.

Here, the viewpoints S10-R of a plurality of viewpoints S10-R of the first group of viewpoints are arranged at a specified pitch and the viewpoints S11-R of a plurality of viewpoints S11-R of the second group of viewpoints are arranged at the specified pitch. This results in the viewpoints S10-R and S11-R adjacent to each other being arranged at a constant pitch. However, the pitch between the viewpoints S10-R and S11-R adjacent to each other is not limited to thereto. For example, the viewpoints S10-R and S11-R adjacent to each other do not necessarily have to be arranged at a constant pitch. In this case, the viewpoints S10-R and S11-R adjacent to each other may be arranged at a regular or random pitch.

The display apparatus 101-L generates, in a range corresponding to a pupil diameter of the left eye 50-L, at least two viewpoints S10-L and S11-L from among a plurality of viewpoints included in the first and second groups of viewpoints.

The display apparatus 101-R generates, in a range corresponding to a pupil diameter of the right eye 50-R, at least two viewpoints S10-R and S11-R from among a plurality of viewpoints included in the first and second groups of viewpoints.

[Operation Performed by Display Apparatus]

In the display apparatus 101L, the first group of light rays emitted from the first three-dimensional image displaying apparatus 10-L passes through the optical element 30-L and the ocular optical element 40-L in this order to be incident on the left eye 50-L of the user. Here, the first group of light rays generates, in a pupil plane of the left eye 50-L, the first group of viewpoints including a plurality of viewpoints S10-L.

In the display apparatus 101L, the second group of light rays emitted from the second three-dimensional image displaying apparatus 11-L passes through the optical element 30-L and the ocular optical element 40-L in this order to be incident on the left eye 50-L of the user. Here, the second group of light rays generates, in the pupil plane of the left eye 50-L, the second group of viewpoints including a plurality of viewpoints S11-L.

In the display apparatus 101R, the first group of light rays emitted from the first three-dimensional image displaying apparatus 10-R passes through the optical element 30-R and the ocular optical element 40-R in this order to be incident on the right eye 50-R of the user. Here, the first group of light rays generates, in a pupil plane of the right eye 50-R, the first group of viewpoints including a plurality of viewpoints S10-R.

In the display apparatus 101R, the second group of light rays emitted from the second three-dimensional image displaying apparatus 11-R passes through the optical element 30-R and the ocular optical element 40-R in this order to be incident on the right eye 50-R of the user. Here, the second group of light rays generates, in the pupil plane of the right eye 50-R, the second group of viewpoints including a plurality of viewpoints S11-R.

As described above, the display apparatus 101 is used to perform a display method including generating, using a group of light rays, a group of viewpoints for each of two eyes of a user, the group of light rays being emitted from each of the first and second three-dimensional image displaying apparatuses corresponding to the eye.

[Effects Provided by Display Apparatus]

Here, in general, a three-dimensional image displaying apparatus can achieve a high degree of reproducibility in the depth of a three-dimensional space reproduced in a light field by increasing a viewpoint density in a pupil plane of an eye. However, there is a trade-off relationship between the viewpoint density and the resolution in vertical and horizontal directions of a three-dimensional space. Thus, the resolution is reduced as the viewpoint density is increased.

According to the display apparatus 101 of the first example, groups of viewpoints are generated at different positions by the first and second three-dimensional image displaying apparatuses corresponding to each of two eyes. This makes it possible to reduce the viewpoint density of a group of viewpoints generated by each three-dimensional image displaying apparatus, while maintaining a high viewpoint density in a pupil plane of a corresponding one of the two eyes (while maintaining a high degree of reproducibility in depth). Further, consequently, the resolution of a light field reproduced by each three-dimensional image displaying apparatus can be improved.

Compared to the technologies disclosed in Patent Literature 1 and Cited Documents 1 to 3 and described above as HMDs enabling a decrease in VAC, the display apparatus 101 of the first example can achieve a high viewpoint density and a high resolution at the same time without restricting the field of view in a relatively simple configuration without, for example, a drive section. Further, the resolution of a displayed image is about twice as high at most. Thus, transmission costs and calculation costs can be reduced without affecting a refresh rate.

Consequently, the display apparatus 101 of the first example makes it possible to display a three-dimensional image at a high resolution with a high degree of reproducibility in depth without restricting the field of view.

(2) Display Apparatus of Second Example

[Configuration of Display Apparatus]

Figure 17:
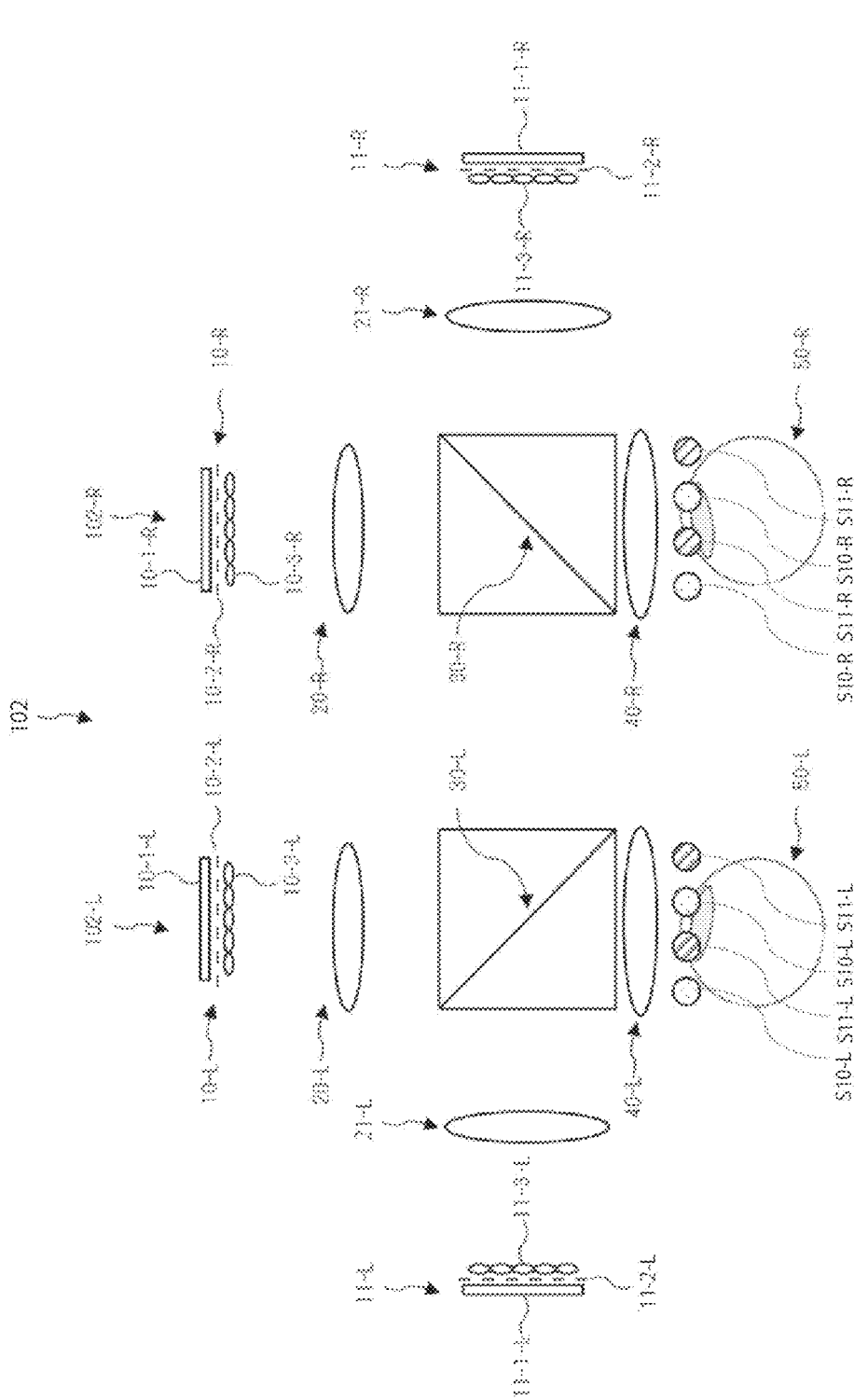
FIG. 17 illustrates a configuration of a display apparatus of a second example of an embodiment of the present technology.

FIG. 17 schematically illustrates a basic configuration of a display apparatus 102 of the second example. The display apparatus 102 includes a left-eye display apparatus 102-L and a right-eye display apparatus 102-R. The display apparatuses 102-L and 102-R in the display apparatus 102 are symmetrically laid out. The display apparatus 102 is, for example, a head-mounted display apparatus (HMD) used by being worn on a head of a user. For example, the display apparatus 102 is used to provide VR to a user.

As illustrated in FIG. 17, the display apparatus 102 of the second example has a configuration that is similar to the configuration of the display apparatus 101 of the first example except that an optical system (a first optical system) of the display apparatus 102-L includes a first relay optical system 20-L and a second relay optical system 21-L, and except that an optical system (a second optical system) of the display apparatus 102-R includes a first relay optical system 20-R and a second relay optical system 21-R.

The first relay optical system 20-L is arranged between the first three-dimensional image displaying apparatus 10-L and the optical element 30-L to generate an intermediate image of the first group of light rays coming from the first three-dimensional image displaying apparatus 10-L.

The second relay optical system 21-L is arranged between the second three-dimensional image displaying apparatus 11-L and the optical element 30-L to generate an intermediate image of the second group of light rays coming from the second three-dimensional image displaying apparatus 11-L.

The first relay optical system 20-R is arranged between the first three-dimensional image displaying apparatus 10-R and the optical element 30-R to generate an intermediate image of the first group of light rays coming from the first three-dimensional image displaying apparatus 10-R.

The second relay optical system 21-R is arranged between the second three-dimensional image displaying apparatus 11-R and the optical element 30-R to generate an intermediate image of the second group of light rays coming from the second three-dimensional image displaying apparatus 11-R.

For example, each relay optical system in the display apparatus 102 includes a relay lens including at least one lens element.

[Operation Performed by Display Apparatus]

In the display apparatus 102-L, the first group of light rays emitted from the first three-dimensional image displaying apparatus 10-L passes through the first relay optical system 20-L, the optical element 30-L, and the ocular optical element 40-L in this order to be incident on the left eye 50-L of the user. Here, the first group of light rays generates, in a pupil plane of the left eye 50-L, a first group of viewpoints including a plurality of viewpoints S10-L.

In the display apparatus 102-L, the second group of light rays emitted from the second three-dimensional image displaying apparatus 11-L passes through the second relay optical system 21-L, the optical element 30-L, and the ocular optical element 40-L in this order to be incident on the left eye 50-L of the user. Here, the second group of light rays generates, in the pupil plane of the left eye 50-L, a second group of viewpoints including a plurality of viewpoints S11-L.

In the display apparatus 102-R, the first group of light rays emitted from the first three-dimensional image displaying apparatus 10-R passes through the first relay optical system 20-R, the optical element 30-R, and the ocular optical element 40-R in this order to be incident on the right eye 50-R of the user. Here, the first group of light rays generates, in a pupil plane of the right eye 50-R, a first group of viewpoints including a plurality of viewpoints S10-R.

In the display apparatus 102-R, the second group of light rays emitted from the second three-dimensional image displaying apparatus 11-R passes through the second relay optical system 21-R, the optical element 30-R, and the ocular optical element 40-R in this order to be incident on the right eye 50-R of the user. Here, the second group of light rays generates, in the pupil plane of the right eye 50-R, a second group of viewpoints including a plurality of viewpoints S11-R.

As described above, the display apparatus 102 is used to perform a display method including generating, using a group of light rays, a group of viewpoints for each of two eyes of a user, the group of light rays being emitted from each of the first and second three-dimensional image displaying apparatuses corresponding to the eye.

[Effects Provided by Display Apparatus]

The display apparatus 102 of the second example makes it possible to obtain effects that are similar to the effects provided by the display apparatus 101 of the first example. Further, the provision of a relay lens between each three-dimensional image displaying apparatus and a corresponding optical element makes it possible to correct for various aberrations that are not corrected for only using an eyepiece, although there is a possibility that an optical system will be made larger in size. This results in being able to provide a high-quality three-dimensional image to a user. Furthermore, the provision of a relay lens makes it possible to make a light path longer, and thus to easily place, for example, various filters in the light path.

Note that the display apparatus 102-L may only include one of the first and second relay optical systems 20-L and 21-L. The display apparatus 102-R may only include one of the first and second relay optical systems 20-R and 21-R.

(3) Display Apparatus of Third Example

[Configuration of Display Apparatus]

Figure 18:
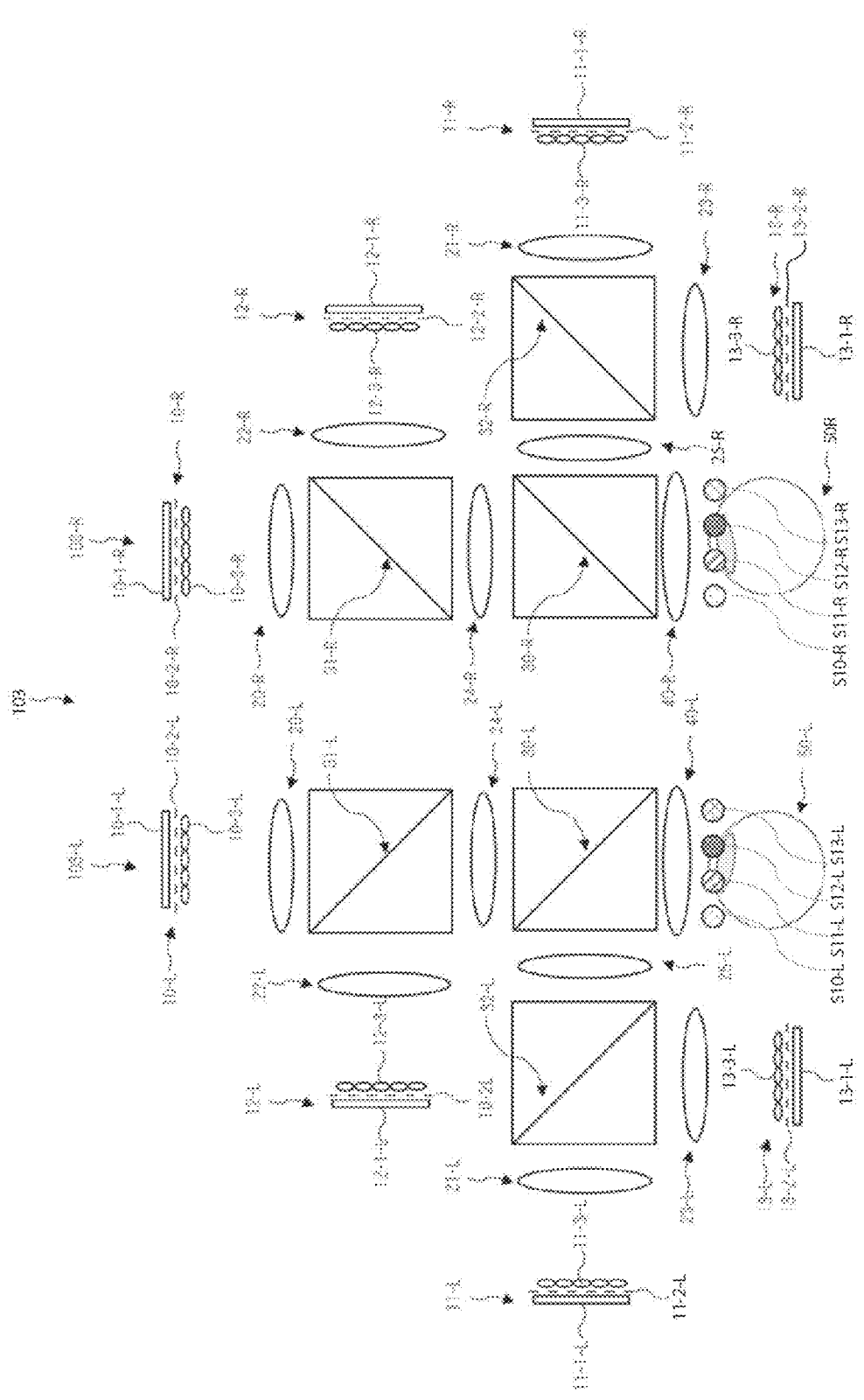
FIG. 18 illustrates a configuration of a display apparatus of a third example of an embodiment of the present technology.

FIG. 18 schematically illustrates a basic configuration of a display apparatus 103 of the third example. The display apparatus 103 includes a left-eye display apparatus 103-L and a right-eye display apparatus 103-R. The display apparatuses 103-L and 103-R in the display apparatus 103 are symmetrically laid out. The display apparatus 103 is, for example, a head-mounted display apparatus (HMD) used by being worn on a head of a user. For example, the display apparatus 103 is used to provide VR to a user.

As illustrated in FIG. 18, in the display apparatus 103 of the third example, the display apparatus 103-L corresponding to the left eye 50-L includes a plurality of three-dimensional image displaying apparatuses including a plurality of pairs (for example, two pairs) of first and second three-dimensional image displaying apparatuses, and the display apparatus 103-R corresponding to the right eye 50-R includes a plurality of three-dimensional image displaying apparatuses including a plurality of pairs (for example, two pairs) of first and second three-dimensional image displaying apparatuses. In particular, the display apparatus 103-L includes a pair of first and second three-dimensional image displaying apparatuses 10-L and 12-L, and a pair of first and second three-dimensional image displaying apparatuses 13-L and 11-L. The display apparatus 103-R includes a pair of first and second three-dimensional image displaying apparatuses 10-R and 12-R, and a pair of first and second three-dimensional image displaying apparatuses 13-R and 11-R.

For example, the second three-dimensional image displaying apparatus 12-L of the display apparatus 103L includes an elemental image displaying apparatus 12-1-L, a microlens array 12-3-L, and an aperture array 10-2-L that is arranged between the elemental image displaying apparatus 12-1-L and the microlens array 12-3-L.

For example, the first three-dimensional image displaying apparatus 13-L of the display apparatus 103L includes an elemental image displaying apparatus 13-1-L, a microlens array 13-3-L, and an aperture array 13-2-L that is arranged between the elemental image displaying apparatus 13-1-L and the microlens array 13-3-L.

For example, the first three-dimensional image displaying apparatus 12-R of the display apparatus 103R includes an elemental image displaying apparatus 12-1-R, a microlens array 12-3-R, and an aperture array 12-2-R that is arranged between the elemental image displaying apparatus 12-1-R and the microlens array 12-3-R.

For example, the second three-dimensional image displaying apparatus 13-R of the display apparatus 103L includes an elemental image displaying apparatus 13-1-R, a microlens array 13-3-R, and an aperture array 13-2-R that is arranged between the elemental image displaying apparatus 13-1-R and the microlens array 13-3-R.

In the display apparatus 103-L, a first optical element that aligns a traveling direction of a group of light rays coming from the first three-dimensional image displaying apparatus, and a traveling direction of a group of light rays coming from the second three-dimensional image displaying apparatus, is provided for each of the plurality of pairs of the first and second three-dimensional image displaying apparatuses.

In particular, a first optical element 31-L is provided for the pair of first and second three-dimensional image displaying apparatuses 10-L and 12-L, and a first optical element 32-L is provided for the pair of first and second three-dimensional image displaying apparatuses 13-L and 11-L.

The display apparatus 103-L includes the first relay optical system 20-L between the first three-dimensional image displaying apparatus 10-L and the first optical element 31-L, includes a second relay optical system 22-L between the second three-dimensional image displaying apparatus 12-L and the first optical element 31-L, includes a first relay optical system 23-L between the first three-dimensional image displaying apparatus 13-L and the first optical element 32-L, and includes the second relay optical system 21-L between the second three-dimensional image displaying apparatus 11-L and the second optical element 32-L.

In the display apparatus 103-R, a first optical element that aligns a traveling direction of a group of light rays coming from the first three-dimensional image displaying apparatus, and a traveling direction of a group of light rays coming from the second three-dimensional image displaying apparatus, is provided for each of the plurality of pairs of the first and second three-dimensional image displaying apparatuses. In particular, a first optical element 31-R is provided for the pair of first and second three-dimensional image displaying apparatuses 10-R and 12-R, and a first optical element 32-R is provided for the pair of first and second three-dimensional image displaying apparatuses 13-R and 11-R.

The display apparatus 103-R includes the first relay optical system 20-R between the first three-dimensional image displaying apparatus 10-R and the first optical element 31-R, includes a second relay optical system 22-R between the second three-dimensional image displaying apparatus 12-R and the first optical element 31-R, includes a first relay optical system 23-R between the first three-dimensional image displaying apparatus 13-R and the first optical element 32-R, and includes the second relay optical system 21-R between the second three-dimensional image displaying apparatus 11-R and the second optical element 32-R.

In the display apparatus 103-L, a traveling direction of a pair of groups of light rays and a traveling direction of another pair of groups of light rays intersect, the pair of groups of light rays including first and second groups of light rays coming from one of a plurality of (for example, two) first optical elements, the other pair of groups of light rays including first and second groups of light rays coming from another of the plurality of first optical elements. An optical system in the display apparatus 103-L further includes a second optical element that aligns the traveling direction of the pair of groups of light rays and the traveling direction of the other pair of groups of light rays.

In particular, in the display apparatus 103-L, a traveling direction of a pair of groups of light rays including first and second groups of light rays coming from the first optical element 31-L, and a traveling direction of another pair of groups of light rays including first and second groups of light rays coming from the first optical element 32-L intersect (are substantially orthogonal to each other). The optical system in the display apparatus 103-L includes a second optical element 30-L that aligns the traveling direction of the pair of groups of light rays and the traveling direction of the other pair of groups of light rays.

In the display apparatus 103-R, a traveling direction of a pair of groups of light rays and a traveling direction of another pair of groups of light rays intersect, the pair of groups of light rays including first and second groups of light rays coming from one of a plurality of (for example, two) first optical elements, the other pair of groups of light rays including first and second groups of light rays coming from another of the plurality of first optical elements. An optical system in the display apparatus 103-R further includes a second optical element that aligns the traveling direction of the pair of groups of light rays and the traveling direction of the other pair of groups of light rays.

In particular, in the display apparatus 103-R, a traveling direction of a pair of groups of light rays including first and second groups of light rays coming from the first optical element 31-R, and a traveling direction of another pair of groups of light rays including first and second groups of light rays coming from the first optical element 32-R intersect (are substantially orthogonal to each other). The optical system in the display apparatus 103-R includes a second optical element 30-R that aligns the traveling direction of the pair of groups of light rays and the traveling direction of the other pair of groups of light rays.

For example, each first optical element and each second optical element in the display apparatus 103 are the beam splitters described above (such as semitransparent mirrors or polarization beam splitters).

The optical system of the display apparatus 103-L further includes a relay optical system 24-L that is arranged between the first optical element 31-L and the second optical element 30-L to generate an intermediate image of the first and second groups of light rays coming from the first optical element 31-L, and a relay optical system 25-L that is arranged between the first optical element 32-L and the second optical element 30-L to generate an intermediate image of the first and second groups of light rays coming from the first optical element 32-L.

The optical system of the display apparatus 103-R further includes a relay optical system 24-R that is arranged between the first optical element 31-R and the second optical element 30-R to generate an intermediate image of the first and second groups of light rays coming from the first optical element 31-R, and a relay optical system 25-R that is arranged between the first optical element 32-R and the second optical element 30-R to generate an intermediate image of the first and second groups of light rays coming from the first optical element 32-R.

For example, each relay optical system in the display apparatus 103 includes a relay lens including at least one lens element.

The optical system of the display apparatus 103-L further includes the ocular optical element 40-L (for example, an eyepiece) on which first and second groups of light rays coming from the optical element 30-L are incident.

The optical system of the display apparatus 103-R further includes the ocular optical element 40-R (for example, an eyepiece) on which first and second groups of light rays coming from the optical element 30-R are incident.

[Operation Performed by Display Apparatus]

In the display apparatus 103-L, the first group of light rays emitted from the first three-dimensional image displaying apparatus 10-L passes through the first relay optical system 20-L, the first optical element 31-L, the relay optical system 24-L, the second optical element 30-L, and the ocular optical element 40-L in this order to be incident on the left eye 50-L of the user. Here, the first group of light rays generates, in a pupil plane of the left eye 50-L, a first group of viewpoints including a plurality of viewpoints S10-L.

In the display apparatus 103-L, the second group of light rays emitted from the second three-dimensional image displaying apparatus 12-L passes through the first relay optical system 22-L, the first optical element 31-L, the relay optical system 24-L, the second optical element 30-L, and the ocular optical element 40-L in this order to be incident on the left eye 50-L of the user. Here, the second group of light rays generates, in the pupil plane of the left eye 50-L, a second group of viewpoints including a plurality of viewpoints S12-L.

In the display apparatus 103-L, the first group of light rays emitted from the first three-dimensional image displaying apparatus 13-L passes through the first relay optical system 23-L, the first optical element 32-L, the relay optical system 25-L, the second optical element 30-L, and the ocular optical element 40-L in this order to be incident on the left eye 50-L of the user. Here, the first group of light rays generates, in the pupil plane of the left eye 50-L, a third group of viewpoints including a plurality of viewpoints S13-L.

In the display apparatus 103-L, the second group of light rays emitted from the second three-dimensional image displaying apparatus 11-L passes through the first relay optical system 21-L, the first optical element 32-L, the relay optical system 25-L, the second optical element 30-L, and the ocular optical element 40-L in this order to be incident on the left eye 50-L of the user. Here, the second group of light rays generates, in the pupil plane of the left eye 50-L, a fourth group of viewpoints including a plurality of viewpoints S11-L.

In the display apparatus 103-L, the above-described first to fourth groups of viewpoints are generated at different positions, and do not overlap. Here, the first to fourth groups of viewpoints are generated such that a set of the viewpoints S10-L, S11-L, S12-L, and S13-L arranged in this order at equal pitches is repeatedly arranged multiple times (FIG. 18 only illustrates one set). However, the generation of the first to fourth group of viewpoints is not limited thereto. For example, the first to fourth groups of viewpoints may be generated such that the four viewpoints S10-L, S11-L, S12-L, and S13-L are arranged with another kind of regularity or at random.

In the display apparatus 103-R, the first group of light rays emitted from the first three-dimensional image displaying apparatus 10-R passes through the first relay optical system 20-R, the first optical element 31-R, the relay optical system 24-L, the second optical element 30-R, and the ocular optical element 40-R in this order to be incident on the right eye 50-R of the user. Here, the first group of light rays generates, in a pupil plane of the right eye 50-R, a first group of viewpoints including a plurality of viewpoints S10-R.

In the display apparatus 103-R, the second group of light rays emitted from the second three-dimensional image displaying apparatus 12-R passes through the first relay optical system 22-R, the first optical element 31-R, the relay optical system 24-R, the second optical element 30-R, and the ocular optical element 40-R in this order to be incident on the right eye 50-R of the user. Here, the second group of light rays generates, in the pupil plane of the right eye 50-R, a second group of viewpoints including a plurality of viewpoints S12-R.

In the display apparatus 103-R, the first group of light rays emitted from the first three-dimensional image displaying apparatus 13-R passes through the first relay optical system 23-R, the first optical element 32-R, the relay optical system 25-R, the second optical element 30-R, and the ocular optical element 40-R in this order to be incident on the right eye 50-R of the user. Here, the first group of light rays generates, in the pupil plane of the right eye 50-R, a third group of viewpoints including a plurality of viewpoints S13-R.

In the display apparatus 103-R, the second group of light rays emitted from the second three-dimensional image displaying apparatus 11-R passes through the first relay optical system 21-R, the first optical element 32-R, the relay optical system 25-R, the second optical element 30-R, and the ocular optical element 40-R in this order to be incident on the right eye 50-R of the user. Here, the second group of light rays generates, in the pupil plane of the left eye 50-L, a fourth group of viewpoints including a plurality of viewpoints S11-R.

In the display apparatus 103-R, the above-described first to fourth groups of viewpoints are generated at different positions, and do not overlap. Here, the first to fourth groups of viewpoints are generated such that a set of the viewpoints S10-R, S11-R, S12-R, and S13-R arranged in this order at equal pitches is repeatedly arranged multiple times (FIG. 18 only illustrates one set). However, the generation of the first to fourth groups of viewpoints is not limited thereto. For example, the first to fourth groups of viewpoints may be generated such that the four viewpoints S10-R, S11-R, S12-R, and S13-R are arranged with another kind of regularity or at random.

As described above, the display apparatus 103 is used to perform a display method including generating, using a group of light rays, a group of viewpoints for each of two eyes of a user, the group of light rays being emitted from each of the first and second three-dimensional image displaying apparatuses of each pair of a plurality of pairs (for example, two pairs) of first and second three-dimensional image displaying apparatuses, the plurality of pairs corresponding to the eye.

[Effects Provided by Display Apparatus]

The display apparatus 103 of the third example makes it possible to obtain effects that are similar to the effects provided by the display apparatus 102 of the second example. Further, the display apparatuses respectively corresponding to two eyes each include a plurality of pairs (for example, two pairs) of first and second three-dimensional image displaying apparatuses. This makes it possible to achieve the number of viewpoints with a higher density and a higher resolution.

In the display apparatus 103, the arrangement of relay optical systems as illustrated in FIG. 18 makes it possible to correct for various aberrations that are not corrected for only using an eyepiece, although there is a possibility that an optical system will be made larger in size. This results in being able to provide a high-quality three-dimensional image to a user. Further, the provision of a relay optical system makes it possible to make a light path longer, and thus to easily place, for example, various filters in the light path.

In the display apparatus 103 of the third example, the display apparatuses respectively corresponding to two eyes each include four three-dimensional image displaying apparatuses. Without being limited thereto, the display apparatuses may each include three three-dimensional image displaying apparatuses, or four or more three-dimensional image displaying apparatuses. In this case, a relay optical system (for example, a relay lens) may be arranged as appropriate between the three-dimensional image displaying apparatus and the first optical element or between the first and second optical elements.

In the display apparatus 103 of the third example, a freeform prism that also serves as an ocular optical element may be used as the second optical element. The freeform prism includes a function of a beam splitter that serves as the second optical element, and a function of an eyepiece that serves as the ocular optical element.

Note that the display apparatus 103-L may only include one of the relay optical systems 24-L and 25-L, or may include neither of them. The display apparatus 103-R may only include one of the relay optical systems 24-R and 25-R, or may include neither of them.

(4) Display Apparatus of Fourth Example

[Configuration of Display Apparatus]

Figure 19:
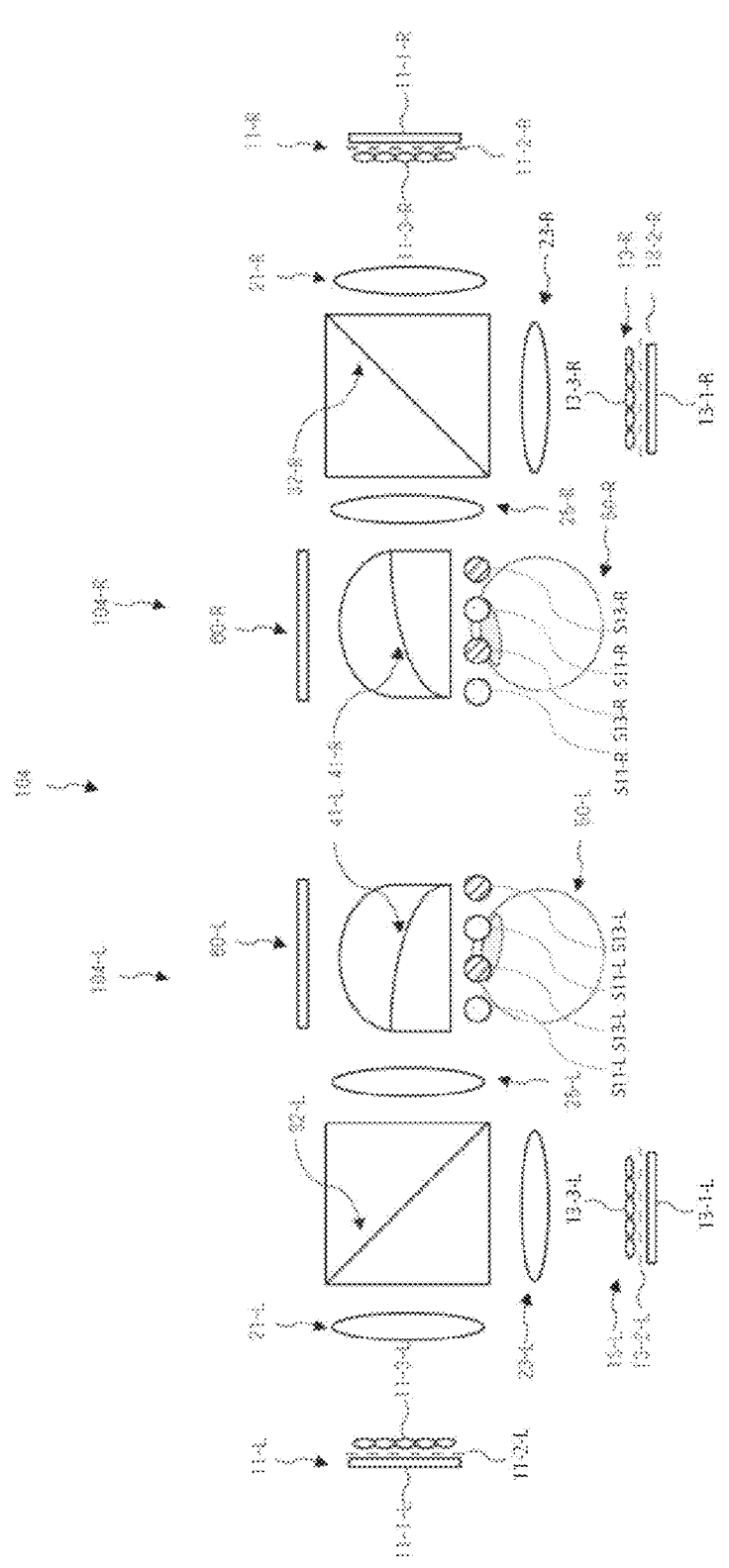
FIG. 19 illustrates a configuration of a display apparatus of a fourth example of an embodiment of the present technology.

FIG. 19 schematically illustrates a basic configuration of a display apparatus 104 of the fourth example. As illustrated in FIG. 19, the display apparatus 104 includes a left-eye display apparatus 104-L and a right-eye display apparatus 104-R. The display apparatuses 104-L and 104-R in the display apparatus 104 are symmetrically laid out. The display apparatus 104 is, for example, a head-mounted display apparatus (HMD) used by being worn on a head of a user. For example, the display apparatus 104 is used to provide VR to a user.

The display apparatus 104-L has a configuration corresponding to the configuration of the display apparatus 103-L of the third example (refer to FIG. 18) in which the configuration including the first and second three-dimensional image displaying apparatuses 10-L and 12-L, the first and second relay optical systems 20-L and 22-L, the first optical element 31-L, and the relay optical system 24-L has been replaced with a left-eye two-dimensional image displaying apparatus 60-L and the configuration including the second optical element 30-L and the ocular optical element 40-L has been replaced with a freeform prism 41-L.

A group of light rays coming from the two-dimensional image displaying apparatus 60-L is transmitted through the freeform prism 41-L to be headed for the left eye 50-L, and first and second groups of light rays coming from the first optical element 32-L are reflected off the freeform prism 41-L to be headed for the left eye 50-L.

The display apparatus 104-R has a configuration corresponding to the configuration of the display apparatus 103-R of the third example (refer to FIG. 18) in which the configuration including the first and second three-dimensional image displaying apparatuses 10-R and 12-R, the first and second relay optical systems 20-R and 22-R, the first optical element 31-R, and the relay optical system 24-R has been replaced with a right-eye two-dimensional image displaying apparatus 60-R and the configuration including the second optical element 30-R and the ocular optical element 40-R has been replaced with a freeform prism 41-R.

A group of light rays coming from the two-dimensional image displaying apparatus 60-R is transmitted through the freeform prism 41-R to be headed for the right eye 50-R, and first and second groups of light rays coming from the first optical element 32-R are reflected off the freeform prism 41-R to be headed for the right eye 50-R.

Two-dimensional image displaying apparatuses (two-dimensional displays) may respectively display two-dimensional videos in at least respective portions of fields of view of respective eyes, or may respectively display, in at least respective portions of fields of view of respective eyes, parallax images used to display a stereoscopic video obtained using disparity between right and left eyes.

Note that a position of the configuration including the first and second three-dimensional image displaying apparatuses and the first optical element and a position of the two-dimensional image displaying apparatus may be reversed with respect to the freeform prism.

[Operation Performed by Display Apparatus]

In the display apparatus 104-L, the first group of light rays emitted from the first three-dimensional image displaying apparatus 13-L passes through the first relay optical system 23-L, the first optical element 32-L, the relay optical system 25-L, and the freeform prism 41-L in this order to be incident on the left eye 50-L of the user. Here, the first group of light rays generates, in a pupil plane of the left eye 50-L, a first group of viewpoints including a plurality of viewpoints S13-L.

In the display apparatus 104-L, the second group of light rays emitted from the second three-dimensional image displaying apparatus 11-L passes through the second relay optical system 21-L, the first optical element 32-L, the relay optical system 25-L, and the freeform prism 41-L in this order to be incident on the left eye 50-L of the user. Here, the second group of light rays generates, in the pupil plane of the left eye 50-L, a second group of viewpoints including a plurality of viewpoints S11-L.

In the display apparatus 104-R, the first group of light rays emitted from the first three-dimensional image displaying apparatus 13-R passes through the first relay optical system 23-R, the first optical element 32-R, the relay optical system 25-R, and the freeform prism 41-R in this order to be incident on the right eye 50-R of the user. Here, the first group of light rays generates, in a pupil plane of the right eye 50-R, a first group of viewpoints including a plurality of viewpoints S13-R.

In the display apparatus 104-R, the second group of light rays emitted from the second three-dimensional image displaying apparatus 11-R passes through the second relay optical system 21-R, the first optical element 32-R, the relay optical system 25-R, and the freeform prism 41-R in this order to be incident on the right eye 50-R of the user. Here, the second group of light rays generates, in the pupil plane of the right eye 50-R, a second group of viewpoints including a plurality of viewpoints S11-R.

For example, in the display apparatus 104, each two-dimensional image displaying apparatus may display, in the entirety of the field of view, a stereoscopic video obtained using disparity between right and left eyes, and corresponding first and second three-dimensional image displaying apparatuses may display, using a light field and in a limited range of a center portion of the field of view of a corresponding eye, a stereoscopic image (a stereoscopic video) that includes depth information and for which focusing is induced. The images (the videos) respectively provided by the two-dimensional image displaying apparatus and the three-dimensional image displaying apparatus pass through an optical system to overlap, and overlapping images are viewed by a user.

As described above, the display apparatus 104 is used to perform a display method including generating, using a group of light rays, a group of viewpoints for each of two eyes of a user, the group of light rays being emitted from each of the first and second three-dimensional image displaying apparatuses corresponding to the eye.

[Effects Provided by Display Apparatus]

Compared to the above-described existing technologies of the HMDs used to decrease VAC, the display apparatus 104 of the fourth example can achieve a wider field of view and a higher resolution with a simpler configuration and can reduce rendering costs and transmission costs. Human vision exhibits a high quality level in a center region of the field of view, and exhibits a low quality level in a region other than the center region. Thus, humans do not easily notice a degradation in image quality in a surrounding region of the field of view.

Using these characteristics, a high-resolution three-dimensional image (three-dimensional video) that includes depth information is displayed in a center portion of the field of view, and a low-resolution two-dimensional image (two-dimensional video) with a wide field of view is displayed in the entirety of the field of view. This makes it possible to obtain a level of resolution and a size of a field of view that are necessary to provide a greater sense of immersion to humans. Further, the restriction on a field of view in which depth is reproduced is effective in order to obtain a high degree of reproducibility in depth with limited resources. Furthermore, the limitation on a range in which a three-dimensional image (a three-dimensional video) is displayed makes it possible to reduce calculation and transmission costs that are necessary to render the three-dimensional image (the three-dimensional video).

(5) Display Apparatus of Fifth Example

[Configuration of Display Apparatus]

Figure 20:
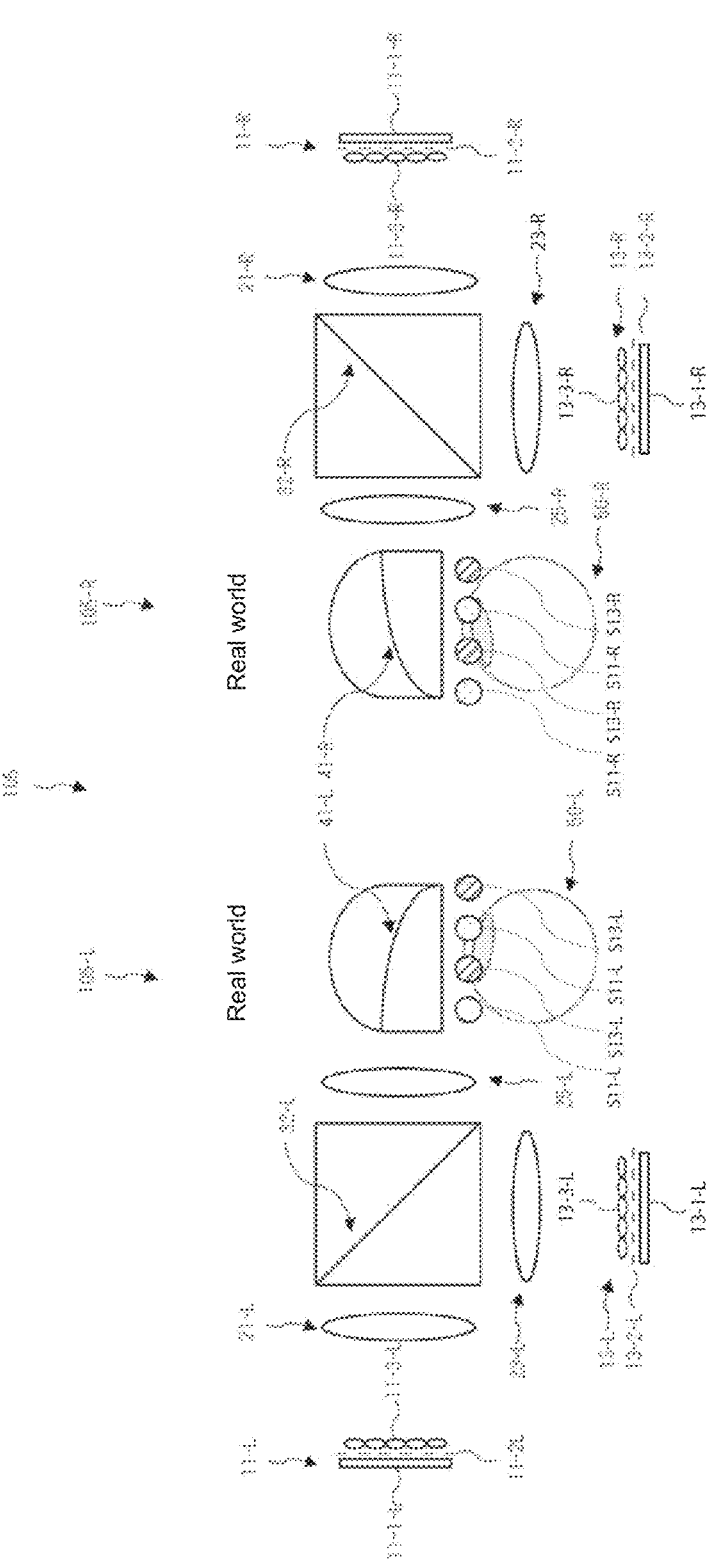
FIG. 20 illustrates a configuration of a display apparatus of a fifth example of an embodiment of the present technology.

FIG. 20 schematically illustrates a basic configuration of a display apparatus 105 of the fifth example. As illustrated in FIG. 20, the display apparatus 105 includes a left-eye display apparatus 105-L and a right-eye display apparatus 105-R. The display apparatuses 105-L and 105-R in the display apparatus 105 are symmetrically laid out. The display apparatus 105 is, for example, a head-mounted display apparatus (HMD) used by being worn on a head of a user. For example, the display apparatus 105 is used to provide AR to a user.

The display apparatus 105 has a configuration that is similar to the configuration of the display apparatus 104 of the fourth example except that the two-dimensional image displaying apparatuses 60-L and 60-R (refer to FIG. 19) are not provided.

[Operation Performed by Display Apparatus]

In the display apparatus 105-L, the first group of light rays emitted from the first three-dimensional image displaying apparatus 13-L passes through the first relay optical system 23-L, the first optical element 32-L, the relay optical system 25-L, and the freeform prism 41-L in this order to be incident on the left eye 50-L of the user. Here, the first group of light rays generates, in a pupil plane of the left eye 50-L, a first group of viewpoints including a plurality of viewpoints S13-L.

In the display apparatus 105-L, the second group of light rays emitted from the second three-dimensional image displaying apparatus 11-L passes through the second relay optical system 21-L, the first optical element 32-L, the relay optical system 25-L, and the freeform prism 41-L in this order to be incident on the left eye 50-L of the user. Here, the second group of light rays generates, in the pupil plane of the left eye 50-L, a second group of viewpoints including a plurality of viewpoints S11-L.

In the display apparatus 105-L, light rays coming from a real world pass through the freeform prism 41-L to be incident on the left eye 50-L.

In the display apparatus 105-R, the first group of light rays emitted from the first three-dimensional image displaying apparatus 13-R passes through the first relay optical system 23-R, the first optical element 32-R, the relay optical system 25-R, and the freeform prism 41-R in this order to be incident on the right eye 50-R of the user. Here, the first group of light rays generates, in a pupil plane of the right eye 50-R, a first group of viewpoints including a plurality of viewpoints S13-R.

In the display apparatus 105-R, the second group of light rays emitted from the second three-dimensional image displaying apparatus 11-R passes through the second relay optical system 21-R, the first optical element 32-R, the relay optical system 25-R, and the freeform prism 41-R in this order to be incident on the right eye 50-R of the user. Here, the second group of light rays generates, in the pupil plane of the right eye 50-R, a second group of viewpoints including a plurality of viewpoints S11-R.

In the display apparatus 105-R, light rays coming from the real world pass through the freeform prism 41-R to be incident on the right eye 50-R.

As described above, the display apparatus 105 is used to perform a display method including generating, using a group of light rays, a group of viewpoints for each of two eyes of a user, the group of light rays being emitted from each of the first and second three-dimensional image displaying apparatuses corresponding to the eye.

[Effects Provided by Display Apparatus]

The display apparatus 105 makes it possible to obtain effects that are similar to the effects provided by the display apparatus 101 of the first example. Further, a stereoscopic image (a stereoscopic video) that is generated by first and second three-dimensional image displaying apparatuses corresponding to each of two eyes is displayed in a limited range of, for example, a center portion of the field of view of the eye, the stereoscopic image being a stereoscopic image that includes depth information and for which focusing is induced. Then, the stereoscopic image is caused to overlap light rays from the real world. This makes it possible to provide a 3D augmented-reality display that has a see-through performance and enables a decrease in VAC.

(6) Display Apparatus of Sixth Example

Figure 21:
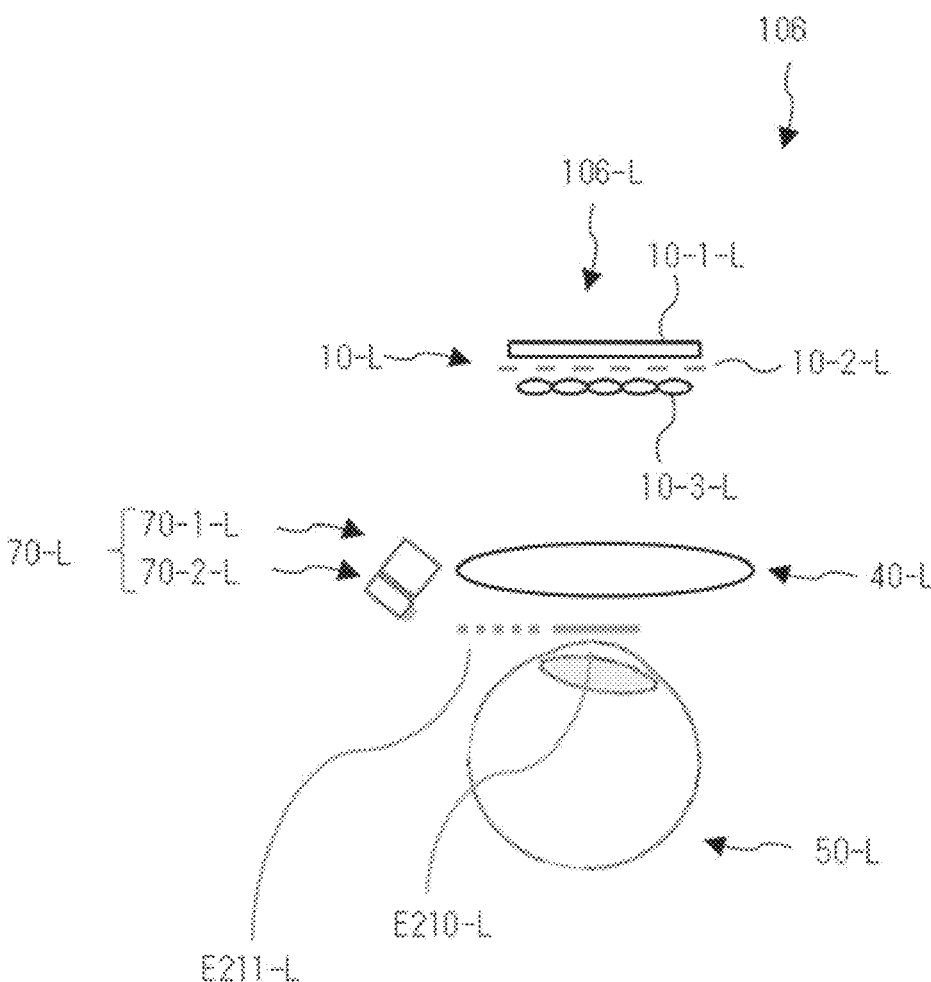
FIG. 21 illustrates a configuration of a display apparatus of a sixth example of an embodiment of the present technology.

FIG. 21 schematically illustrates a basic configuration of a display apparatus 106 of the sixth example. As illustrated in FIG. 21, the display apparatus 106 includes a left-eye display apparatus 106-L and a right-eye display apparatus. The left-eye display apparatus 106-L and the right-eye display apparatus in the display apparatus 106 are symmetrically laid out. Thus, the left-eye display apparatus 106-L is primarily described. The display apparatus 106 is, for example, a head-mounted display apparatus (HMD) used by being worn on a head of a user. For example, the display apparatus 106 is used to provide VR to a user.

The display apparatus 106-L includes a group-of-viewpoints generation system and a line-of-sight detection system. Note that the right-eye display apparatus of the display apparatus 106 may include or does not necessarily have to include the line-of-sight detection system.

The group-of-viewpoints generation system of the display apparatus 106-L includes the three-dimensional image displaying apparatus 10-L and an optical system including the ocular optical element 40-L (for example, an eyepiece), the three-dimensional image displaying apparatus 10-L and the optical system corresponding to the left eye 50-L of the user. The group-of-viewpoints generation system generates a group of viewpoints for the left eye 50-L using a group of light rays being emitted from the three-dimensional image displaying apparatus 10-L to pass through the optical system. Here, it is favorable that at least two of a plurality of viewpoints included in the group of viewpoints be generated on the left eye 50-L.

A display method can be performed using the display apparatus 106, the display method including detecting a line of sight of a user and generating, using a group of light rays, a group of viewpoints for each of two eyes of a user, the group of light rays being emitted from a three-dimensional image displaying apparatus corresponding to the eye to pass through an optical system including the ocular optical element 40-L, the generating the group of viewpoints including controlling a position at which the group of viewpoints is generated, on the basis of a result of the detection performed by the detecting the line of sight.

For example, the three-dimensional image displaying apparatus 10-L of the display apparatus 106-L includes the elemental image displaying apparatus 10-1-L, the aperture array 10-2-L, and the microlens array 10-3-L, and reproduces a light field by integral imaging.

The line-of-sight detection system of the display apparatus 106-L includes an eye-tracking apparatus 70-L.

The eye-tracking apparatus 70-L includes a camera 70-1-L (a light receiver) that detects an orientation (a line of sight) of the left eye 50-L, and a light source 70-2-L for illumination (a light source section).

For example, the camera 70-1-L and the light source 70-2-L are provided to an outer edge of the ocular optical element 40-L to face the left eye 50-L.

For example, the camera 70-1-L includes a light-receiving element (an imaging device) such as an image sensor.

For example, the light source 70-2-L emits invisible light (for example, infrared light). For example, a light-emitting diode or a laser can be used as the laser light source 70-2-L.

In the eye-tracking apparatus 70-L, invisible light that is emitted by the light source 70-2-L to be reflected off the left eye 50-L is imaged (received) using the camera 70-1-L.

Here, an "eye-box" is a range in which a light field can be viewed properly, and is a range in which a viewpoint is generated by the three-dimensional image displaying apparatus.

In the display apparatus 106, an eye-box is generated in an appropriate range for each frame using an eye-tracking apparatus. In FIG. 21, reference numerals E211-L and E210-L indicate eye-boxes in different frames. In integral imaging, there is a need to change an image (a video) to be displayed as an elemental image in order to change a position of an eye-box.

There is a trade-off relationship between the size of an eye-box and the viewpoint density, between the viewpoint density and the resolution, and between the resolution and the size of an eye-box. The use of an eye-tracking apparatus makes it possible to limit an eye-box range to only a region around a pupil, and thus to make the range smaller. This results in being able to achieve a high resolution while maintaining a level of viewpoint density.

Figure 22:
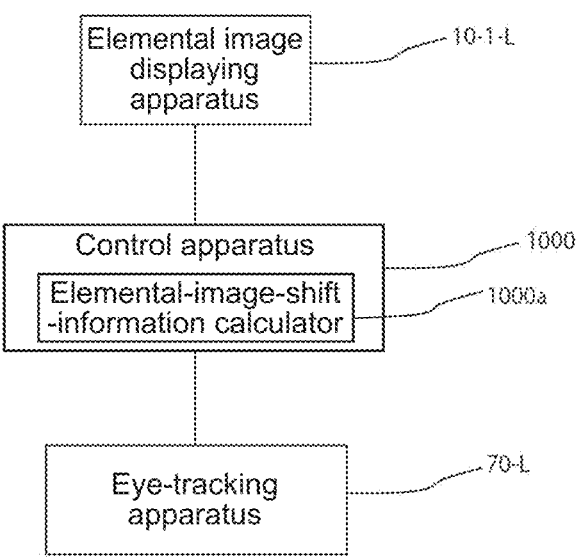
FIG. 22 is a block diagram illustrating a function of the display apparatus of the sixth example of the embodiment of the present technology.

FIG. 22 is a block diagram illustrating a function of the display apparatus 106. As illustrated in FIG. 22, the group-of-viewpoints generation system of the display apparatus 106 further includes a control apparatus 1000 that controls a position at which a group of viewpoints is generated, on the basis of output from the eye-tracking apparatus 70-L that corresponds to a result of detection performed by the line-of-sight detection system. For example, the control apparatus 1000 is implemented by hardware including, for example, a CPU and a chip set.

The control apparatus 1000 includes a primary controller and an elemental-image-shift-information calculator 1000a. The elemental-image-shift-information calculator 1000a calculates shift information regarding (a shift direction of and a shift amount of) an elemental image using an orientation of the left eye 50-L that is obtained on the basis of output from the eye-tracking apparatus 70-L, and outputs a result of the calculation to the elemental image displaying apparatus 10-1-L. The elemental image displaying apparatus 10-1-L generates an elemental image according to the shift information.

Figure 23:
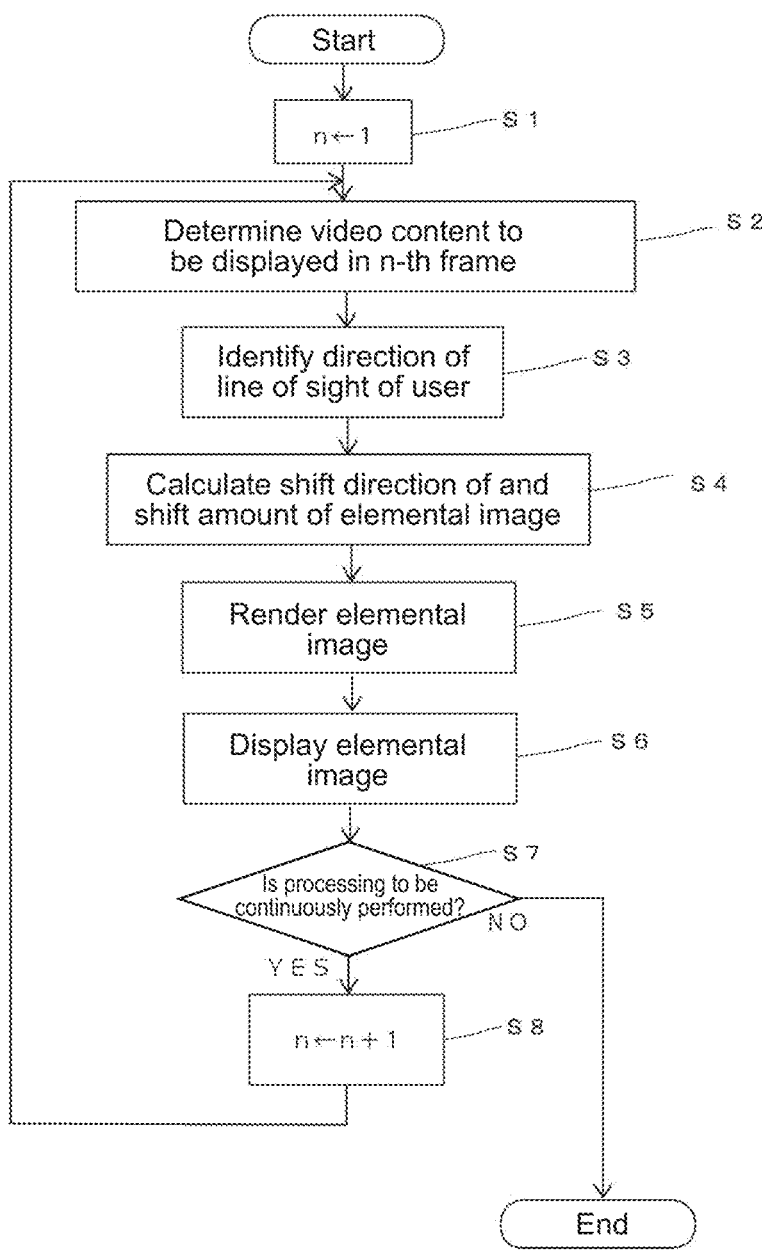
FIG. 23 is a flowchart used to describe an operation of the display apparatus of the sixth example of the embodiment of the present technology.

An operation of the display apparatus 106 (a display method using the display apparatus 106) is described below with reference to FIG. 23. The flowchart illustrated in FIG. 23 is based on a processing algorithm performed by the primary controller of the control apparatus 1000.

In Step S1, which is a first step, the primary controller sets n to one.

In Step S2, which is subsequent to Step S1, the primary controller determines video content that is to be displayed in an n-th frame.

In Step S3, which is subsequent to Step S2, the primary controller identifies a direction of a line of sight of a user. Specifically, the primary controller identifies an orientation of the left eye 50-L (the direction of the line of sight) of the user using output from the eye-tracking apparatus 70-L, and transmits the identified orientation of the left eye 50-L to the elemental-image-shift-information calculator 1000a.

Figure 24:
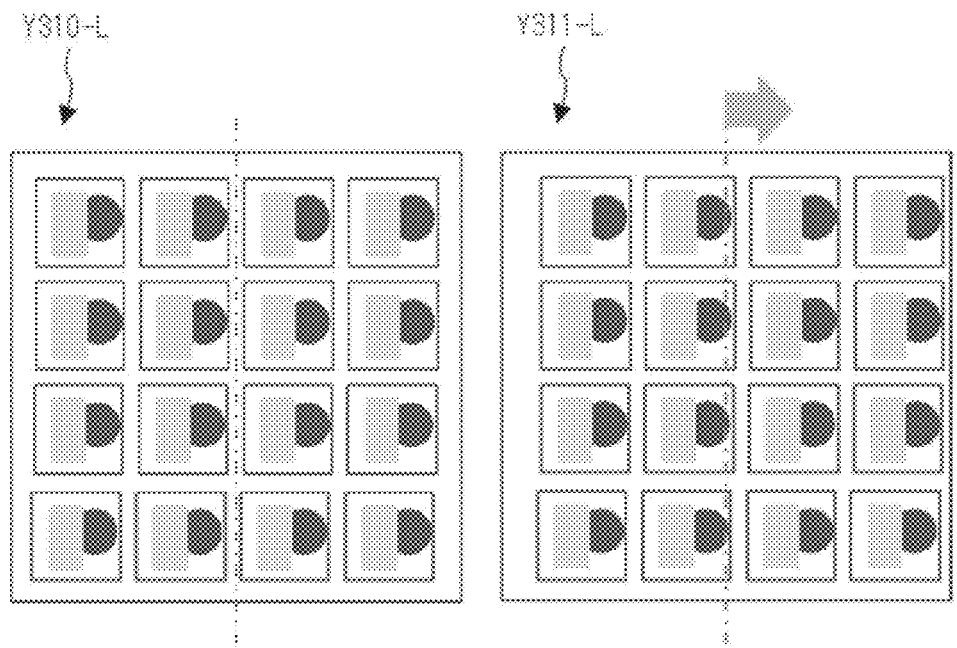
FIG. 24 is a diagram used to describe a shift of an elemental image in the display apparatus of the sixth example of the embodiment of the present technology.

In Step S4, which is subsequent to Step S3, the elemental-image-shift-information calculator 1000a calculates a shift direction of and a shift amount of an elemental image. Specifically, the elemental-image-shift-information calculator 1000a calculates a shift direction of and a shift amount of an elemental image such that an eye-box is generated at a position depending on the identified orientation of the left eye 50-L. For example, when a viewpoint is generated in a range of the eye-box E210-L illustrated in FIG. 21 (a range in which the left eye 50-L faces the three-dimensional image displaying apparatus 10-L) in a certain frame, an elemental image Y310-L illustrated in A of FIG. 24 is displayed. Further, when a viewpoint is generated in a range of the eye-box E211-L illustrated in FIG. 21 in another frame, for example, an elemental image Y311-L illustrated in FIG. 24 that is obtained by the elemental image Y310-L being shifted, is displayed.

Figure 25:
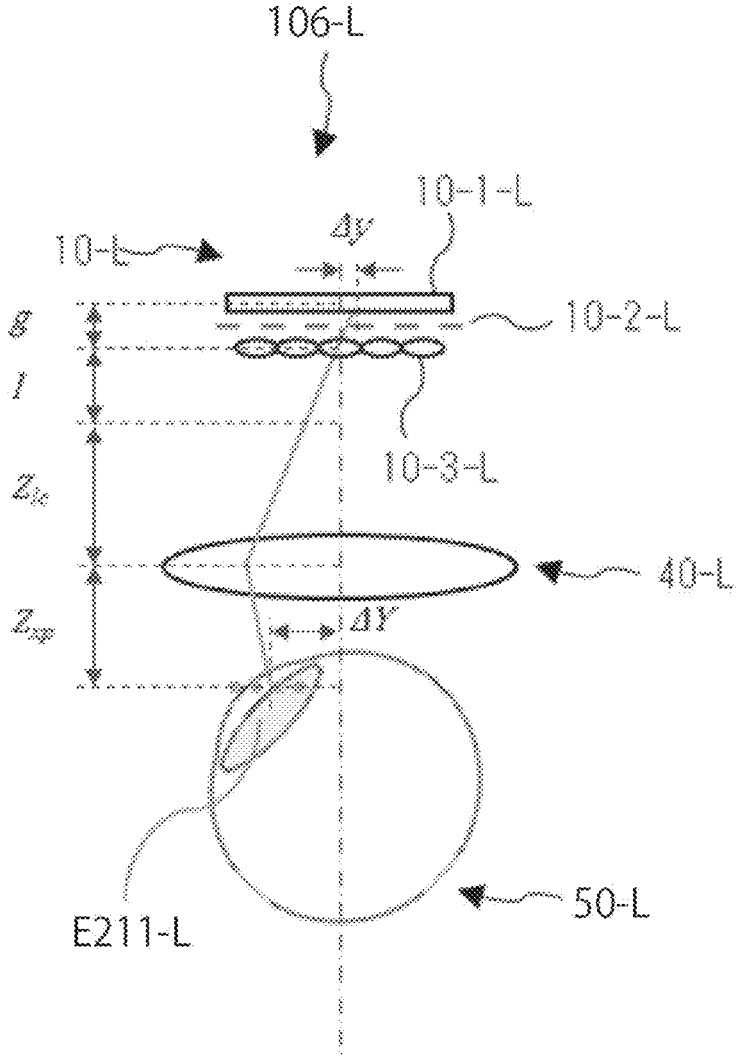
FIG. 25 is a diagram used to describe the shift of an elemental image in the display apparatus of the sixth example of the embodiment of the present technology.

Here, the respective parameters in Formula (4) described above are illustrated in FIG. 25. Formula (4) described above is a formula by which only a shift in a Y direction is expressed. The same applies to a shift in an X direction. The calculation of $(\Delta x, \Delta y)$ makes it possible to determine a shift amount of and a shift direction of an elemental image.

In Step S5, which is subsequent to Step S4, the primary controller renders an elemental image. Specifically, for example, the primary controller generates video data obtained by the elemental image Y311-L being shifted from the elemental image Y310-L to be rendered, the shift of the elemental image Y310-L being performed by an amount in a direction, the amount and direction being expressed using Formula (4) described above.

In Step S6, which is subsequent to Step S5, the primary controller causes an elemental image to be displayed. Specifically, the primary controller drives the elemental image displaying apparatus 10-1-L on the basis of the video data generated in Step S5 to cause an elemental image to be displayed. This results in reproducing a light field, and in generating a plurality of viewpoints in, for example, a range of the eye-box E211-L (refer to FIG. 25).

In Step S7, which is subsequent to Step S6, the primary controller determines whether to continuously perform processing. Specifically, the primary controller determines that the processing is not to be continuously performed when the display apparatus 106 is turned off, and the primary controller determines that the processing is to be continuously performed in other cases. The process moves on to Step S8 when an affirmative determination is made in Step S7, and the flow is terminated when a negative determination is made in Step S7.

In Step S8, the primary controller increments n by one. In other words, a series of operations in Steps S2 to S7 is also performed in a next frame. When the process of Step S8 is performed, the process returns to Step S2.

The display apparatus 106 of the sixth example described above makes it possible to display a three-dimensional image at a high resolution with a high degree of reproducibility in depth without restricting the field of view.

(Supplement)

Figure 26:
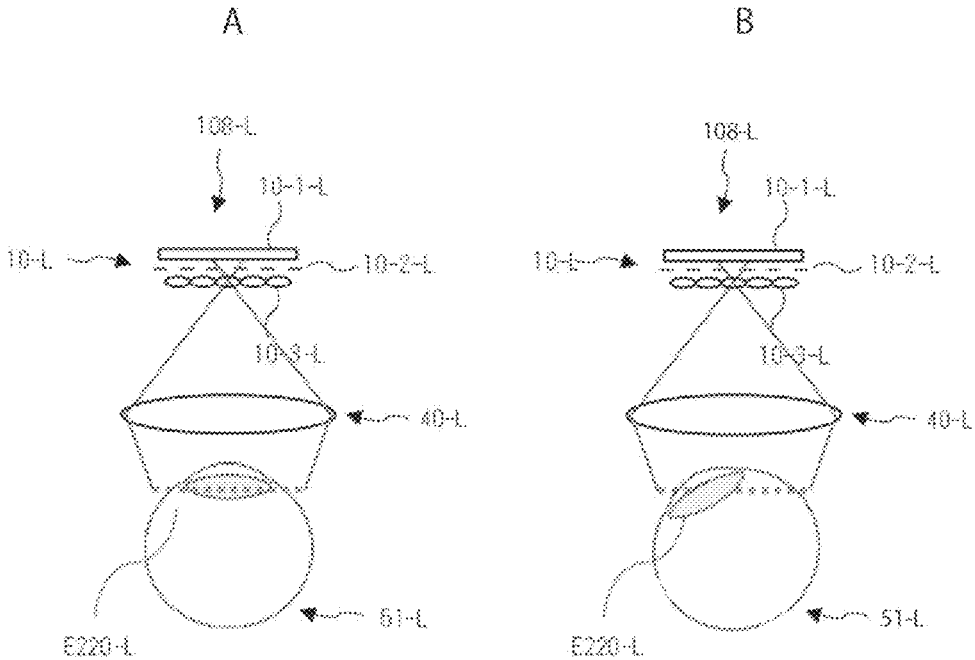
FIG. 26 A and B of FIG. 26 are diagrams used to describe a display apparatus of a comparative example.

Here, an image display apparatus 108-L of a comparative example illustrated in A and B of FIG. 26 includes the three-dimensional image displaying apparatus 10-L and the ocular optical element 40-L (for example, an eyepiece). When an eye-tracking apparatus is not used, there is a need to make an eye-box range larger in size in consideration of, for example, a rotation of an eye and an offset upon the HMD being worn. In A of FIG. 26, a left eye 51-L of a user faces the front, and a pupil is situated in an eye-box range E220-L. This enables the user to view a light field properly. In B of FIG. 26, the left eye 51-L of the user is rotated to face to the left. However, the pupil is situated in the eye-box range E220-L since the eye-box range is large in size. This enables the user to view a light field properly. However, the eye-box has a large size in the comparative example. Thus, it is difficult to improve the resolution of a light field while maintaining a level of viewpoint density.

Figure 27:
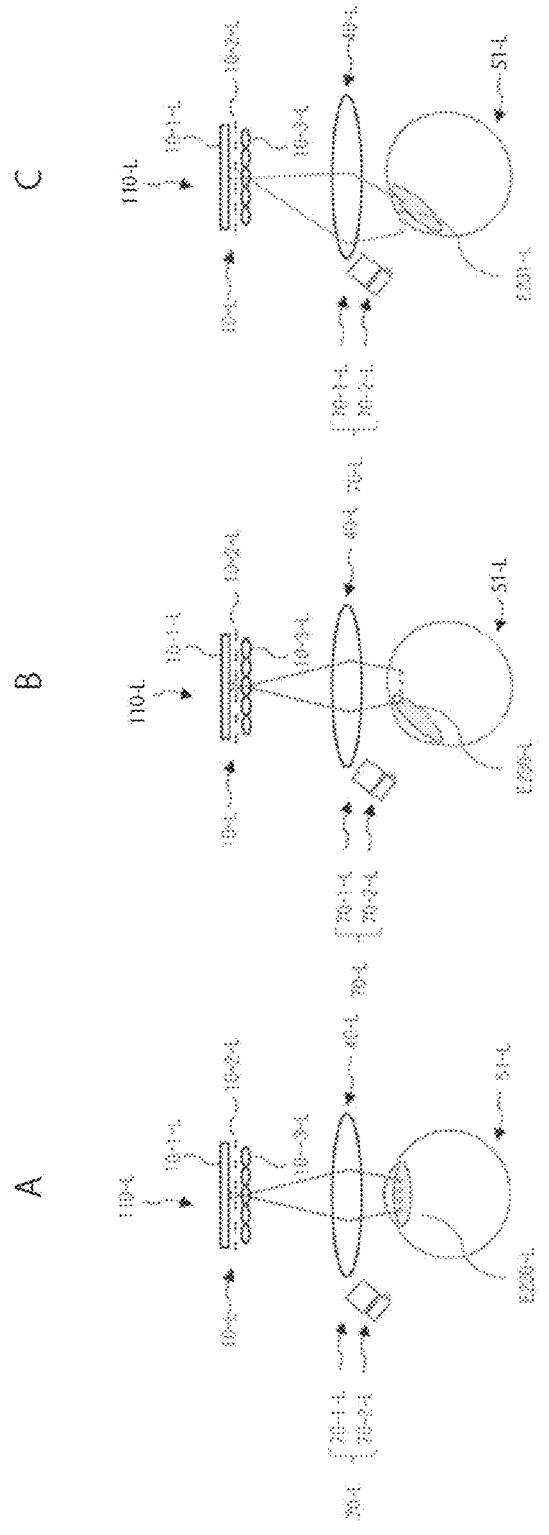
FIG. 27 A to C of FIG. 27 are diagrams used to describe operations of a display apparatus including an eye-tracking apparatus.

An image display apparatus 110-L illustrated in A to C of FIG. 27 includes the three-dimensional image displaying apparatus 10-L, the ocular optical element 40-L (for example, an eyepiece), and the eye-tracking apparatus 70-L. When the eye-tracking apparatus 70-L is used, a position of an eye-box can be determined according to a position of an eyeball. This makes it possible to limit an eye-box range to only a region around a pupil, and thus to make the range smaller. In A of FIG. 27, the left eye 51-L of the user faces the front, and the pupil is situated in an eye-box range E230-L. This enables the user to view a light field properly. On the other hand, in B of FIG. 27, the left eye 51-L of the user is rotated, and the pupil is situated outside of the eye-box range E230-L. This results in difficulty in the user viewing a light field properly. Thus, there is a need to change the eye-box range according to an orientation of an eye. Thus, the orientation of the eye is identified using an eye-tracking apparatus, and the eye-box is moved to E231-L, as illustrated in C of FIG. 27. This enables the user to view a proper light field. As described above, an eye-box range is changed according to a position of an eye using the eye-tracking apparatus 70-L. This makes it possible to make an eye-box range generated for each frame smaller in size. This results in being able to improve the resolution of a light field while maintaining a level of viewpoint density.

(7) Display Apparatus of Seventh Example

Figure 28:
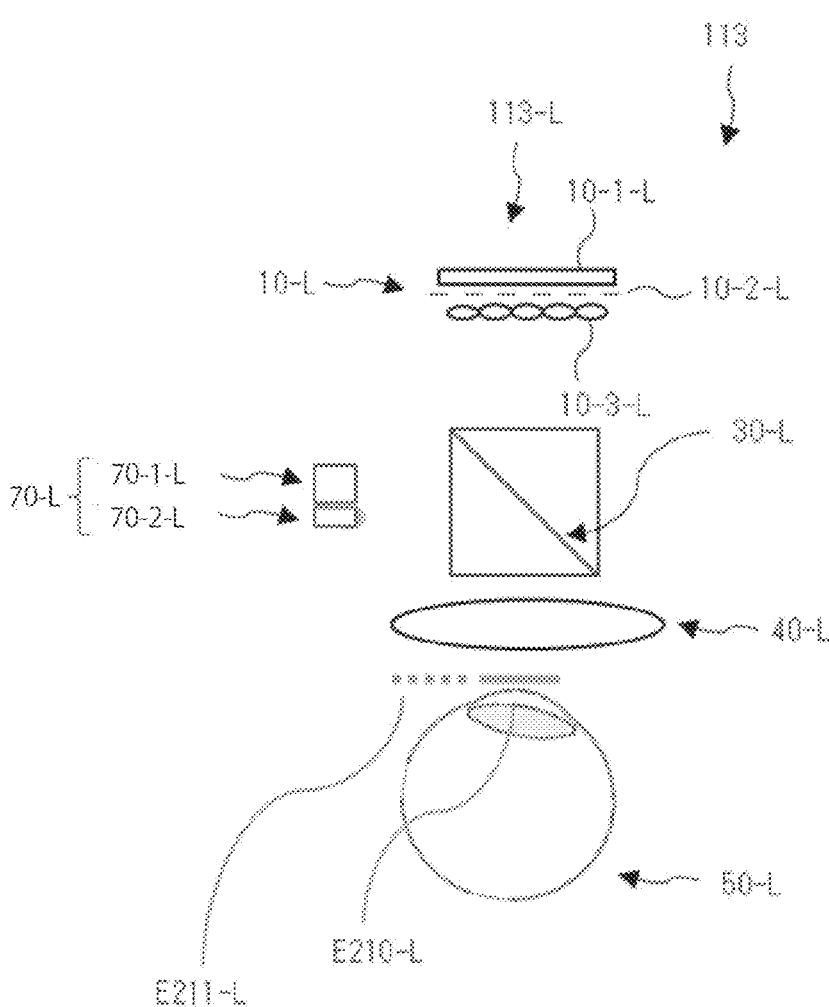
FIG. 28 illustrates a configuration of a display apparatus of a seventh example of an embodiment of the present technology.

FIG. 28 schematically illustrates a basic configuration of a display apparatus 113 of the seventh example. As illustrated in FIG. 28, the display apparatus 113 includes a left-eye display apparatus 113-L and a right-eye display apparatus. The left-eye display apparatus 113-L and the right-eye display apparatus in the display apparatus 113 are symmetrically laid out. Thus, the left-eye display apparatus 113-L is primarily described. The display apparatus 113 is, for example, a head-mounted display apparatus (HMD) used by being worn on a head of a user. For example, the display apparatus 113 is used to provide VR to a user.

The display apparatus 113 has a configuration that is similar to the configuration of the display apparatus 106 of the sixth example except that a direction in which a group of light rays coming from the three-dimensional image displaying apparatus 10-L corresponding to the left eye 50-L is emitted and a direction in which invisible light coming from the light source 70-1-L (the light source section) is emitted intersect, and except that an optical system including the ocular optical element 40-L (for example, an eyepiece) further includes the optical element 30-L aligning a traveling direction of the group of light rays and a traveling direction of the invisible light. For example, the optical element 30-L is a beam splitter (such as a semitransparent mirror, a polarization beam splitter, or a dichroic mirror).

For example, the eye-tracking apparatus 70-L in the display apparatus 113 is provided to a temple of a frame of glasses.

The invisible light emitted by the light source 70-1-L passes through the optical element 30-L and the ocular optical element 40-L in this order to be irradiated onto the left eye 50-L. The camera 70-2-L (the light receiver) receives, through the ocular optical element 40-L and the optical element 30-L in this order, the invisible light reflected off the left eye 50-L.

Here, for example, the group of light rays coming from the three-dimensional image displaying apparatus 10-L is transmitted through the optical element 30-L, and passes through the ocular optical element 40-L to generate a group of viewpoints. The invisible light coming from the light source 70-1-L is reflected off the optical element 30-L, and passes through the ocular optical element 40-L to be irradiated onto the left eye 50-L. The invisible light reflected off the left eye 50-L passes through the ocular optical element 40-L, and is reflected off the optical element 30-L to be incident on the camera 70-2-L.

Note that a position of the three-dimensional image displaying apparatus 10-L and a position of the eye-tracking apparatus 70-L may be reversed with respect to the optical element 30-L.

The display apparatus 113 makes it possible to obtain effects that are similar to the effects provided by the display apparatus 106 of the sixth example. Further, the use of the optical element 30-L makes it possible to image, on an optical axis of the ocular optical element 40-L, the invisible light coming from the light source 70-1-L and being reflected off the left eye 50-L, using the camera 70-2-L. In this case, there is an impact of distortion due to the ocular optical element 40-L, but an eye can be observed from the front. This makes it possible to perform eye-tracking with a high degree of accuracy. Further, compared to, for example, when the eye-tracking apparatus 70-L is provided to the outer edge of the ocular optical element 40-L, the field of view and the eye relief are less restricted.

Note that, instead of the optical element 30-L and the ocular optical element 40-L, a freeform prism that aligns a traveling direction of a group of light rays coming from the three-dimensional image displaying apparatus 10-L, and a traveling direction of the invisible light coming from the light source 70-1-L, may be provided. The freeform prism includes a function of a beam splitter and a function of an eyepiece. In this case, the invisible light emitted by the light source 70-1-L passes through the freeform prism to be irradiated onto the left eye 50-L. The camera 70-2-L receives the invisible light reflected off the left eye 50-L through the freeform prism.

(8) Display Apparatus of Eighth Example

Figure 29:
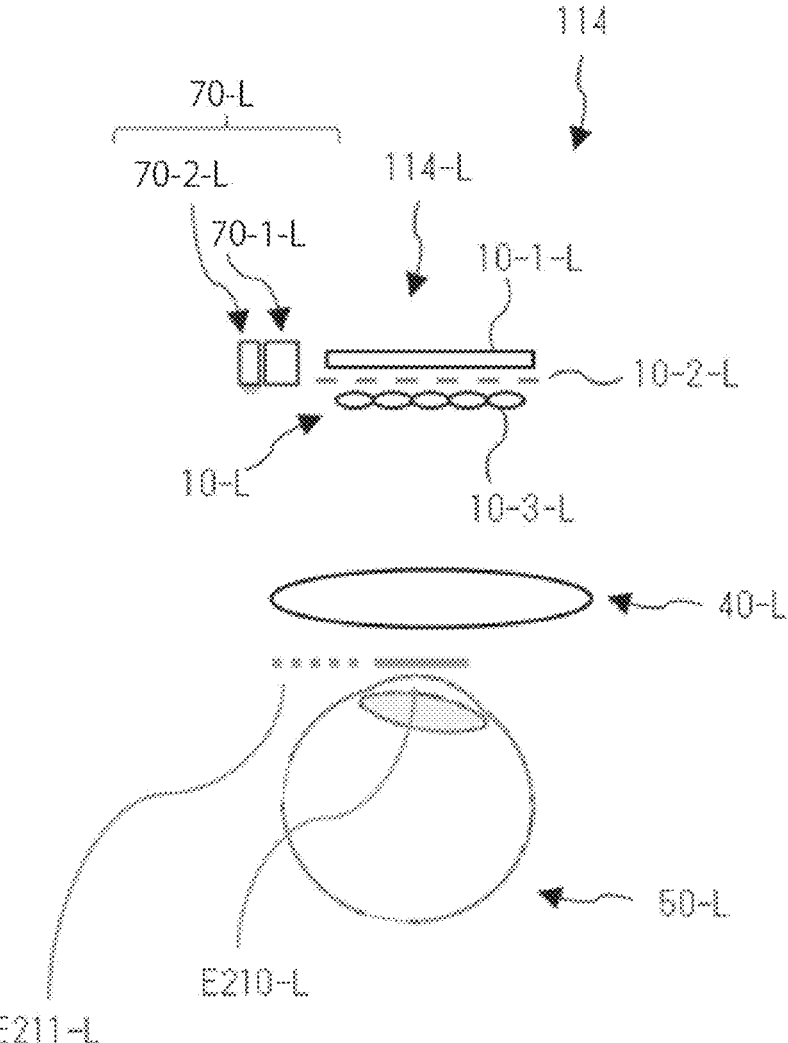
FIG. 29 illustrates a configuration of a display apparatus of an eighth example of an embodiment of the present technology.

FIG. 29 schematically illustrates a basic configuration of a display apparatus 114 of the eighth example. The display apparatus 114 includes a left-eye display apparatus 114-L and a right-eye display apparatus. The left-eye display apparatus 114-L and the right-eye display apparatus in the display apparatus 114 are symmetrically laid out. Thus, the left-eye display apparatus 114-L is primarily described. The display apparatus 114 is, for example, a head-mounted display apparatus (HMD) used by being worn on a head of a user. For example, the display apparatus 114 is used to provide VR to a user.

The display apparatus 114-L has a configuration that is similar to the configuration of the display apparatus 106 of the sixth example except that, for example, the eye-tracking apparatus 70-L is provided to an outer edge of the three-dimensional image displaying apparatus 10-L.

In the display apparatus 114-L, the eye-tracking apparatus 70-L is arranged side by side with the three-dimensional image displaying apparatus 10-L. Due to such arrangement, there is an impact of distortion due to the ocular optical element 40-L, but the field of view and the eye relief are less restricted, compared to, for example, when an eye-tracking apparatus is provided to the outer edge of the ocular optical element 40-L.

(9) Display Apparatus of Ninth Example

Figure 30:
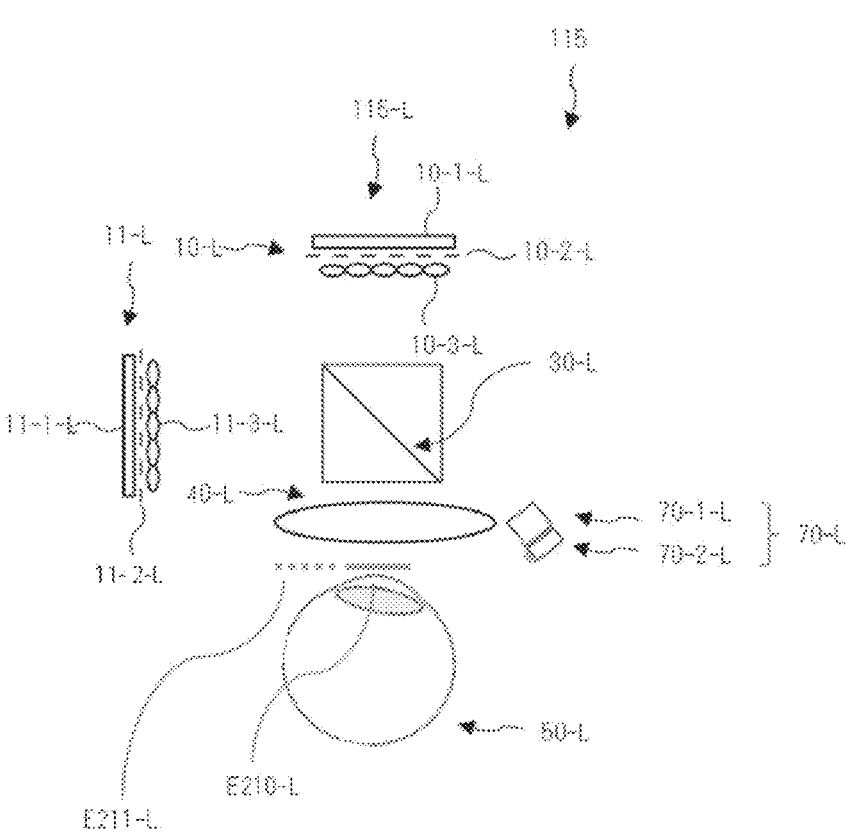
FIG. 30 illustrates a configuration of a display apparatus of a ninth example of an embodiment of the present technology.

FIG. 30 schematically illustrates a basic configuration of a display apparatus 115 of the ninth example. The display apparatus 115 includes a left-eye display apparatus 115-L and a right-eye display apparatus. The left-eye display apparatus 115-L and the right-eye display apparatus in the display apparatus 115 are symmetrically laid out. Thus, the left-eye display apparatus 115-L is primarily described. The display apparatus 115 is, for example, a head-mounted display apparatus (HMD) used by being worn on a head of a user. For example, the display apparatus 115 is used to provide VR to a user.

The display apparatus 115 has a configuration that is similar to the configuration of the display apparatus 101 of the first example except that the eye-tracking apparatus 70-L is included. In other words, the display apparatus 115 further includes a line-of-sight detection system that includes the eye-tracking apparatus 70-L, the line-of-sight detection system detecting a line of sight of a user, and a group-of-viewpoints generation system of the display apparatus 115 controls a position at which a group of viewpoints is generated, on the basis of a result of the detection performed by the line-of-sight detection system.

The display apparatus 115-L makes it possible to achieve a higher viewpoint density and a higher resolution by using the first and second three-dimensional image displaying apparatuses 10-L and 11-L and the eye-tracking apparatus 70-L.

(10) Display Apparatus of Tenth Example

Figure 31:
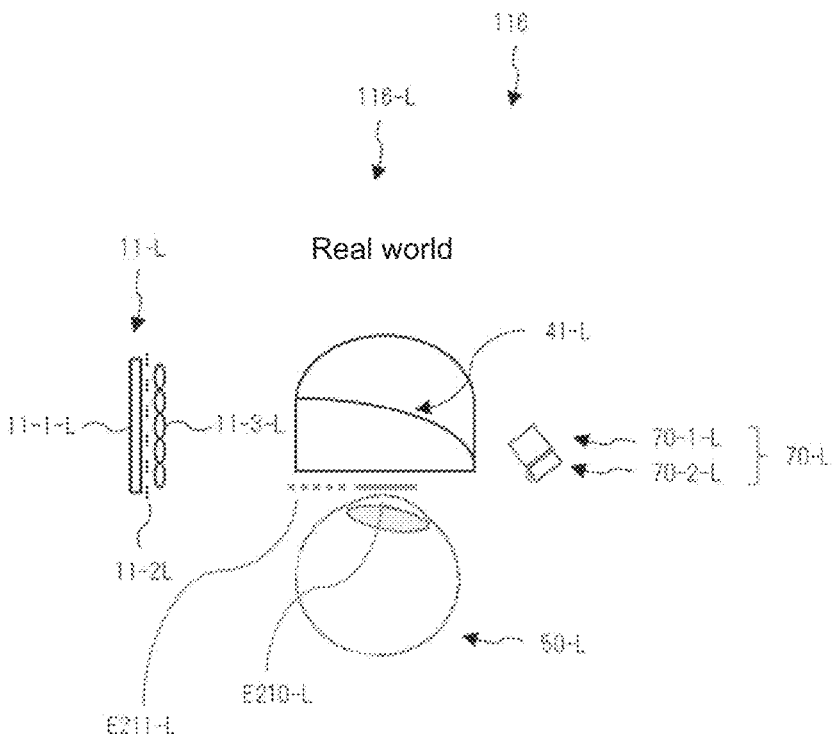
FIG. 31 illustrates a configuration of a display apparatus of a tenth example of an embodiment of the present technology.

FIG. 31 schematically illustrates a basic configuration of a display apparatus 116 of the tenth example. The display apparatus 116 includes a left-eye display apparatus 116-L and a right-eye display apparatus. The left-eye display apparatus 116-L and the right-eye display apparatus in the display apparatus 116 are symmetrically laid out. Thus, the left-eye display apparatus 116-L is primarily described. The display apparatus 116 is, for example, a head-mounted display apparatus (HMD) used by being worn on a head of a user. For example, the display apparatus 116 is used to provide AR to a user.

The display apparatus 116 has a configuration that is substantially similar to the configuration of the display apparatus 106 of the sixth example except that the freeform prism 41-L including a function of a beam splitter and a function of an eyepiece is used instead of the ocular optical element 40-L (for example, an eyepiece).

In the display apparatus 116, the three-dimensional image displaying apparatus 11-1-L is arranged on a lateral side of the freeform prism 41-L facing the left eye 50-L. Thus, in the display apparatus 116-L, light rays coming from the real world pass through the freeform prism 41-L to be incident on the left eye 50-L. Consequently, in the display apparatus 116-L, display is performed in a state in which a three-dimensional image (a three-dimensional video) and light rays coming from the real world overlap. This makes it possible to provide a 3D augmented-reality display that has a see-through performance and enables a decrease in VAC.

(11) Display Apparatus of Eleventh Example

Figure 32:
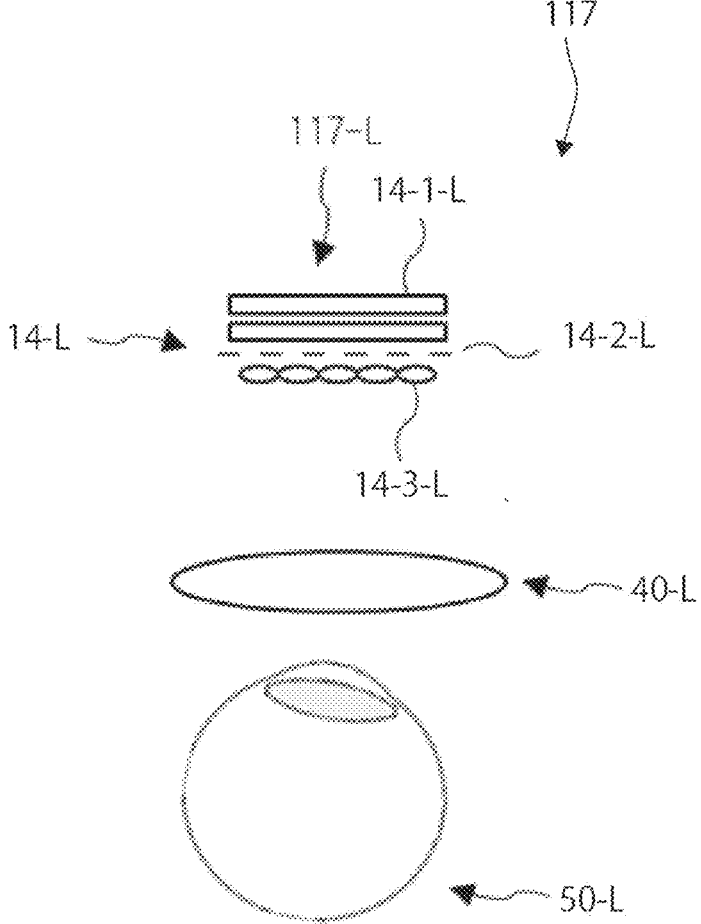
FIG. 32 illustrates a configuration of a display apparatus of an eleventh example of an embodiment of the present technology.

FIG. 32 schematically illustrates a basic configuration of a display apparatus 117 of the eleventh example. The display apparatus 117 includes a left-eye display apparatus 117-L and a right-eye display apparatus. The left-eye display apparatus 117-L and the right-eye display apparatus in the display apparatus 117 are symmetrically laid out. Thus, the left-eye display apparatus 117-L is primarily described. The display apparatus 117 is, for example, a head-mounted display apparatus (HMD) used by being worn on a head of a user. For example, the display apparatus 117 is used to provide VR to a user.

The display apparatus 117-L includes a group 14-L of three-dimensional image displaying apparatuses including a three-dimensional image displaying apparatus or a plurality of (for example, two) three-dimensional image displaying apparatuses, and the ocular optical element 40-L (for example, an eyepiece).

The three-dimensional image displaying apparatuses of the group 14-L of three-dimensional image displaying apparatuses each include an elemental image displaying apparatus, and include a shared aperture array 14-2-L and a shared microlens array 14-3-L, the three-dimensional image displaying apparatuses of the group 14-L of three-dimensional image displaying apparatuses reproducing a light field by integral imaging.

For example, the elemental image displaying apparatuses of the respective three-dimensional image displaying apparatuses each include a display 14-1-L, where the displays 14-1-L of a plurality of displays 14-1-L are arranged in a layered formation.

Specifically, for example, the elemental image displaying apparatuses of the respective three-dimensional image displaying apparatuses may include a shared light source (for example, a backlight), and may each include a transmissive spatial modulator that serves as the display 14-1-L. The transmissive spatial modulators of a plurality of transmissive spatial modulators may be arranged side by side (in a layered formation) in a direction in which the light source emits light.

For example, a liquid crystal element (LCD) is used as the transmissive spatial modulator.

For example, the elemental image displaying apparatuses of the respective three-dimensional image displaying apparatuses may each include a self-luminous display element that serves as the display 14-1-L, and the display elements of a plurality of display elements may be arranged side by side (in a layered formation) in a direction in which a group of light rays is emitted.

For example, a micro LED array or an OLED array is used as the display element.

For example, the elemental image displaying apparatus of one of the three-dimensional image displaying apparatuses of the group 14-L of three-dimensional image displaying apparatuses may include a transmissive spatial modulator that serves as the display 14-1-L, and a light source (for example, a backlight), another of the three-dimensional image displaying apparatuses may include a self-luminous display element that serves as the display 14-1-L, and the transmissive spatial modulator and the display element may be arranged in a layered formation. For example, a liquid crystal element (LCD) is used as the transmissive spatial modulator. For example, a micro LED array or an OLED array is used as the display element.

In the display apparatus 117-L having the configuration described above, a group of light rays emitted from the three-dimensional image displaying apparatuses of the group 14-L of three-dimensional image displaying apparatuses passes through the ocular optical element 40-L to be incident on the left eye 50-L of the user. Here, the group of light rays generates a group of viewpoints in an eye-box range in a pupil plane of the left eye 50-L.

The display apparatus 117-L uses a plurality of three-dimensional image displaying apparatuses 14-L respectively including the displays 14-1-L (transmissive spatial modulators or display elements) arranged in a layered formation, and this enables the display apparatus 117-L to display a high-resolution elemental image and reproduce a high-resolution light field using cascaded displays, as in Cited Document 4 (Cascaded Displays: Spatiotemporal Super-resolution using Offset Pixel Layers). Further, contrast can be enhanced by controlling, for each pixel, a light amount that reaches a top surface display, as in Cited Document 4 (Japanese Unexamined Patent Application Publication No. 2020-521174).

(12) Display Apparatus of Twelfth Example

Figure 33:
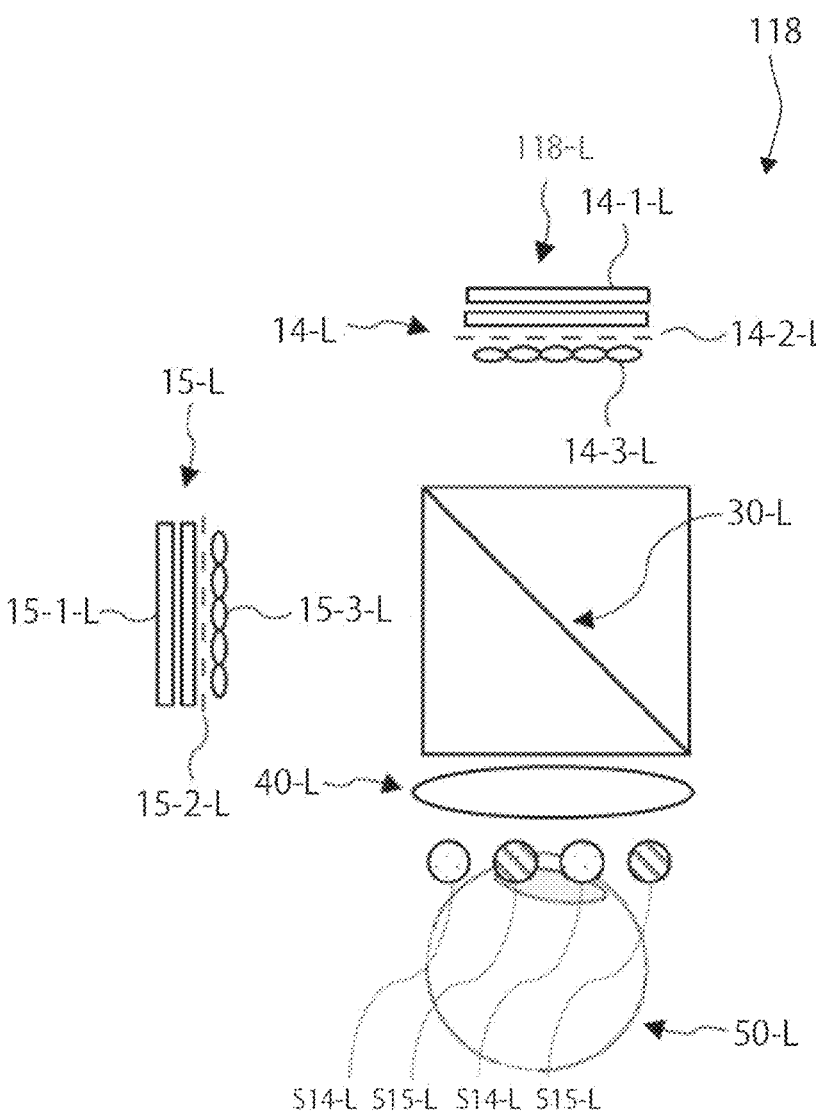
FIG. 33 illustrates a configuration of a display apparatus of a twelfth example of an embodiment of the present technology.

FIG. 33 schematically illustrates a basic configuration of a display apparatus 118 of the twelfth example. The display apparatus 118 includes a left-eye display apparatus 118-L and a right-eye display apparatus. The left-eye display apparatus 118-L and the right-eye display apparatus in the display apparatus 118 are symmetrically laid out. Thus, the left-eye display apparatus 118-L is primarily described. The display apparatus 118 is, for example, a head-mounted display apparatus (HMD) used by being worn on a head of a user. For example, the display apparatus 118 is used to provide VR to a user.

The display apparatus 118-L has a configuration that is similar to the configuration of the display apparatus 101-L (refer to FIG. 16) of the first example except that a first group 14-L of three-dimensional image displaying apparatuses including a plurality of (for example, two) first three-dimensional image displaying apparatuses is provided instead of the first three-dimensional image displaying apparatus 10-L, and except that a plurality of second groups 15-L of three-dimensional image displaying apparatuses is provided instead of the second three-dimensional image displaying apparatus 11-L.

The three-dimensional image displaying apparatuses of the first group 14-L of three-dimensional image displaying apparatuses each include an elemental image displaying apparatus, and include the shared aperture array 14-2-L and the shared microlens array 14-3-L, the three-dimensional image displaying apparatuses of the first group 14-L of three-dimensional image displaying apparatuses reproducing a light field by integral imaging.

For example, the elemental image displaying apparatuses of the respective three-dimensional image displaying apparatuses of the first group 14-L of three-dimensional image displaying apparatuses each include the display 14-1-L, where the displays 14-1-L of a plurality of displays 14-1-L are arranged in a layered formation.

The three-dimensional image displaying apparatuses of the second group 15-L of three-dimensional image displaying apparatuses each include an elemental image displaying apparatus, and include a shared aperture array 15-2-L and a shared microlens array 15-3-L, the three-dimensional image displaying apparatuses of the second group 15-L of three-dimensional image displaying apparatuses reproducing a light field by integral imaging.

For example, the elemental image displaying apparatuses of the respective three-dimensional image displaying apparatuses of the second group 15-L of three-dimensional image displaying apparatuses each include the display 15-1-L, where the displays 15-1-L of a plurality of displays 15-1-L are arranged in a layered formation.

Specifically, for example, the elemental image displaying apparatuses of the respective three-dimensional image displaying apparatuses of each of the first group 14-L of three-dimensional image displaying apparatuses and the second group 15-L of three-dimensional image displaying apparatuses may include a shared light source, and may each include a transmissive spatial modulator that serves as a display. The transmissive spatial modulators of a plurality of transmissive spatial modulators may be arranged side by side (in a layered formation) in a direction in which the light source emits light.

For example, a liquid crystal element (LCD) is used as the transmissive spatial modulator.

For example, the elemental image displaying apparatuses of the respective three-dimensional image displaying apparatuses of each of the first group 14-L of three-dimensional image displaying apparatuses and the second group 15-L of three-dimensional image displaying apparatuses may each include a self-luminous display element that serves as a display, and the display elements of a plurality of display elements may be arranged side by side (in a layered formation) in a direction in which a group of light rays is emitted. For example, a micro LED array or an OLED array is used as the display element.

For example, the elemental image displaying apparatus of one of the three-dimensional image displaying apparatuses of each of the first group 14-L of three-dimensional image displaying apparatuses and the second group 15-L of three-dimensional image displaying apparatuses may include a transmissive spatial modulator that serves as a display, and a light source (for example, a backlight), another of the three-dimensional image displaying apparatuses of a corresponding one of the first group 14-L of three-dimensional image displaying apparatuses and the second group 15-L of three-dimensional image displaying apparatuses may include a self-luminous display element that serves as a display, and the transmissive spatial modulator and the display element may be arranged in a layered formation. For example, a liquid crystal element (LCD) is used as the transmissive spatial modulator. For example, a micro LED array or an OLED array is used as the display element.

In the display apparatus 118-L having the configuration described above, a first group of light rays emitted from the first group 14-L of three-dimensional image displaying apparatuses and a second group of light rays emitted from the second group 15-L of three-dimensional image displaying apparatuses each pass through the optical element 30-L and the ocular optical element 40-L in this order to be incident on the left eye 50-L of the user. Here, the first group of light rays generates, in a pupil plane of the left eye 50-L, a first group of viewpoints including a plurality of viewpoints S14-L, and the second group of light rays generates, in the pupil plane of the left eye 50-L, a second group of viewpoints including a plurality of viewpoints S15-L.

The display apparatus 118-L makes it possible to obtain the effects provided by the display apparatus 101-L of the first example and the effects provided by the display apparatus 117-L of the eleventh example.

(13) Display Apparatus of Thirteenth Example

Figure 34:
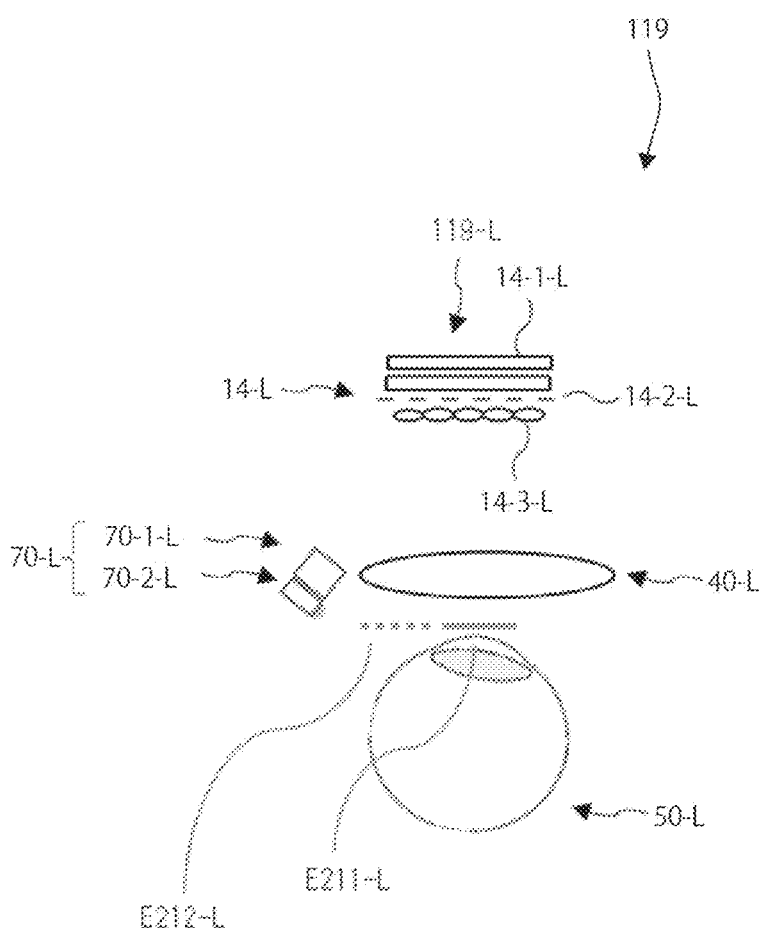
FIG. 34 illustrates a configuration of a display apparatus of a thirteenth example of an embodiment of the present technology.

FIG. 34 schematically illustrates a basic configuration of a display apparatus 119 of the thirteenth example. The display apparatus 119 includes a left-eye display apparatus 119-L and a right-eye display apparatus. The left-eye display apparatus 119-L and the right-eye display apparatus in the display apparatus 119 are symmetrically laid out. Thus, the left-eye display apparatus 119-L is primarily described. The display apparatus 119 is, for example, a head-mounted display apparatus (HMD) used by being worn on a head of a user. For example, the display apparatus 119 is used to provide VR to a user.

The display apparatus 119L has a configuration that is similar to the configuration of the display apparatus 117L (refer to FIG. 32) of the eleventh example except that the display apparatus 119L includes a line-of-sight detection system including the eye-tracking apparatus 70-L.

For example, the eye-tracking apparatus 70-L of the display apparatus 119L is laid out, as in the case of the eye-tracking apparatus 70-L of the display apparatus 106L of the sixth example.

The display apparatus 119L makes it possible to obtain the effects provided by the display apparatus 117L of the eleventh example and the effects provided by the display apparatus of the sixth example.

(14) Display Apparatus of Fourteenth Example

Figure 35:
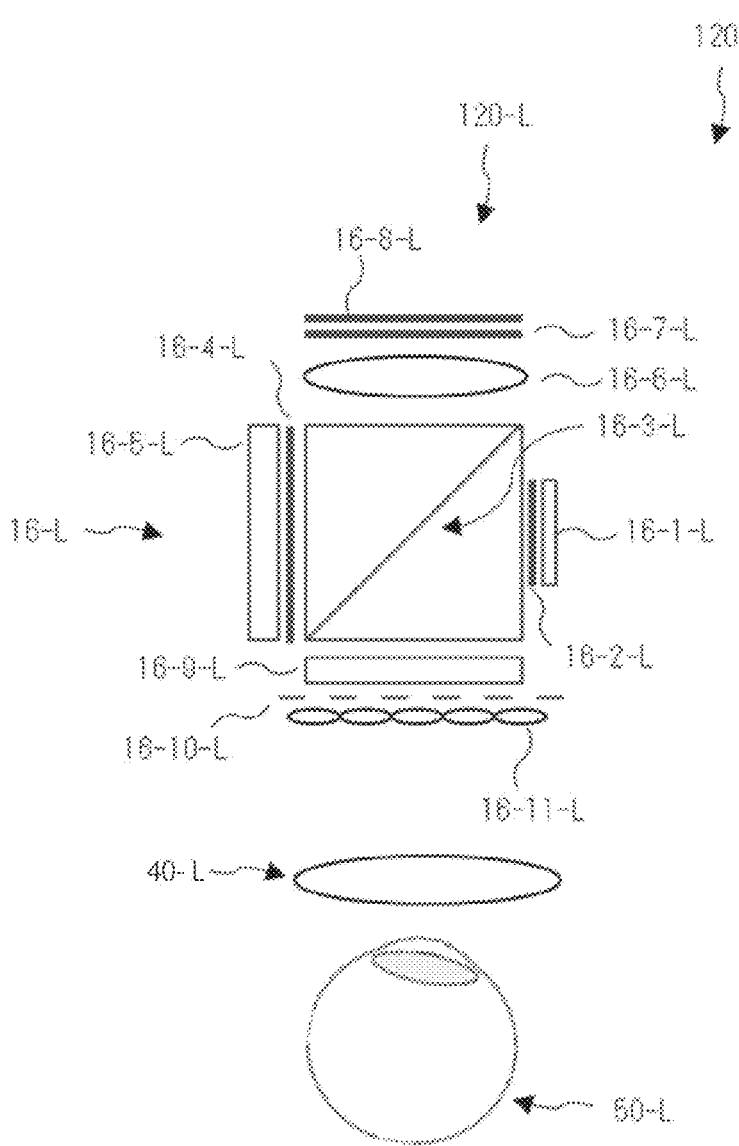
FIG. 35 illustrates a configuration of a display apparatus of a fourteenth example of an embodiment of the present technology.

FIG. 35 schematically illustrates a basic configuration of a display apparatus 120 of the fourteenth example. The display apparatus 120 includes a left-eye display apparatus 120-L and a right-eye display apparatus, as illustrated in FIG. 35. The left-eye display apparatus 120-L and the right-eye display apparatus in the display apparatus 120 are symmetrically laid out. Thus, the left-eye display apparatus 120-L is primarily described. The display apparatus 120 is, for example, a head-mounted display apparatus (HMD) used by being worn on a head of a user. For example, the display apparatus 120 is used to provide VR to a user.

In the display apparatus 120-L, an elemental image displaying apparatus of a first three-dimensional image displaying apparatus included in a group 16-L of three-dimensional image displaying apparatuses includes a light source 16-1-L and a reflective spatial modulator 16-5-L (such as a DMD or an FLCOS), and an elemental image displaying apparatus of a second three-dimensional image displaying apparatus included in the group 16-L of three-dimensional image displaying apparatuses includes the light source 16-1-L and a transmissive spatial modulator 16-9-L (such as an LCD).

A direction in which a group of light rays is emitted from the reflective spatial modulator 16-5-L and a direction in which a group of light rays is emitted from the transmissive spatial modulator 16-9-L intersect (are, for example, substantially orthogonal to each other), and an optical system includes an optical element 16-3-L that aligns a traveling direction of the group of light rays coming from the reflective spatial modulator 16-5-L with a traveling direction of the group of light rays coming from the transmissive spatial modulator 16-5-L. For example, the optical element 16-3-L is a polarization beam splitter.

Further, the elemental image displaying apparatus of the first three-dimensional image displaying apparatus includes a quarter wave plate 16-4-L that is situated between the optical element 16-3-L and the reflective spatial modulator 16-5-L, a mirror 16-8-L that is situated across the optical element 16-3-L from the transmissive spatial modulator 16-9-L, a lens 16-6-L that is situated between the mirror 16-8-L and the optical element 16-3-L, and a quarter wave plate 16-7-L that is situated between the mirror 16-8-L and the lens 16-6-L.

The respective elemental image displaying apparatuses of the first and second three-dimensional image displaying apparatuses include a shared polarizing plate 16-2-L that is situated between the light source 16-1-L and the optical element 16-3-L.

The first and second three-dimensional image displaying apparatuses include a shared microlens array 16-11-L that is situated between the transmissive spatial modulator 16-9-L and the ocular optical element 40-L, and a shared aperture array 16-10-L that is situated between the transmissive spatial modulator 16-9-L and the microlens array 16-11-L.

In the display apparatus 120-L, first linearly polarized light, from among light emitted by the light source 16-1-L, that is polarized in a specified polarization direction is transmitted through the optical element 16-3-L to be incident on the quarter wave plate 16-4-L. The first linearly polarized light incident on the quarter wave plate 16-4-L is transformed into circularly polarized light and incident on the reflective spatial modulator 16-5-L. The light is reflected off the reflective spatial modulator 16-5-L to generate a group of light rays in which a direction of rotation of circular polarization of the light becomes reversed. The light is transformed by the quarter wave plate 16-4-L into second linearly polarized light that is polarized in a polarization direction orthogonal to the polarization direction of the first linearly polarized light, and the light is incident on the optical element 16-3-L. The group of light rays incident on the optical element 16-3-L is reflected off the optical element 16-3-L to be headed for the lens 16-6-L. The group of light rays passes through the lens 16-6-L to be transformed by the quarter wave plate 16-7-L into circularly polarized light, and is incident on the mirror 16-8-L. The group of light rays is reflected off the mirror 16-8-L, and a direction of rotation of circular polarization of the light becomes reversed. The light is transformed by the quarter wave plate 16-7-L into the first linearly polarized light, and is transmitted through the lens 16-6-L and the optical element 16-3-L in this order to be incident on the transmissive spatial modulator 16-9-L. Each light ray of the group of light rays passing through the transmissive spatial modulator 16-9-L passes through the aperture array 16-10-L, the microlens array 16-11-L, and the ocular optical element 40-L in this order to be concentrated onto a corresponding viewpoint. Accordingly, a group of viewpoints is generated.

The display apparatus 120-L makes it possible to obtain effects similar to the effects provided by the display apparatus 117 (refer to FIG. 32) of the eleventh example. Further, the use of a reflective spatial modulator and a transmissive spatial modulator in combination makes it possible to achieve a higher degree of transmittance, compared to when transmissive spatial modulators are arranged in a layered formation.

<4. Modifications of Present Technology>

Modifications may be made as appropriate to the configurations of the display apparatuses of the above-described examples and modifications of the present technology.

For example, the example of the display apparatus reproducing a light field by integral imaging has been described in the examples and modifications above. However, for example, the display apparatus of the present technology can also be applied to a display apparatus that reproduces a light field using a display and a lenticular lens in combination, and a display apparatus that reproduces a light field using a display and a parallax barrier.

For example, an ocular optical element (for example, an eyepiece) does not necessarily have to be provided in the first to third, eleventh, twelfth, and fourteenth examples described above.

For example, at least one of the first optical element, the second optical element, or the optical element does not necessarily have to be a beam splitter.

For example, the three-dimensional image displaying apparatuses of the display apparatuses of the examples and modification described above each do not necessarily have to include at least one of an aperture array or a microlens array. It is favorable that the three-dimensional image displaying apparatus include a lenticular lens or a parallax barrier when the three-dimensional image displaying apparatus does not include a microlens array.

For example, the three-dimensional image displaying apparatuses of the display apparatuses of the examples and modification described above may each include an ocular mirror that serves as the ocular optical element.

For example, the three-dimensional image displaying apparatuses of the display apparatuses of the examples and modification described above may each form a single viewpoint on at least one of two eyes.

For example, the relay optical system may include a mirror.

The display apparatus of the present technology can also be applied to a display apparatus other than a head-mounted display apparatus, that is, for example, a naked-eye-type display apparatus.

For example, at least portions of each of the configurations of the display apparatuses of the examples and modification described above may be used in combination without inconsistencies between the portions. For example, in the first and second examples, a freeform prism may be used instead of using a beam splitter and an eyepiece in combination. For example, in the third example, a freeform prism may be used instead of using a beam splitter and an eyepiece in combination. For example, a plurality of three-dimensional image displaying apparatuses may further include a third three-dimensional image displaying apparatus. Then, a traveling direction of a pair of groups of light rays including first and second groups of light rays coming from the first optical element (for example, a beam splitter), and a traveling direction of a third group of light rays that is a group of light rays coming from the third three-dimensional image displaying apparatus may intersect, and the second optical element (for example, a beam splitter or a freeform prism) may align the traveling direction of the pair of groups of light rays and the traveling direction of the third group of light rays.

Further, the present technology may also take the following configurations.

(1) A display apparatus, including
   a group-of-viewpoints generation system that includes
      a plurality of three-dimensional image displaying apparatuses corresponding to each of two eyes of a user, the group-of-viewpoints generation system generating a group of viewpoints for the eye using a group of light rays emitted from each of the plurality of three-dimensional image displaying apparatuses.

(2) The display apparatus according to (1), in which
   the groups of viewpoints of a plurality of the groups of viewpoints do not overlap.

(3) The display apparatus according to (1) or (2), in which
   at least two of a plurality of viewpoints included in a plurality of the groups of viewpoints are generated on the eye.

(4) The display apparatus according to any one of (1) to (3), in which
   at least a viewpoint included in one of a plurality of the groups of viewpoints is generated between two adjacent viewpoints included in another of the plurality of the groups of viewpoints.

(5) The display apparatus according to any one of (1) to (4), in which
   each of the plurality of three-dimensional image displaying apparatuses includes an elemental image displaying apparatus and a microlens array.

(6) The display apparatus according to (5), in which
   each of the plurality of three-dimensional image displaying apparatuses further includes an aperture array that is situated between the elemental image displaying apparatus and the microlens array.

(7) The display apparatus according to any one of (1) to (6), in which
   the plurality of three-dimensional image displaying apparatuses includes at least one pair of first and second three-dimensional image displaying apparatuses in which a direction in which the group of light rays is emitted from the first three-dimensional image displaying apparatus and a direction in which the group of light rays is emitted from the second three-dimensional image displaying apparatus intersect, and
   the group-of-viewpoints generation system includes an optical system that guides the group of light rays coming from each of the plurality of three-dimensional image displaying apparatuses.

(8) The display apparatus according to (7), in which
   the optical system includes a first optical element that aligns a traveling direction of a first group of light rays and a traveling direction of a second group of light rays, the first group of light rays being the group of light rays coming from the first three-dimensional image displaying apparatus, the second group of light rays being the group of light rays coming from the second three-dimensional image displaying apparatus.

(9) The display apparatus according to (8), in which
   the optical system further includes at least one of a first relay optical system or a second relay optical system, the first relay optical system being arranged between the first three-dimensional image displaying apparatus and the first optical element to generate an intermediate image of the first group of light rays, the second relay optical system being arranged between the second three-dimensional image displaying apparatus and the first optical element to generate an intermediate image of the second group of light rays.

(10) The display apparatus according to (8) or (9), in which the plurality of three-dimensional image displaying apparatuses includes the pair of the first and second three-dimensional image displaying apparatuses, and the first optical element aligns the traveling directions of the first and second groups of light rays in a direction toward the eye.

(11) The display apparatus according to any one of (8) to (10), in which the first optical element is a beam splitter.

(12) The display apparatus according to any one of (8) to (11), in which the optical system further includes an ocular optical element on which the first and second groups of light rays coming from the first optical element are incident.

(13) The display apparatus according to any one of (8) to (10), in which the first optical element is a freeform prism that also serves as an ocular optical element.

(14) The display apparatus according to (8) or (9), in which the plurality of three-dimensional image displaying apparatuses includes a plurality of the pairs of the first and second three-dimensional image displaying apparatuses, the first optical element is provided for each of the plurality of the pairs, a traveling direction of a pair of groups of light rays and a traveling direction of another pair of groups of light rays intersect, the pair of groups of light rays including the first and second groups of light rays coming from one of the first optical elements provided for the plurality of the pairs, the other pair of groups of light rays including the first and second groups of light rays coming from another of the first optical elements provided for the plurality of the pairs, and the optical system further includes a second optical element that aligns the traveling direction of the pair of groups of light rays and the traveling direction of the other pair of groups of light rays.

(15) The display apparatus according to (14), in which at least one of the first and second optical elements is a beam splitter.

(16) The display apparatus according to (14) or (15), in which the optical system further includes an ocular optical element on which the pair of groups of light rays and the other pair of groups of light rays are incident, the pair of groups of light rays and other pair of groups of light rays coming from the second optical element.

(17) The display apparatus according to (14) or (15), in which the second optical element is a freeform prism that also serves as an ocular optical element.

(18) The display apparatus according to any one of (14) to (17), in which the optical system further includes at least one of a first relay optical system or a second relay optical system, the first relay optical system being arranged between the one of the first optical elements and the second optical element to generate an intermediate image of the first and second groups of light rays coming from the one of the first optical elements, the second relay optical system being arranged between the other of the first optical elements and the second optical element to generate an intermediate image of the first and second groups of light rays coming from the other of the first optical elements.

(19) The display apparatus according to any one of (8) to (18), in which the plurality of three-dimensional image displaying apparatuses further includes a third three-dimensional image displaying apparatus, a traveling direction of a pair of groups of light rays and a traveling direction of a third group of light rays intersect, the pair of groups of light rays including the first and second groups of light rays coming from the first optical element, the third group of light rays being a group of light rays coming from the third three-dimensional image displaying apparatus, and the optical system further includes a second optical element that aligns the traveling direction of the pair of groups of light rays and the traveling direction of the third group of light rays.

(20) The display apparatus according to (20), in which at least one of the first and second optical elements is a beam splitter.

(21) The display apparatus according to any one of (8) to (20), further including a two-dimensional image displaying apparatus corresponding to the eye of the user, in which a traveling direction of a group of light rays emitted from the two-dimensional image displaying apparatus and a traveling direction of a pair of groups of light rays intersect, the pair of groups of light rays including the first and second groups of light rays coming from the first optical element, and the optical system further includes a second optical element that aligns the traveling direction of the group of light rays and the traveling direction of the pair of groups of light rays.

(22) The display apparatus according to (21), in which the optical system further includes a relay optical system that is arranged between the first and second optical elements to generate an intermediate image of the first and second groups of light rays coming from the first optical element.

(23) The display apparatus according to (21) or (22), in which the second optical element is a freeform prism that also serves as an ocular optical element.

(24) The display apparatus according to any one of (5) to (23), in which the elemental image displaying apparatus included in each of the plurality of three-dimensional image displaying apparatuses includes a display.

(25) The display apparatus according to (24), in which the displays of a plurality of the displays are arranged in a layered formation.

(26) The display apparatus according to (24) or (25), in which three-dimensional image displaying apparatuses of the plurality of three-dimensional image displaying apparatuses share the microlens array.

(27) The display apparatus according to any one of (24) to (26), in which the group-of-viewpoints generation system includes an ocular optical element on which groups of light rays coming from the respective displays of a plurality of the displays are incident.

(28) The display apparatus according to any one of (24) to (27), in which at least one of a plurality of the displays includes a light source and a spatial modulator.

(29) The display apparatus according to (28), in which the plurality of the displays includes a first display including a reflective spatial modulator and a second display including a transmissive spatial modulator, a direction in which a group of light rays is emitted from the reflective spatial modulator and a direction in which a group of light rays is emitted from the transmissive spatial modulator intersect, and the optical system includes an optical element that aligns a traveling direction of the group of light rays coming from the reflective spatial modulator with a traveling direction of the group of light rays coming from the transmissive spatial modulator.

(30) The display apparatus according to (28) or (29), in which the spatial modulator is a liquid crystal element.

(31) The display apparatus according to (28) or (30), in which the spatial modulator is transmissive.

(32) The display apparatus according to (28) or (30), in which the spatial modulator is reflective.

(33) The display apparatus according to (32), in which the spatial modulator is a ferroelectric liquid crystal on silicon (FLCOS).

(34) The display apparatus according to (32), in which the spatial modulator is Digital Mirror Device (DMD).

(35) The display apparatus according to any one of (24) to (27), in which at least one of a plurality of the displays includes a self-luminous display element.

(36) The display apparatus according to (35), in which the display element includes a light-emitting diode (LED) or an organic light-emitting diode (OLED).

(37) The display apparatus according to any one of (1) to (36), further including a line-of-sight detection system that detects a line of sight of the user, in which on the basis of a result of the detection performed by the line-of-sight detection system, the group-of-viewpoints generation system controls a position at which the group of viewpoints is generated.

(38) The display apparatus according to any one of (1) to (37), in which the display apparatus is a head-mounted display apparatus.

(39) A display apparatus, including: a group-of-viewpoints generation system that includes a three-dimensional image displaying apparatus and an optical system including an ocular optical element, the three-dimensional image displaying apparatus and optical system corresponding to each of two eyes of a user, the group-of-viewpoints generation system generating a group of viewpoints for the eye using a group of light rays being emitted from the three-dimensional image displaying apparatus to pass through the optical system; and a line-of-sight detection system that detects a line of sight of the user, the group-of-viewpoints generation system controlling a position at which the group of viewpoints is generated, on the basis of a result of the detection performed by the line-of-sight detection system.

(40) The display apparatus according to (39), in which each of the plurality of three-dimensional image displaying apparatuses includes an elemental image displaying apparatus and a microlens array.

(41) The display apparatus according to (40), in which each of the plurality of three-dimensional image displaying apparatuses further includes an aperture array that is situated between the elemental image displaying apparatus and the microlens array.

(42) The display apparatus according to any one of (39) to (41), in which the line-of-sight detection system includes a light source section that emits invisible light, and a light receiver that receives the invisible light being emitted by the light source section to be reflected off the eye.

(43) The display apparatus according to any one of (39) to (42), in which the line-of-sight detection system is provided to the ocular optical element corresponding to the eye.

(44) The display apparatus according to any one of (39) to (42), in which the line-of-sight detection system is provided to the three-dimensional image displaying apparatus corresponding to the eye.

(45) The display apparatus according to (42), in which a direction in which the group of light rays coming from the three-dimensional image displaying apparatus corresponding to the eye is emitted and a direction in which the invisible light coming from the light source section is emitted intersect, and the optical system further includes an optical element that aligns a traveling direction of the group of light rays and a traveling direction of the invisible light.

(46) The display apparatus according to (45), in which the invisible light emitted by the light source section passes through the optical element and the ocular optical element in this order to be irradiated onto the eye, and the light receiver receives, through the ocular optical element and the optical element in this order, the invisible light reflected off the eye.

(47) The display apparatus according to (45) or (46), in which the optical element is a beam splitter.

(48) The display apparatus according to (42), in which a direction in which the group of light rays coming from the three-dimensional image displaying apparatus corresponding to the eye is emitted and a direction in which the invisible light coming from the light source section is emitted intersect, and the ocular optical element is a freeform prism that aligns a traveling direction of the group of light rays and a traveling direction of the invisible light.

(49) The display apparatus according to (48), in which the invisible light emitted by the light source section passes through the ocular optical element to be irradiated onto the eye, and the light receiver receives, through the ocular optical element, the invisible light reflected off the eye.

(50) The display apparatus according to any one of (39) to (49), in which the display apparatus is a head-mounted display apparatus.

(51) A display method, including generating, using a group of light rays, a group of viewpoints for each of two eyes of a user, the group of light rays being emitted from each one of a plurality of three-dimensional image displaying apparatuses corresponding to the eye.

(52) A display method, including:

detecting a line of sight of a user; and generating, using a group of light rays, a group of viewpoints for each of two eyes of the user, the group of light rays being emitted from a three-dimensional image displaying apparatus to pass through an optical system including an ocular optical element, the three-dimensional image displaying apparatus corresponding to the eye, the generating the group of viewpoints including controlling a position at which the group of viewpoints is generated, on the basis of a result of the detection performed by the detecting the line of sight.

REFERENCE SIGNS LIST

10-L, 10-R, 11-L, 11-R, 12-L, 12-R, 13-L, 13-R three-dimensional image displaying apparatus 10-1-L, 10-1-R, 11-1-L, 11-1-R, 12-1-L, 12-1-R, 13-1-L, 13-1-R elemental image displaying apparatus 10-2-L, 10-2-R, 11-2-L, 11-2-R, 12-2-L, 12-2-R, 13-2-L, 13-2-R, 14-2-L, 15-2-L, 16-10-L aperture array 10-3-L, 10-3-R, 11-3-L, 11-3-R, 12-3-L, 12-3-R, 13-3-L, 13-3-R, 14-3-L, 15-3-L, 1-11-L microlens array 14-1-L, 15-1-L display 16-5-L reflective spatial modulator 16-9-L transmissive spatial modulator 20-L, 20-R, 23-L, 23-R first relay optical system 21-L, 21-R, 22-L, 22-R second relay optical system 24-L, 24-R relay optical system (first relay optical system)

25-L, 25-R relay optical system (second relay optical system)

30-L, 30-R optical element (first optical element)

31-L, 31-R, 32-L, 32-R first optical element

30-L, 30-R second optical element

40-L, 40-R ocular optical element

41-L, 41-R freeform prism

60-L, 60-R two-dimensional image displaying apparatus

70-L eye-tracking apparatus (at least portion of line-of-sight detection system)

70-1-L light source (light source section)

70-2-L camera (light receiver)

S10-L, S10-R, S11-L, S11-R, S12-L, S12-R, S13-L, S13-R viewpoint (portion of group of viewpoints)

What is claimed is:

1. A display apparatus, comprising a group-of-viewpoints generation system that includes a plurality of three-dimensional image displaying apparatuses corresponding to each of two eyes of a user, the group-of-viewpoints generation system generating a group of viewpoints for the eye using a group of light rays emitted from each of the plurality of three-dimensional image displaying apparatuses, wherein the plurality of three-dimensional image displaying apparatuses includes at least one pair of first and second three-dimensional image displaying apparatuses in which a direction in which the group of light rays is emitted from the first three-dimensional image displaying apparatus and a direction in which the group of light rays is emitted from the second three-dimensional image displaying apparatus intersect, and wherein the group-of-viewpoints generation system includes an optical system that guides the group of light rays coming from each of the plurality of three-dimensional image displaying apparatuses, wherein the optical system includes a first optical element that aligns a traveling direction of a first group of light rays and a traveling direction of a second group of light rays, the first group of light rays being the group of light rays coming from the first three-dimensional image displaying apparatus, the second group of light rays being the group of light rays coming from the second three-dimensional image displaying apparatus, wherein the plurality of three-dimensional image displaying apparatuses includes a plurality of the pairs of the first and second three-dimensional image displaying apparatuses, wherein the first optical element is provided for each of the plurality of the pairs, wherein a traveling direction of a pair of groups of light rays and a traveling direction of another pair of groups of light rays intersect, the pair of groups of light rays including the first and second groups of light rays coming from one of the first optical elements provided for the plurality of the pairs, the other pair of groups of light rays including the first and second groups of light rays coming from another of the first optical elements provided for the plurality of the pairs, and wherein the optical system further includes a second optical element that aligns the traveling direction of the pair of groups of light rays and the traveling direction of the other pair of groups of light rays.

2. The display apparatus according to claim 1, wherein the groups of viewpoints of a plurality of the groups of viewpoints do not overlap.

3. The display apparatus according to claim 1, wherein at least two of a plurality of viewpoints included in a plurality of the groups of viewpoints are generated on the eye.

4. The display apparatus according to claim 1, wherein at least a viewpoint included in one of a plurality of the groups of viewpoints is generated between two adjacent viewpoints included in another of the plurality of the groups of viewpoints.

5. The display apparatus according to claim 1, further comprising a line-of-sight detection system that detects a line of sight of the user, wherein on a basis of a result of the detection performed by the line-of-sight detection system, the group-of-viewpoints generation system controls a position at which the group of viewpoints is generated.

6. The display apparatus according to claim 1, wherein the display apparatus is a head-mounted display apparatus.

7. The display apparatus according to claim 1, wherein the plurality of three-dimensional image displaying apparatuses includes at least one pair of first and second three-dimensional image displaying apparatuses in which a direction in which the group of light rays is emitted from the first three-dimensional image displaying apparatus and a direction in which the group of light rays is emitted from the second three-dimensional image displaying apparatus intersect, and the group-of-viewpoints generation system includes an optical system that guides the group of light rays coming from each of the plurality of three-dimensional image displaying apparatuses.

8. The display apparatus according to claim 7, wherein the optical system includes a first optical element that aligns a traveling direction of a first group of light rays and a traveling direction of a second group of light rays, the first group of light rays being the group of light rays coming from the first three-dimensional image displaying apparatus, the second group of light rays being the group of light rays coming from the second three-dimensional image displaying apparatus.

9. The display apparatus according to claim 8, wherein the optical system further includes at least one of a first relay optical system or a second relay optical system, the first relay optical system being arranged between the first three-dimensional image displaying apparatus and the first optical element to generate an intermediate image of the first group of light rays, the second relay optical system being arranged between the second three-dimensional image displaying apparatus and the first optical element to generate an intermediate image of the second group of light rays.

10. The display apparatus according to claim 1, wherein each of the plurality of three-dimensional image displaying apparatuses includes an elemental image displaying apparatus and a microlens array.

11. The display apparatus according to claim 10, wherein each of the plurality of three-dimensional image displaying apparatuses further includes an aperture array that is situated between the elemental image displaying apparatus and the microlens array.

12. The display apparatus according to claim 10, wherein the elemental image displaying apparatus included in each of the plurality of three-dimensional image displaying apparatuses includes a display.

13. The display apparatus according to claim 12, wherein the displays of a plurality of the displays are arranged in a layered formation.

14. The display apparatus according to claim 12, wherein three-dimensional image displaying apparatuses of the plurality of three-dimensional image displaying apparatuses share the microlens array.

15. The display apparatus according to claim 12, wherein the group-of-viewpoints generation system includes an ocular optical element on which groups of light rays coming from the respective displays of a plurality of the displays are incident.

16. The display apparatus according to claim 12, wherein at least one of a plurality of the displays includes a self-luminous display element.

17. The display apparatus according to claim 16, wherein the display element includes a light-emitting diode (LED) or an organic light-emitting diode (OLED).

18. The display apparatus according to claim 12, wherein at least one of a plurality of the displays includes a light source and a spatial modulator.

19. The display apparatus according to claim 18, wherein the plurality of the displays includes a first display including a reflective spatial modulator and a second display including a transmissive spatial modulator, a direction in which a group of light rays is emitted from the reflective spatial modulator and a direction in which a group of light rays is emitted from the transmissive spatial modulator intersect, and the optical system includes an optical element that aligns a traveling direction of the group of light rays coming from the reflective spatial modulator with a traveling direction of the group of light rays coming from the transmissive spatial modulator.

20. The display apparatus according to claim 18, wherein the spatial modulator is a liquid crystal element.

21. The display apparatus according to claim 18, wherein the spatial modulator is transmissive.

22. The display apparatus according to claim 18, wherein the spatial modulator is reflective.

23. The display apparatus according to claim 22, wherein the spatial modulator is a ferroelectric liquid crystal on silicon (FLCOS).

24. The display apparatus according to claim 22, wherein the spatial modulator is Digital Mirror Device (DMD).

25. A display apparatus, comprising
a group-of-viewpoints generation system that includes a plurality of three-dimensional image displaying apparatuses corresponding to each of two eyes of a user, the group-of-viewpoints generation system generating a group of viewpoints for the eye using a group of light rays emitted from each of the plurality of three-dimensional image displaying apparatuses,
wherein the plurality of three-dimensional image displaying apparatuses includes at least one pair of first and second three-dimensional image displaying apparatuses in which a direction in which the group of light rays is emitted from the first three-dimensional image displaying apparatus and a direction in which the group of light rays is emitted from the second three-dimensional image displaying apparatus intersect, and
wherein the group-of-viewpoints generation system includes an optical system that guides the group of light rays coming from each of the plurality of three-dimensional image displaying apparatuses,
wherein the optical system includes a first optical element that aligns a traveling direction of a first group of light rays and a traveling direction of a second group of light rays, the first group of light rays being the group of light rays coming from the first three-dimensional image displaying apparatus, the second group of light rays being the group of light rays coming from the second three-dimensional image displaying apparatus,
wherein the plurality of three-dimensional image displaying apparatuses further includes a third three-dimensional image displaying apparatus,
wherein a traveling direction of a pair of groups of light rays and a traveling direction of a third group of light rays intersect, the pair of groups of light rays including the first and second groups of light rays coming from the first optical element, the third group of light displaying apparatus, and
wherein the optical system further includes a second optical element that aligns the traveling direction of the pair of groups of light rays and the traveling direction of the third group of light rays.

26. The display apparatus according to claim 25, wherein at least one of the first and second optical elements is a beam splitter.

27. The display apparatus according to claim 25, wherein the plurality of three-dimensional image displaying apparatuses includes a plurality of the pairs of the first and second three-dimensional image displaying apparatuses,
the first optical element is provided for each of the plurality of the pairs,
a traveling direction of a pair of groups of light rays and a traveling direction of another pair of groups of light rays intersect, the pair of groups of light rays including the first and second groups of light rays coming from one of the first optical elements provided for the plurality of the pairs, the other pair of groups of light rays including the first and second groups of light rays coming from another of the first optical elements provided for the plurality of the pairs, and the optical system further includes a second optical element that aligns the traveling direction of the pair of groups of light rays and the traveling direction of the other pair of groups of light rays.

28. The display apparatus according to claim 27, wherein at least one of the first and second optical elements is a beam splitter.

29. The display apparatus according to claim 27, wherein the optical system further includes an ocular optical element on which the pair of groups of light rays and the other pair of groups of light rays are incident, the pair of groups of light rays and other pair of groups of light rays coming from the second optical element.

30. The display apparatus according to claim 27, wherein the second optical element is a freeform prism that also serves as an ocular optical element.

31. The display apparatus according to claim 27, wherein the optical system further includes at least one of a first relay optical system or a second relay optical system, the first relay optical system being arranged between the one of the first optical elements and the second optical element to generate an intermediate image of the first and second groups of light rays coming from the one of the first optical elements, the second relay optical system being arranged between the other of the first optical elements and the second optical element to generate an intermediate image of the first and second groups of light rays coming from the other of the first optical elements.

32. A display apparatus, comprising a group-of-viewpoints generation system that includes a plurality of three-dimensional image displaying apparatuses corresponding to each of two eyes of a user, the group-of-viewpoints generation system generating a group of viewpoints for the eye using a group of light rays emitted from each of the plurality of three-dimensional image displaying apparatuses, wherein the plurality of three-dimensional image displaying apparatuses includes at least one pair of first and second three-dimensional image displaying apparatuses in which a direction in which the group of light rays is emitted from the first three-dimensional image displaying apparatus and a direction in which the group of light rays is emitted from the second three-dimensional image displaying apparatus intersect, and wherein the group-of-viewpoints generation system includes an optical system that guides the group of light rays coming from each of the plurality of three-dimensional image displaying apparatuses, wherein the optical system includes a first optical element that aligns a traveling direction of a first group of light rays and a traveling direction of a second group of light rays, the first group of light rays being the group of light rays coming from the first three-dimensional image displaying apparatus, the second group of light rays being the group of light rays coming from the second three-dimensional image displaying apparatus; and a two-dimensional image displaying apparatus corresponding to the eye of the user, wherein a traveling direction of a group of light rays emitted from the two-dimensional image displaying apparatus and a traveling direction of a pair of groups of light rays intersect, the pair of groups of light rays including the first and second groups of light rays coming from the first optical element, and wherein the optical system further includes a second optical element that aligns the traveling direction of the group of light rays and the traveling direction of the pair of groups of light rays.

33. The display apparatus according to claim 32, wherein the optical system further includes a relay optical system that is arranged between the first and second optical elements to generate an intermediate image of the first and second groups of light rays coming from the first optical element.

34. The display apparatus according to claim 32, wherein the second optical element is a freeform prism that also serves as an ocular optical element.

* * * * *